US012198502B2

(12) United States Patent
Awada

(10) Patent No.: US 12,198,502 B2
(45) Date of Patent: Jan. 14, 2025

(54) METHOD AND APPARATUS FOR A VIDEO POKER GAME

(71) Applicant: Yehia Awada, Las Vegas, NV (US)

(72) Inventor: Yehia Awada, Las Vegas, NV (US)

( * ) Notice: Subject to any disclaimer, the term of this patent is extended or adjusted under 35 U.S.C. 154(b) by 117 days.

(21) Appl. No.: 17/853,936

(22) Filed: Jun. 30, 2022

(65) Prior Publication Data

US 2024/0005740 A1 Jan. 4, 2024

Related U.S. Application Data

(60) Provisional application No. 63/216,058, filed on Jun. 29, 2021.

(51) Int. Cl.
*G07F 17/34* (2006.01)
*G07F 17/32* (2006.01)

(52) U.S. Cl.
CPC ...... *G07F 17/3267* (2013.01); *G07F 17/3204* (2013.01); *G07F 17/3293* (2013.01)

(58) Field of Classification Search
CPC ............. G07F 17/3204; G07F 17/3293; G07F 17/3267
See application file for complete search history.

(56) References Cited

U.S. PATENT DOCUMENTS

| | | | | |
|---|---|---|---|---|
| 2002/0043759 | A1* | 4/2002 | Vancura | A63F 9/183 273/139 |
| 2002/0045474 | A1* | 4/2002 | Singer | G07F 17/3216 463/20 |
| 2018/0089949 | A1* | 3/2018 | Moody | G07F 17/3258 |
| 2018/0089950 | A1* | 3/2018 | Moody | G07F 17/3244 |

* cited by examiner

*Primary Examiner* — Omkar A Deodhar
*Assistant Examiner* — Shauna-Kay Hall
(74) *Attorney, Agent, or Firm* — Ronald C. Gorsche

(57) ABSTRACT

The various embodiments generally pertain to a gaming system and method of providing a multi-hand poker wagering game with a bonus hand feature. By way of one example, the player is awarded a new poker hand if the dealt poker hand meets a bad hand criterion.

7 Claims, 39 Drawing Sheets

METHOD AND APPARATUS FOR A VIDEO POKER GAME

FIELD

The present invention relates generally to gaming systems, and methods for playing wagering games, and more particularly, to the field of skill-based video poker games.

BACKGROUND

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. The introduction of social media has expanded the reach and play of the games associated with gaming terminals to a much broader market. Many games that were typically only available for play at a physical casino are now available for "free" play online.

SUMMARY

Various embodiments of the present disclosure are directed to a gaming system and method providing a wagering game with a bonus hand feature.

In various embodiments for the bonus hand feature, the gaming system includes a processor; and a memory storing instructions that, when executed, cause the processor to at least: establish a credit balance responsive to receipt, by the payment device, of the monetary value from a player; enable the player to place a wager on a wagering game, the wager deducted from the credit balance; cause the display device to display a wagering game responsive to receipt of the wager and receipt of a game-initiation input, the wagering game including a plurality of hands; award credits to the credit balance for each hand of the plurality of hands that satisfies a winning hand criterion from a first paytable; for a designated hand of the plurality of hands of the wagering game: determine if the designated hand satisfies a bad hand criterion, in response to a determination that the designated hand satisfies a bad hand criterion, award a bonus hand to replace the designated hand, and cause the display device to display the bonus hand; and initiate a cashout of the credit balance responsive to receipt of a cashout input.

In various embodiments for the bonus hand feature, the gaming system includes a processor; and a memory storing instructions that, when executed, cause the processor to at least: establish a credit balance responsive to receipt, by the payment device, of the monetary value from a player; enable the player to place a wager on a wagering game, the wager deducted from the credit balance; cause the display device to display a wagering game responsive to receipt of the wager and receipt of a game-initiation input, the wagering game including a plurality of hands; cause the credit balance to increase for each hand of the plurality of hands that satisfies a winning hand criterion from a first paytable; for a designated hand of the plurality of hands of the wagering game: determine if the designated hand satisfies a bad hand criterion, in response to a determination that the designated hand satisfies a bad hand criterion, award a bonus hand to replace the designated hand, and cause the display device to display the bonus hand, cause an input, device to, for the in the bonus hand of cards, enable input, of a hold input for a selected card; in response to detecting a hold input for a card in the bonus hand of cards: designate the card as a held card of the bonus hand of cards; duplicate the card in each other hand of the plurality of hands; and cause the display device to display the duplicated card in each other hand of the plurality of hands; designate each card for which the hold input is not received in the bonus hand of cards as a non-held card; in response to detecting a draw input, for each non-held card in the bonus hand of cards and each other hand of the plurality of hands: randomly determine a replacement card for the bonus hand of cards from the fourth set of cards; replace the non-held card in the bonus hand of cards with the replacement card; cause the display device to display the replacement card in the bonus hand of cards; randomly determine an additional card from a new set of cards associated with each other hand of the plurality of hands; add the additional card to the each other hand of the plurality of hands; and cause the display device to display the additional card in the each other hand of the plurality of hands; cause the credit balance to increase for each hand of the bonus hand of cards and each other hand of the plurality of hands that satisfies a winning hand criterion from a second paytable; and initiate a cashout of the credit balance responsive to receipt of a cashout input.

In various embodiments for the bonus hand feature, the gaming system includes a processor; and a memory storing instructions that, when executed, cause the processor to at least: establish a credit balance responsive to receipt, by the payment device, of the monetary value from a player; enable the player to place a wager on a wagering game, the wager deducted from the credit balance; cause the display device to display a wagering game responsive to receipt of the wager and receipt of a game-initiation input, the wagering game including a plurality of hands; randomly determine a plurality of cards from a first set of cards to form an initial first hand of cards; cause the display device to display the first hand of cards; randomly determine a plurality of cards from a second set of cards to form an initial second hand of cards; cause the display device to display the second hand of cards; randomly determine a plurality of cards from a third set of cards to form an initial third hand of cards; cause the display device to display the third hand of cards; cause the credit balance to increase based on any determined award for each hand of the initial first, second and third hand of cards that satisfies a winning hand criterion from a first paytable; for the initial first hand of cards: determine if the initial first hand of cards satisfies a bad hand criterion, in response to a determination that the designated hand satisfies a bad hand criterion, award a bonus hand of cards, randomly determine a plurality of cards from a from a fourth set of cards to replace the initial first hand of cards, cause the display device to display the bonus hand of cards, cause an input device to, for the in the bonus hand of cards, enable input of a hold input for a selected card; in response to detecting a hold input for a card in the bonus hand of cards: designate the card as a held card of the bonus hand of cards; duplicate the card in the second hand of cards; and cause the display device to display the duplicated card in the second hand of cards; duplicate the card in the third hand of cards; and cause the display device to display the duplicated card in the third hand of cards; designate each card for which the hold input is not received in the bonus hand of cards as a non-held card; in response to detecting a draw input, for each non-held card in the bonus hand of cards, second hand of cards and third hand of cards: randomly determine a replacement card for the bonus hand of cards from the fourth set of cards; replace the non-held card in the bonus hand of cards with the replacement card; cause the display device to display the replacement card in the bonus hand of cards; randomly determine an additional card from a fifth set of cards associated with the second hand of cards; add the additional card to the second set of cards; and cause the display device to display the additional card in the second hand of cards; randomly determine an additional card from a sixth set of cards associated with the third hand of cards; add the additional card to the third set of cards; and cause the display device to display the additional card in the third hand of cards; determine a first award based on the first hand of cards and a second paytable, determine a second award based on the second hand of cards and the second paytable, determine a third award based on the third hand of cards and the second paytable, cause the credit balance to increase based on any determined first award, any determined second award, and any determined third award; and initiate a cashout of the credit balance responsive to receipt of a cashout input.

BRIEF DESCRIPTION

Figure 1:
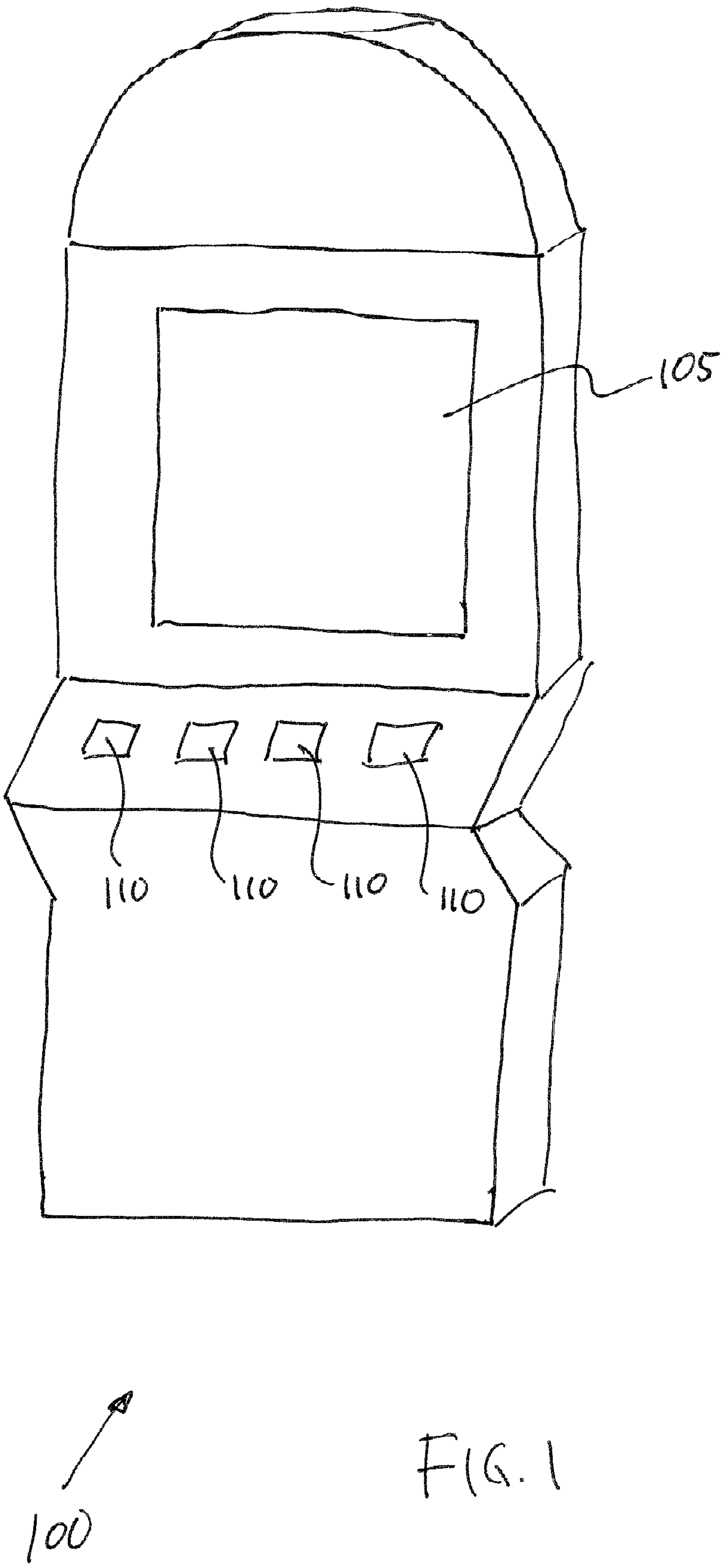
FIG. 1 illustrates on embodiment of a gaming device for implementing aspects of game play.

Reference to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others. In general terms, an algorithm is conceived to be a self-consistent sequence of steps leading to a desired result. The steps of an algorithm require physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices. It is further contemplated within the scope of this invention that calculations can also be done mentally, manually or using processes other than electronic.

The present invention also relates to one or more apparatus for performing the operations herein. This apparatus may be specially constructed for the required purposes, or it may comprise a general-purpose computer selectively activated or reconfigured by a computer program stored within the computer. Such a computer program may be stored in a machine readable storage medium, such as, for example, any type of disk including floppy disks, optical disks, CD-ROMs, magnetic-optical disks, read-only memories (ROMs), random access memories (RAMs), EPROMs, EEPROMs, magnetic or optical card, or any type of media suitable for storing electronic instructions and coupled to a computer system bus.

The algorithms and displays presented and described herein are not inherently related to any particular computer or other apparatus or apparatuses. Various general-purpose systems may be used with programs in accordance with the teachings, or it may prove convenient to construct more specialized apparatus to perform the required method steps. The required structure for a variety of these systems will become readily apparent from the description alone. In addition, the present invention is not described with reference to any particular programming language, and accordingly, a variety of programming languages may be used to implement the teachings of the illustrated invention.

The present disclosure may be implemented in various configurations for gaming machines, gaming devices, or gaming systems, including but not limited to: (1) a dedicated gaming machine, gaming device, or gaming systems wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment.

In the embodiments illustrated in FIG. 1, gaming device 100 has a support structure, housing, or cabinet which provides support for a display 105, inputs 110, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIG. 1, the gaming device may have varying cabinet and display configurations.

Figure 2:
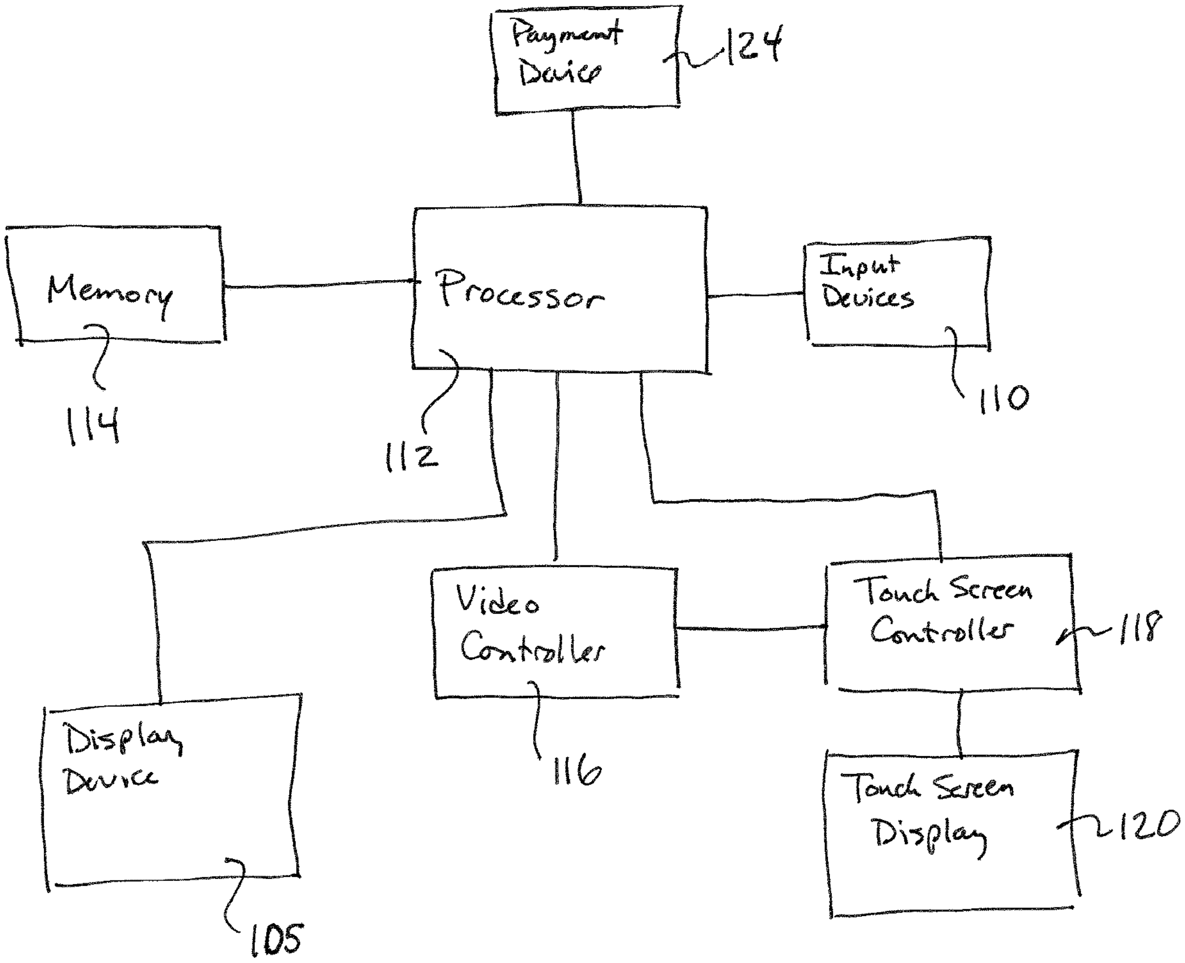
FIG. 2 illustrates a schematic view of one embodiment of the components associated with the gaming device of FIG. 1.

In one embodiment, as illustrated in FIG. 2, the gaming device preferably includes at least one processor 112, such as a microprocessor, a microcontroller-based platform, a suitable integrated circuit or one or more application-specific integrated circuits (ASIC's). The processor is in communication with or operable to access or to exchange signals with at least one data storage or memory device 114. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, the gaming device randomly generates awards and/or other game outcomes based on a probability table. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In one embodiment, as illustrated in FIG. 2, the gaming device includes one or more display devices controlled by the processor. The display devices are preferably connected to or mounted on the cabinet of the gaming device. The embodiment shown in FIG. 1 includes a central display device 105 which displays a game. The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, or video reels and wheels, dynamic lighting, video images, images of people, characters, places, things, faces of cards, and the like.

As illustrated in FIG. 2, in one embodiment, the gaming device includes at least one payment device 124 in communication with the processor. As seen in FIG. 1, a payment device 124 such as a payment acceptor includes a note, ticket or bill acceptor wherein the player inserts paper money, a ticket, or voucher and a coin slot where the player inserts money, coins, or tokens. In other embodiments, payment devices such as readers or validators for credit cards, debit cards, credit slips or mobile wallets may accept payment. In one embodiment, a player may insert an identification card into a card reader of the gaming device.

As seen in FIGS. 1 and 2, in one embodiment the gaming device includes at least one and preferably a plurality of input devices 110 in communication with the processor. The input devices can include any suitable device which enables the player to produce an input signal which is received by the processor.

In one embodiment, as mentioned above and as seen in FIG. 2, one input device is a touch screen display 120 coupled with a touch-screen controller 118 or some other touch-sensitive display overlay to allow for player interaction with the images on the display. The touch-screen and the touch-screen controller are connected to a video controller 116. A player can make decisions and input signals into the gaming device by touching the touch screen at the appropriate locations. One such input device is a conventional touch-screen button panel.

Figure 3:
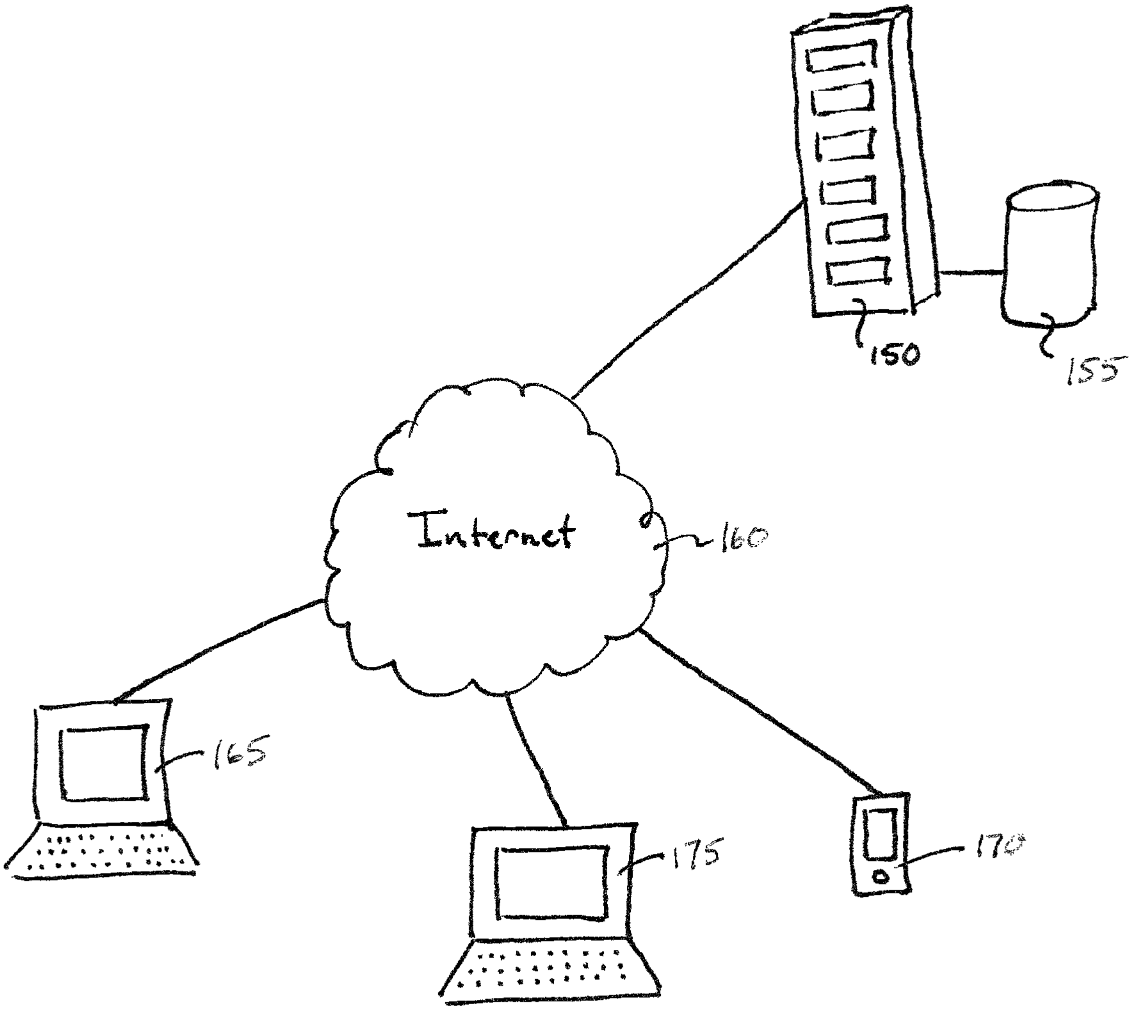
FIG. 3 illustrates one embodiment of the environment for implementing the social gaming aspect of the game play.
Figure 4A:
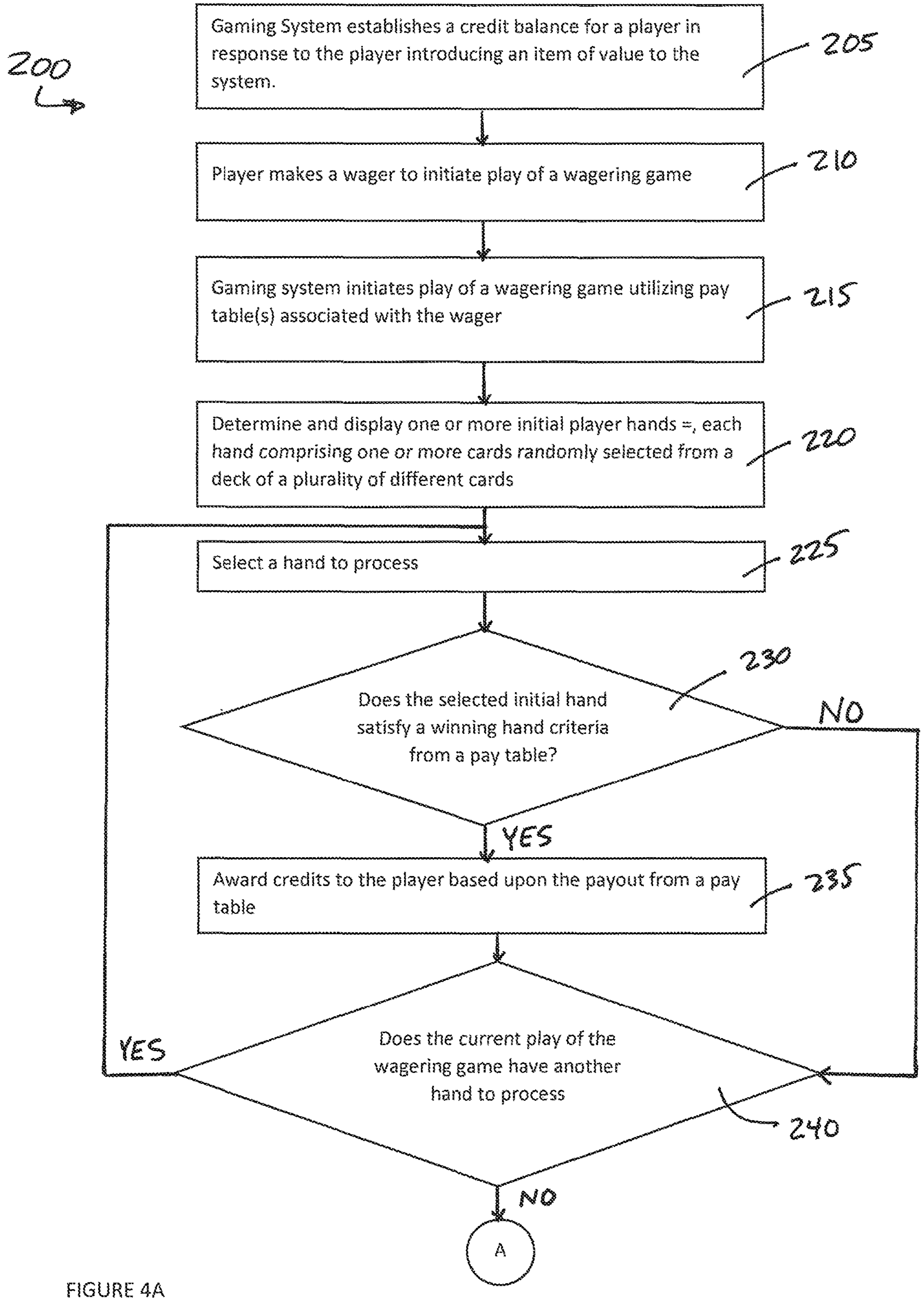
FIGS. 4A-4D show a flowchart of a process or method of operating one example embodiment of the gaming system of the present disclosure to provide a play of one example embodiment of the wagering game with a bonus hand feature of the present disclosure.
Figure 4B:
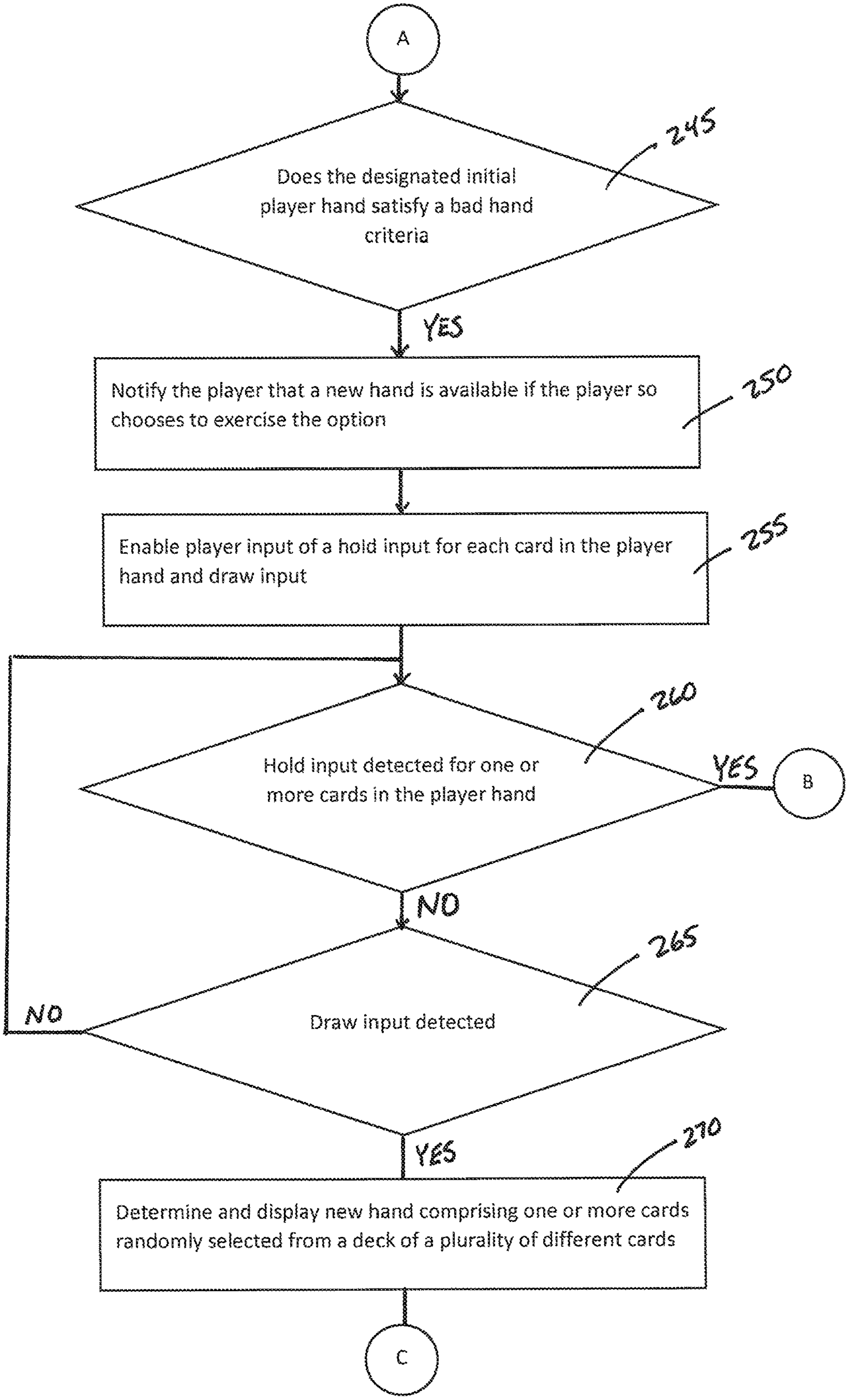
Figure 4C:
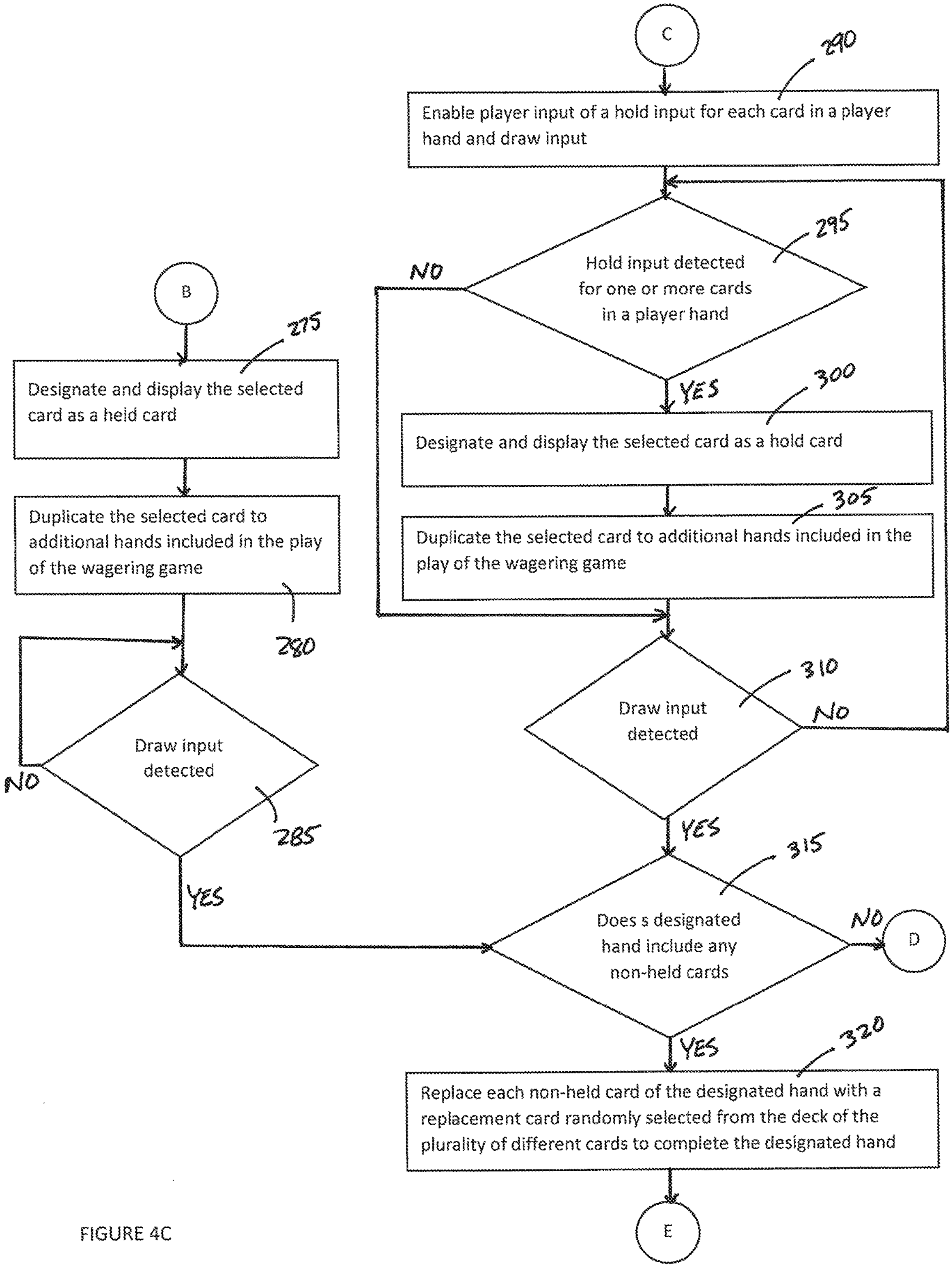
Figure 4D:
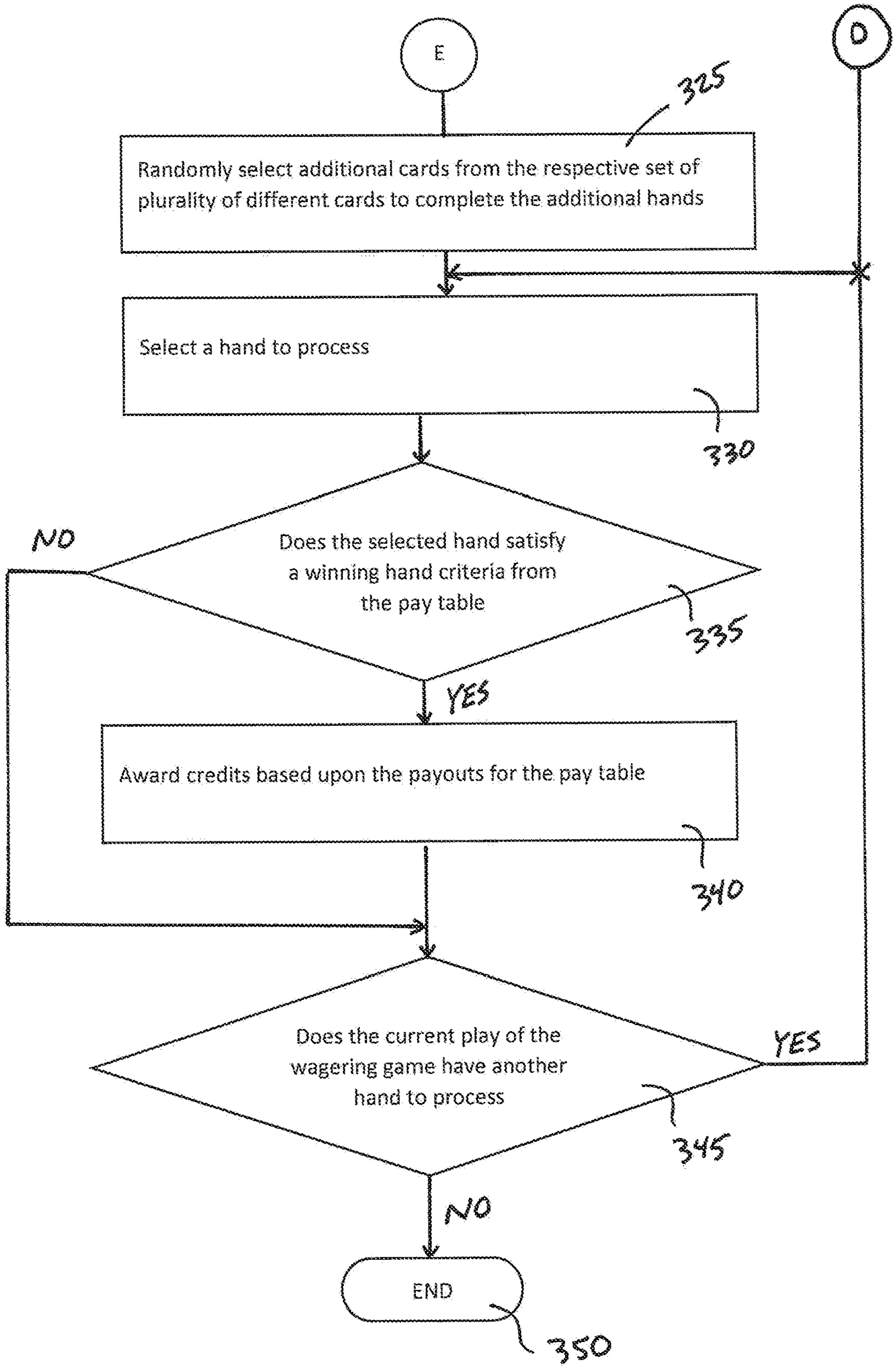
Figure 5:
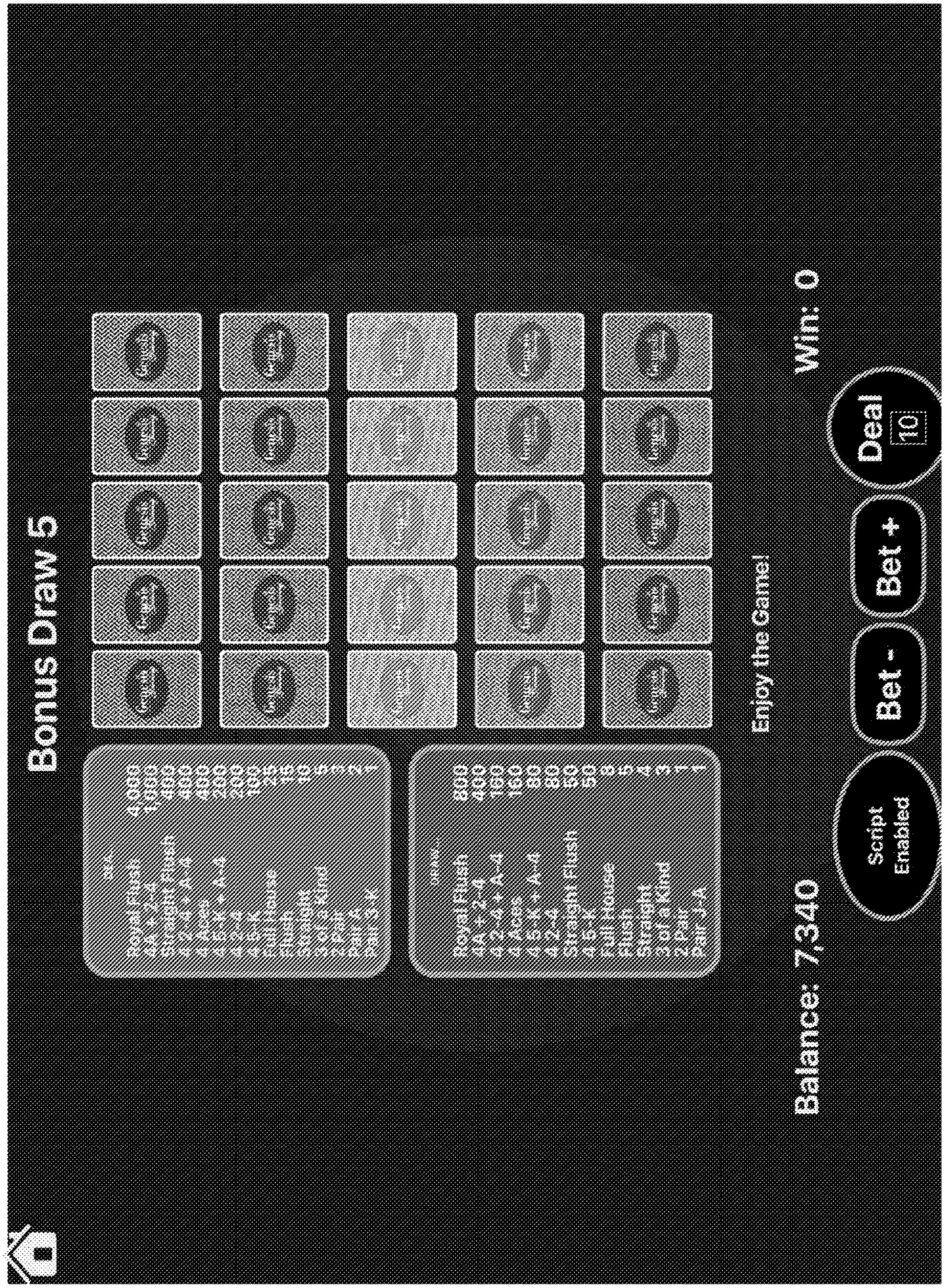
FIGS. 5 to 16 illustrate screen shots of one example embodiment of a gaming system of the present disclosure providing a play of a gaming session of one example embodiment of the wagering game with the bonus hand feature of the present disclosure.
Figure 6:
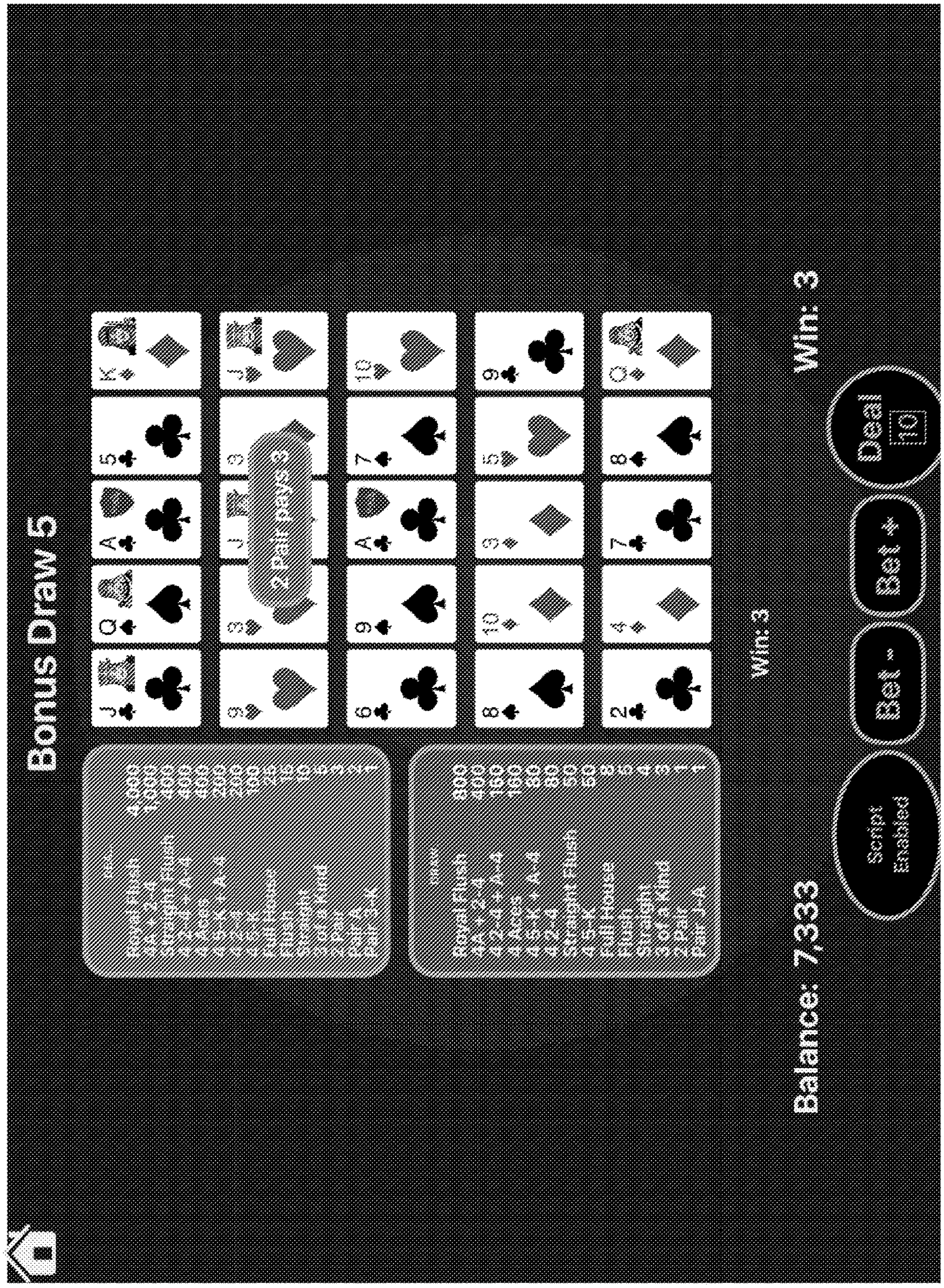
Figure 7:
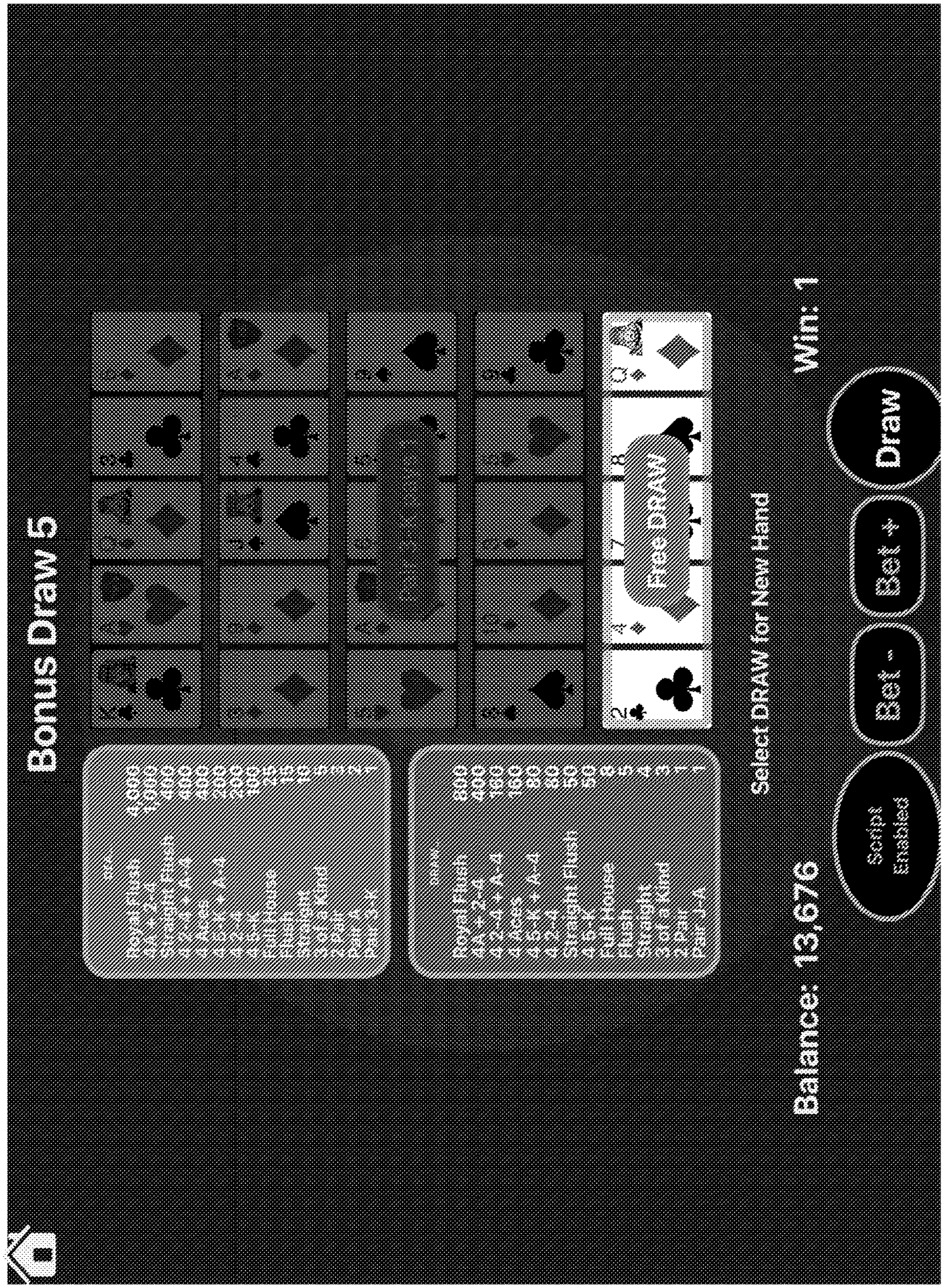
Figure 8:
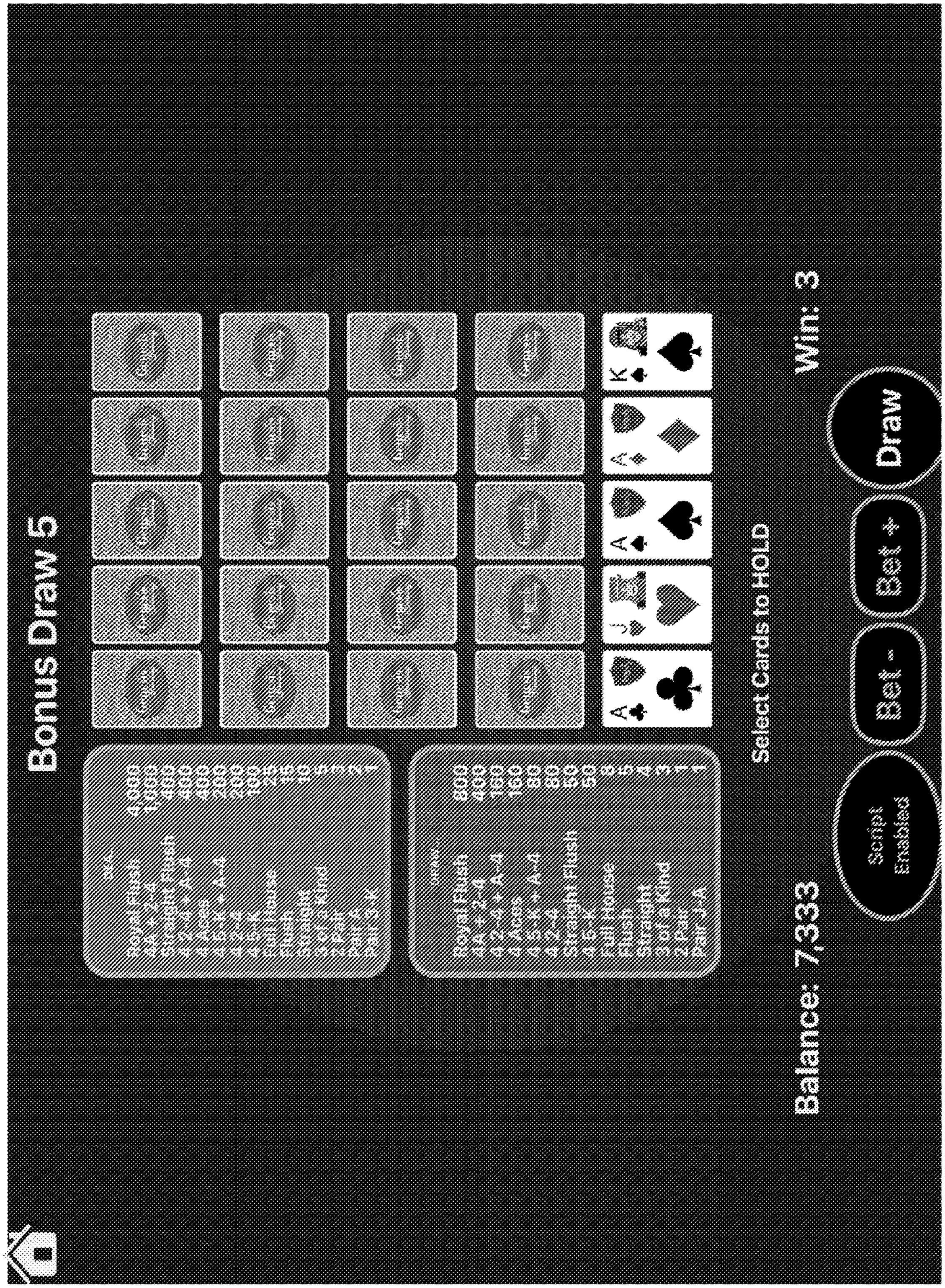
Figure 9:
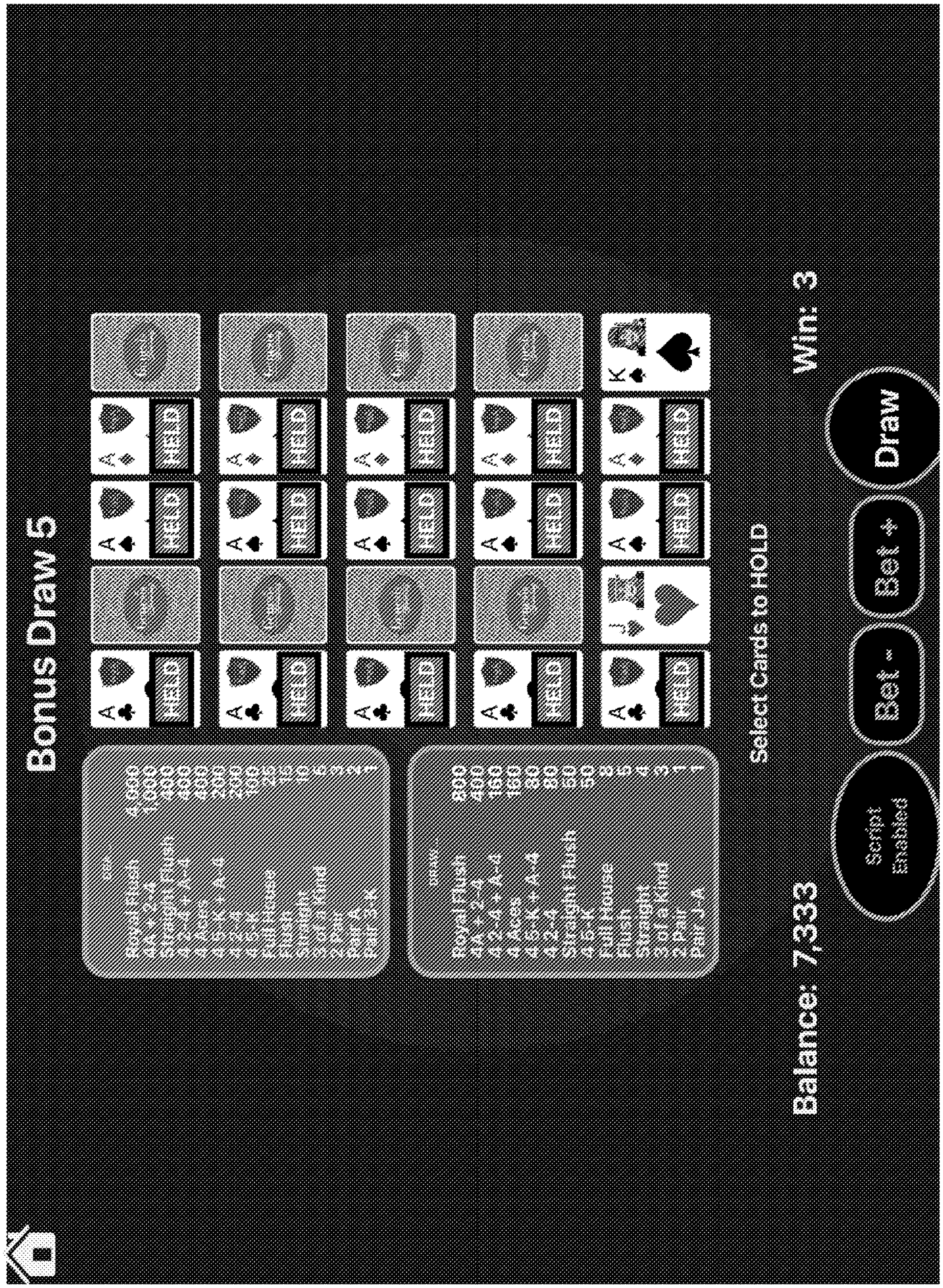
Figure 10:
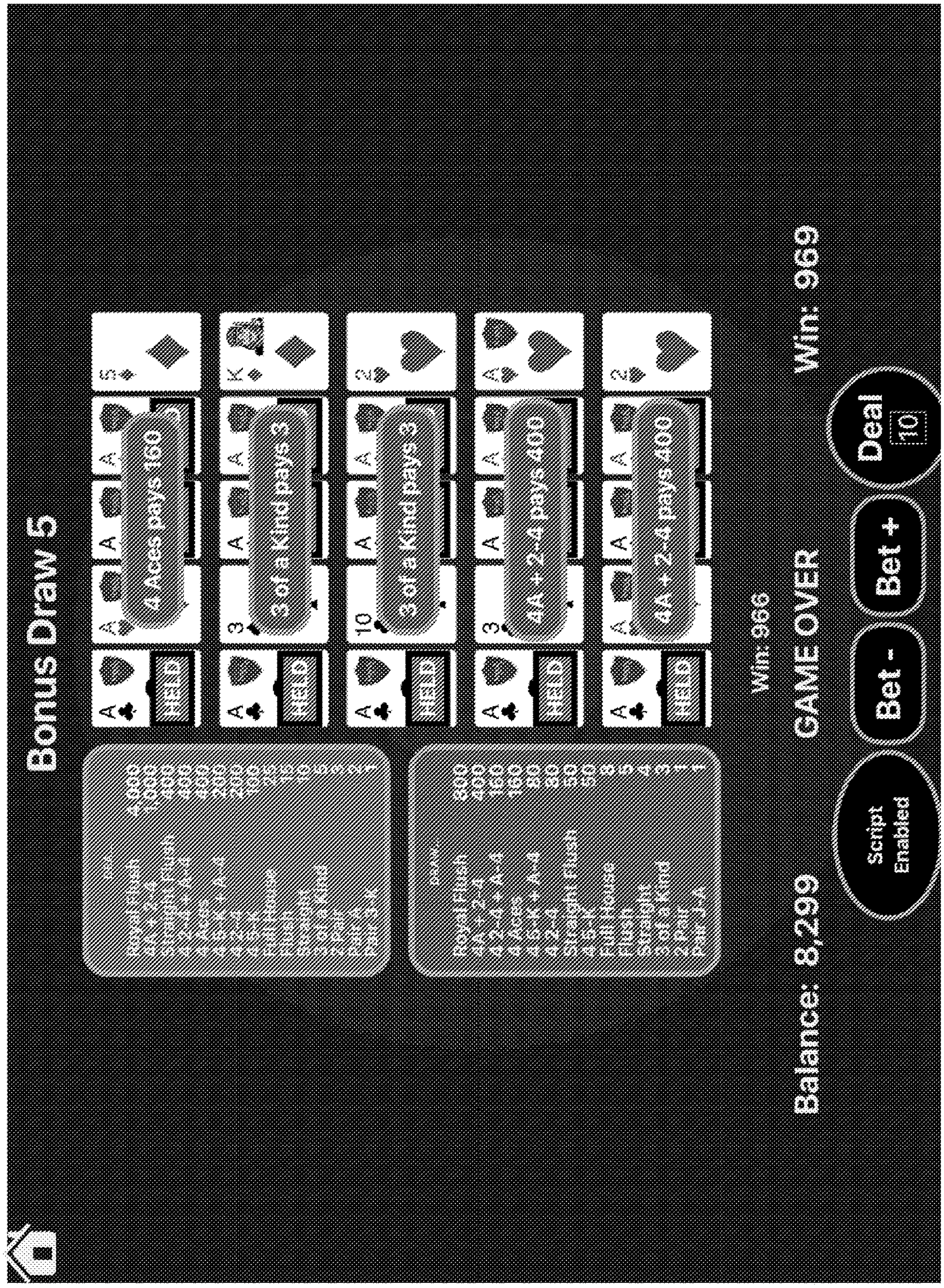
Figure 11:
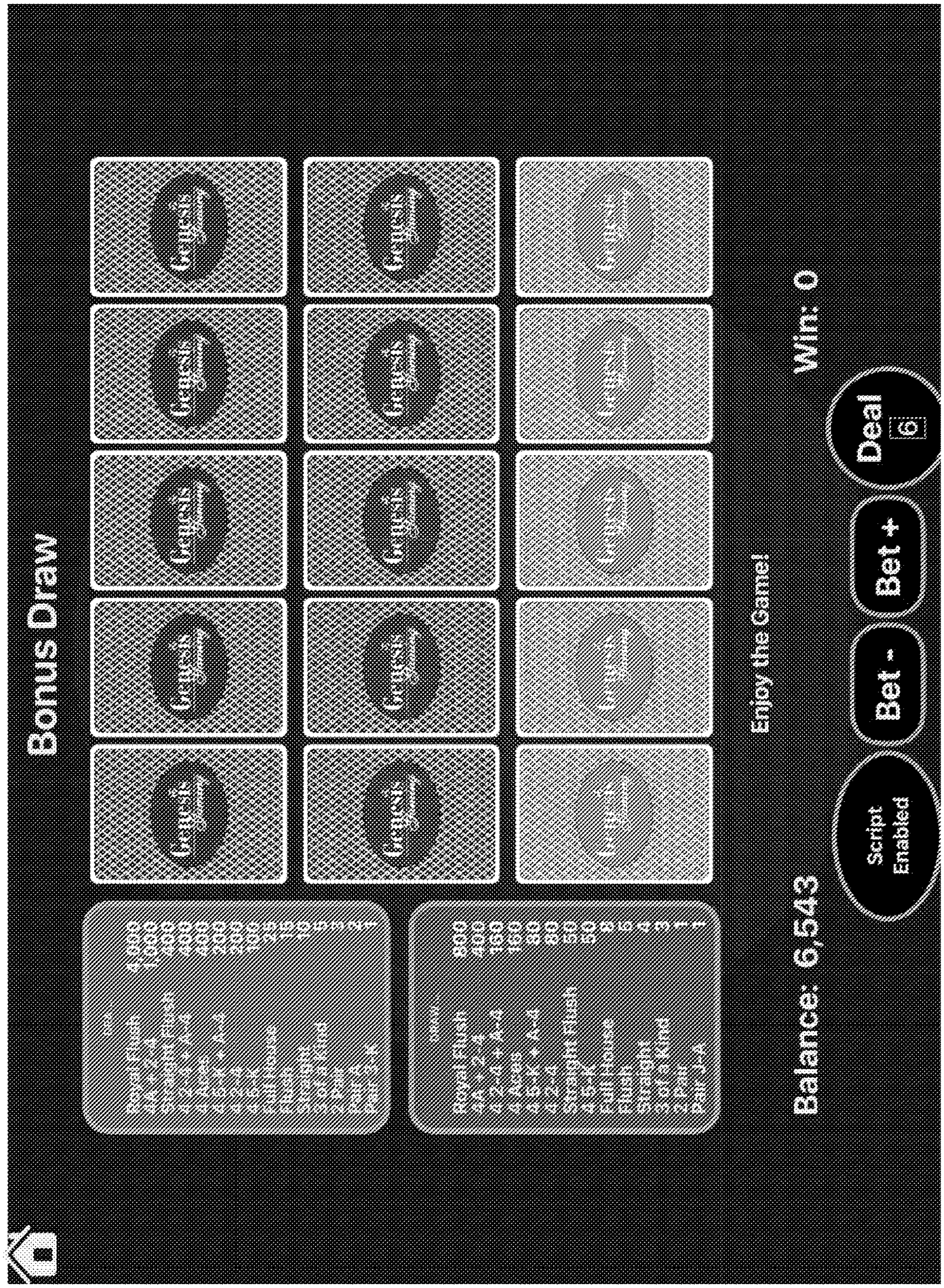
Figure 12:
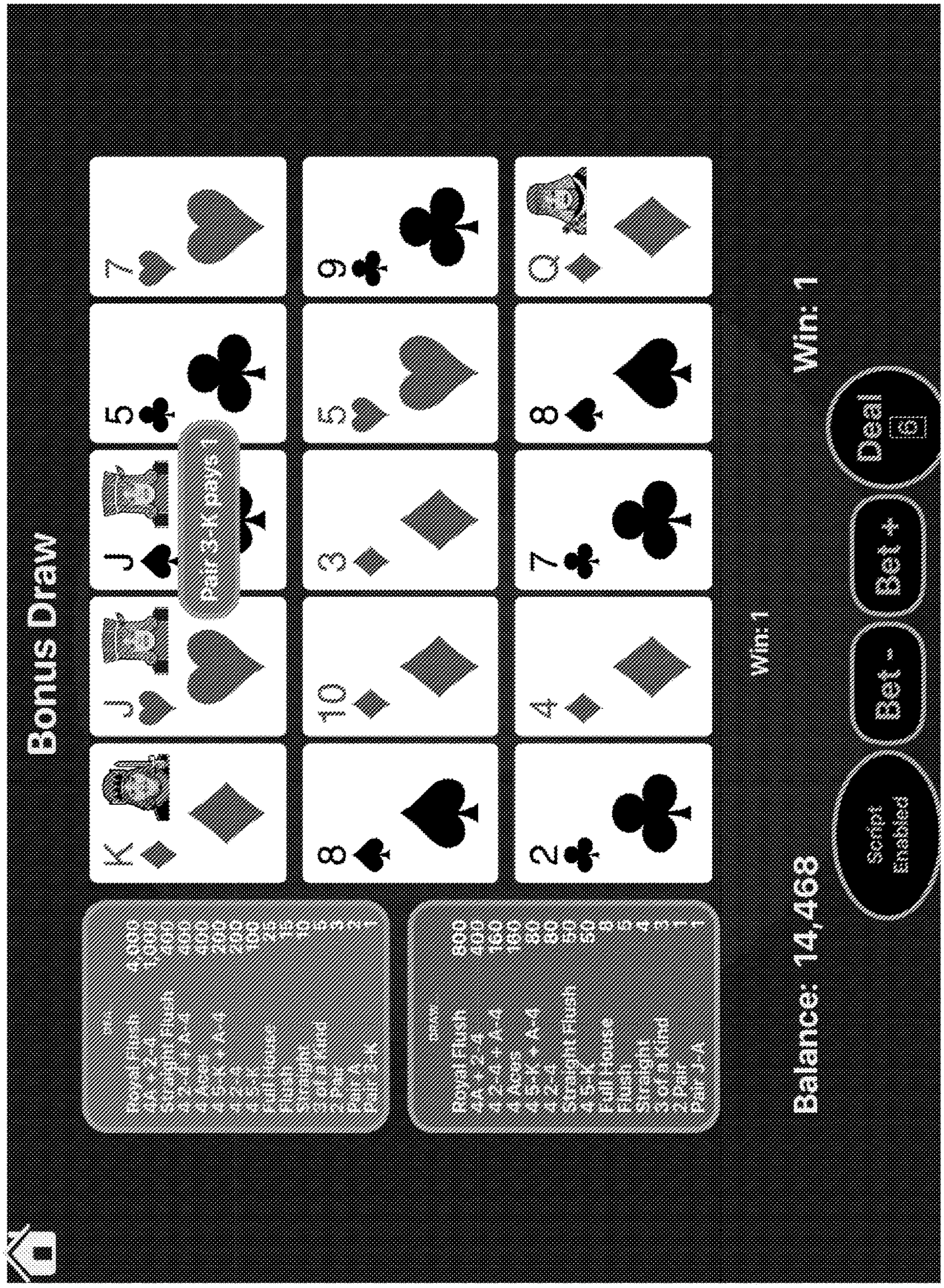
Figure 13:
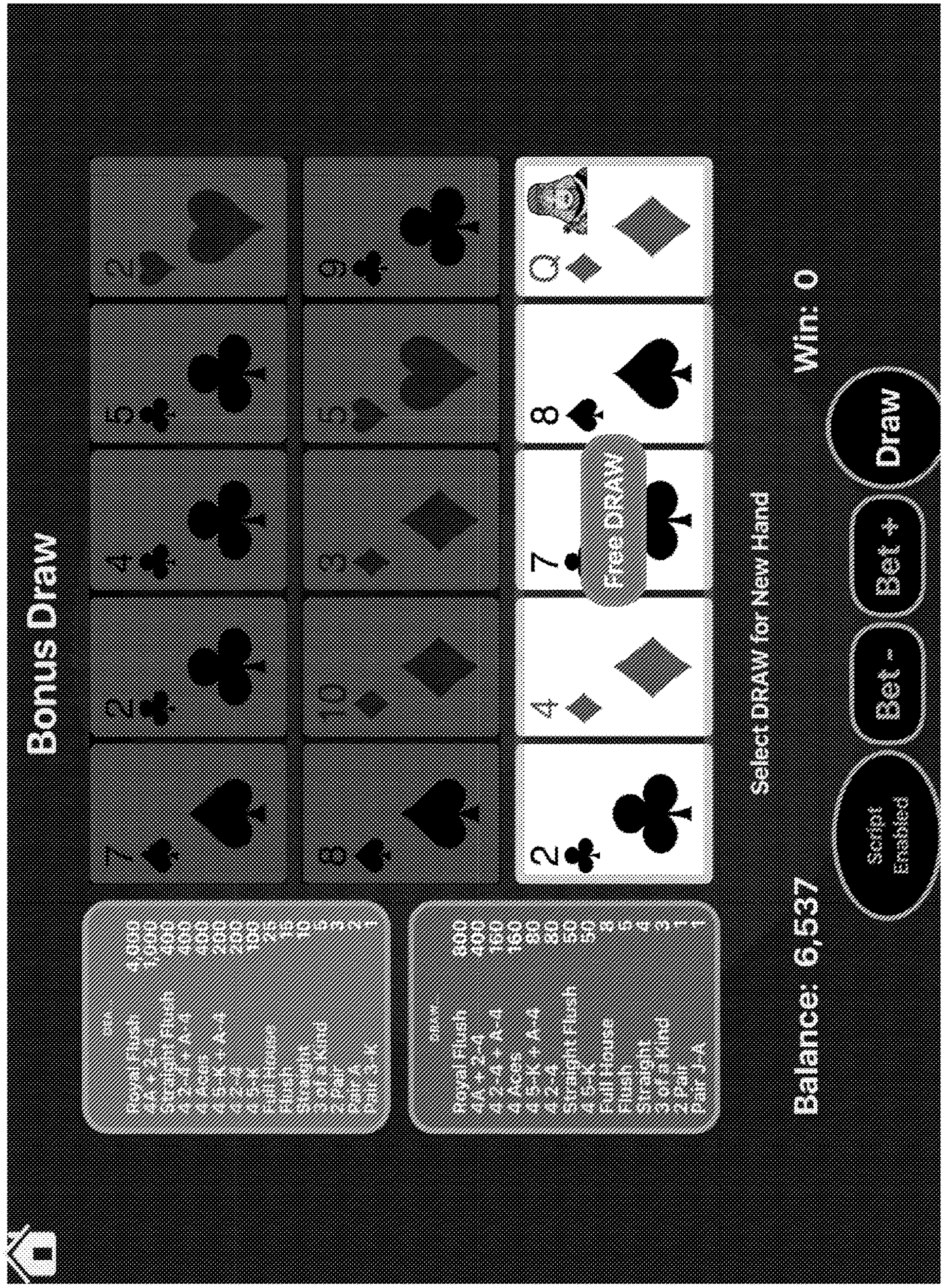
Figure 14:
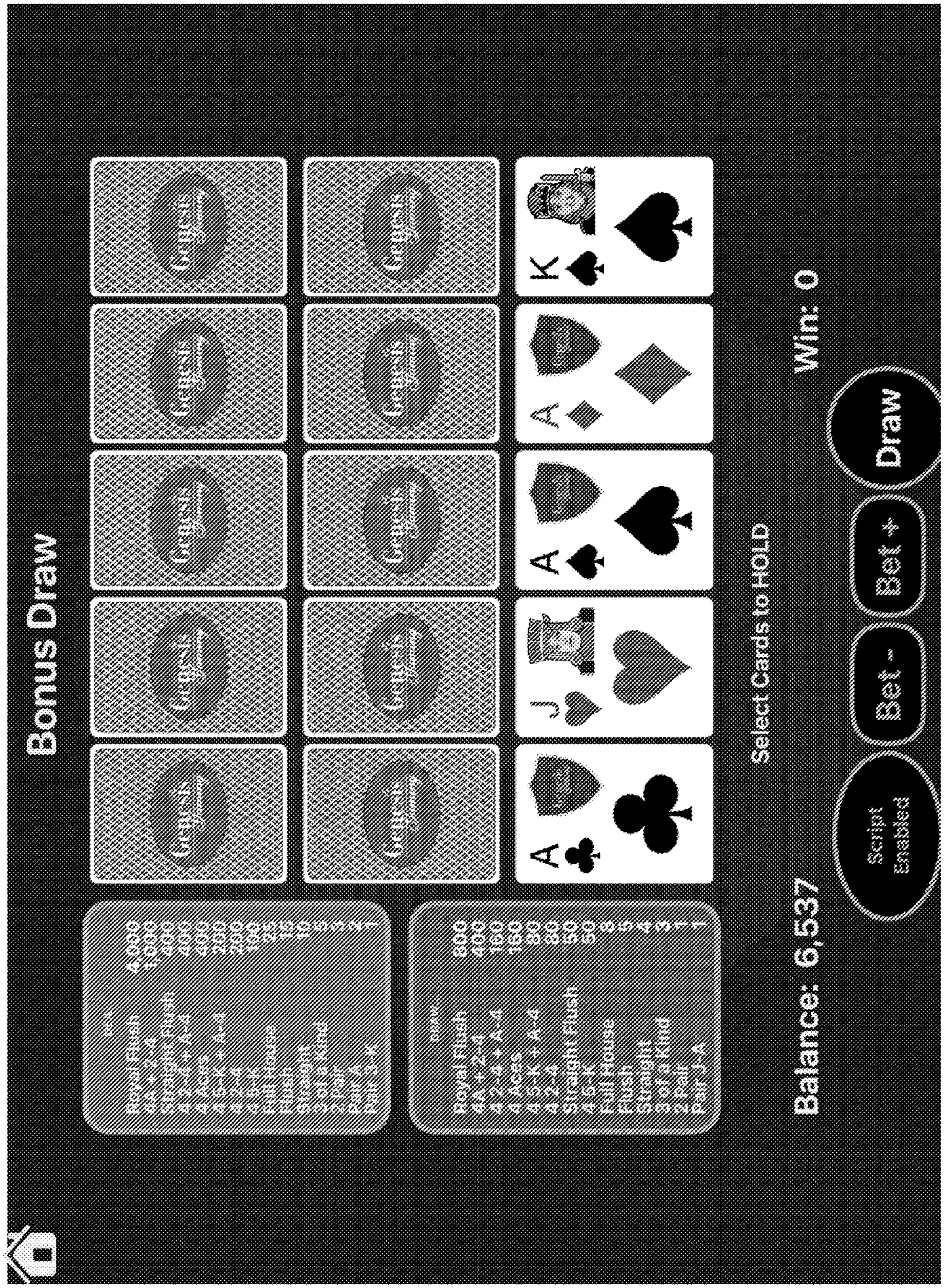
Figure 15:
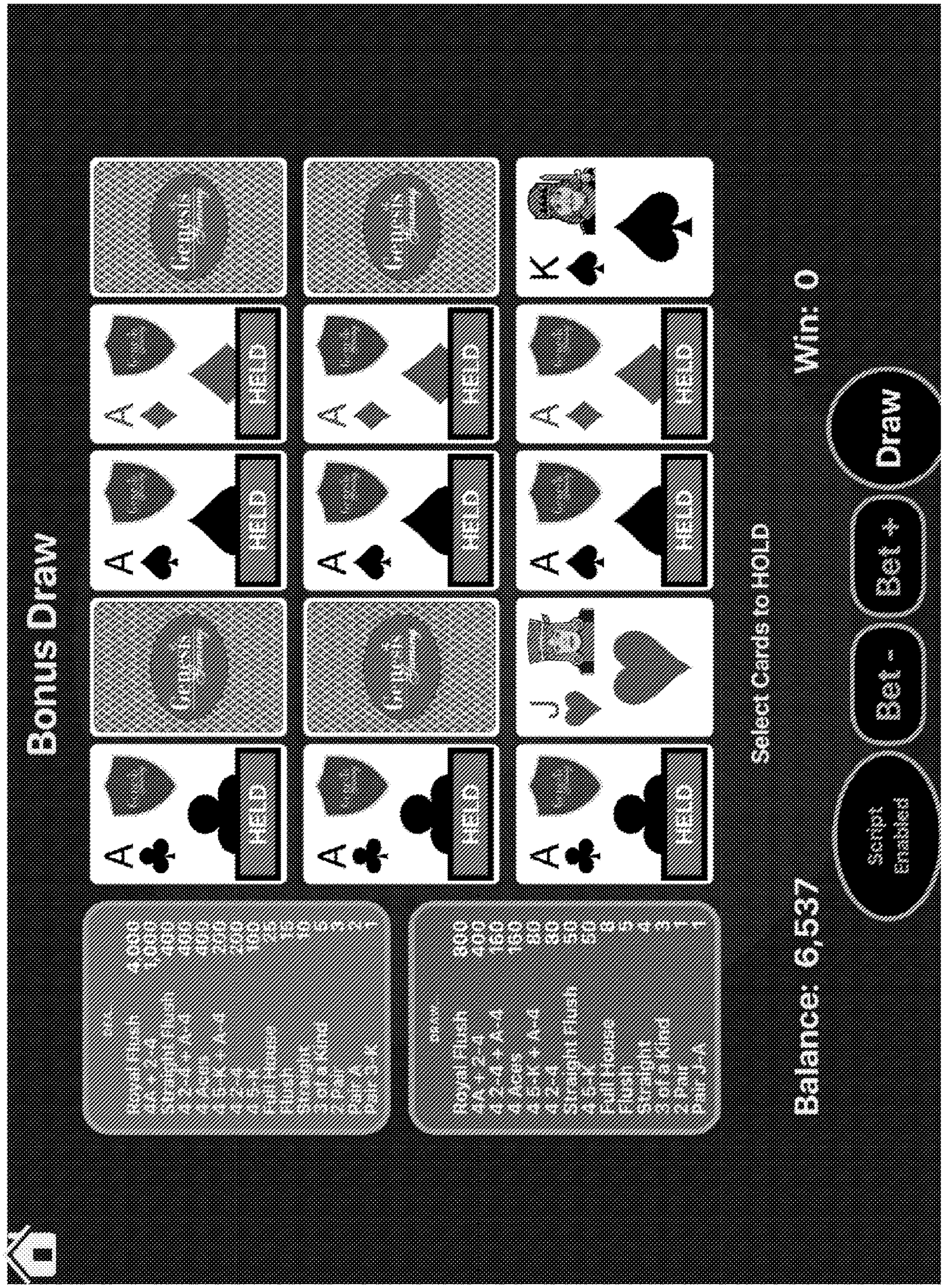
Figure 16:
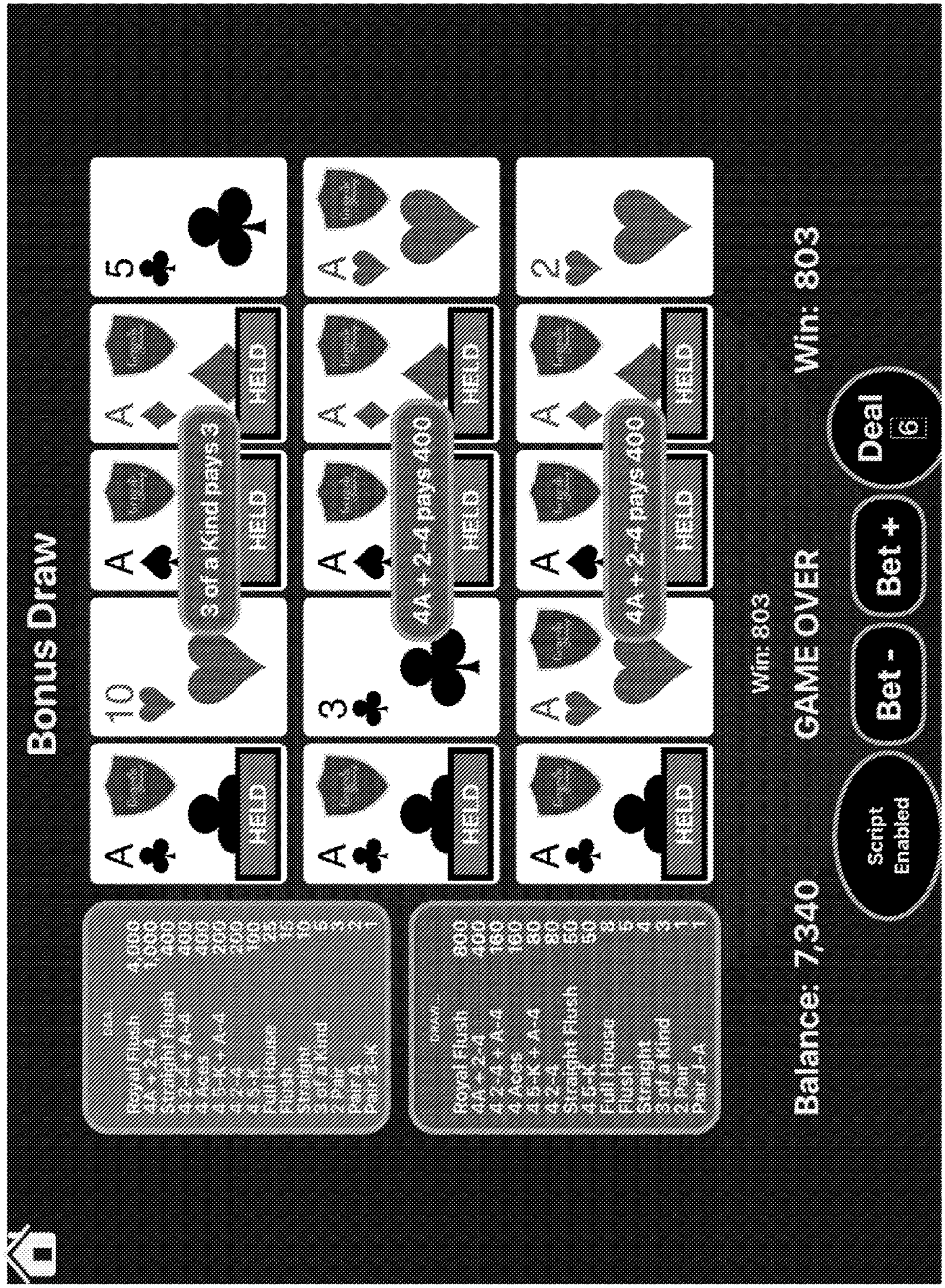
Figure 17A:
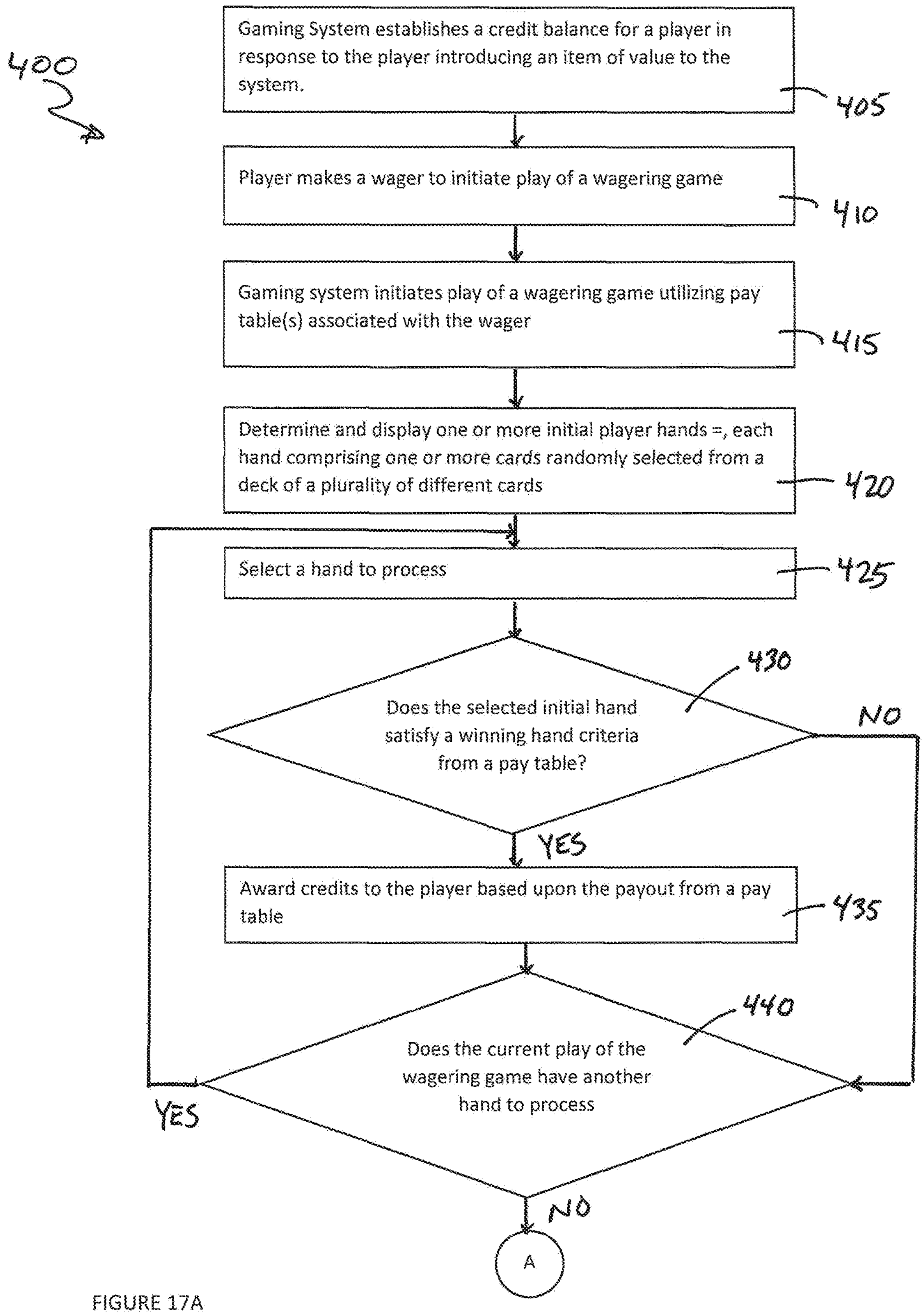
FIG. 17A-17F show a flowchart of a process or method of operating one example embodiment of the gaming system of the present disclosure to provide a play of one example embodiment of the wagering game with a second chance bonus feature of the present disclosure.
Figure 17B:
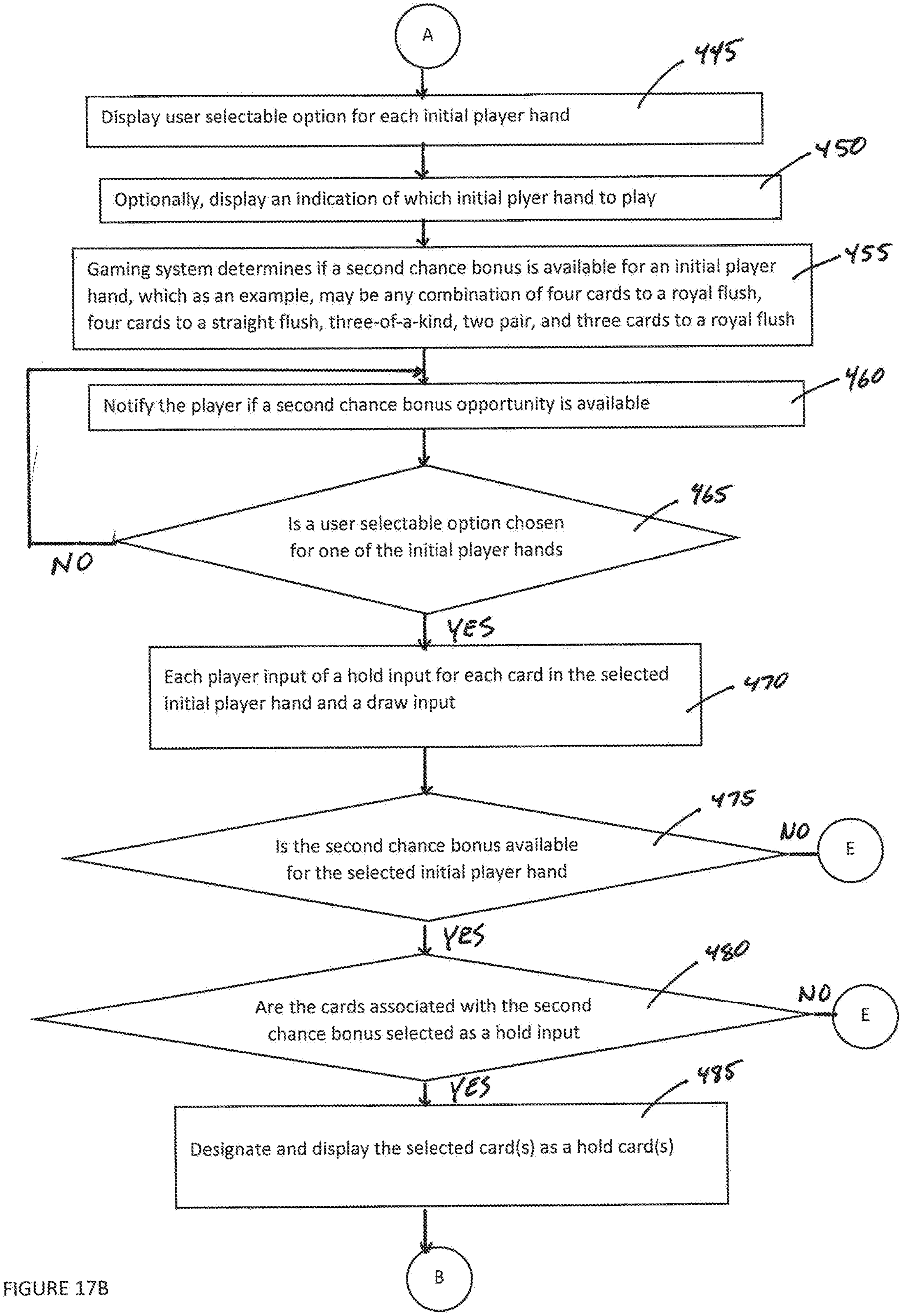
Figure 17C:
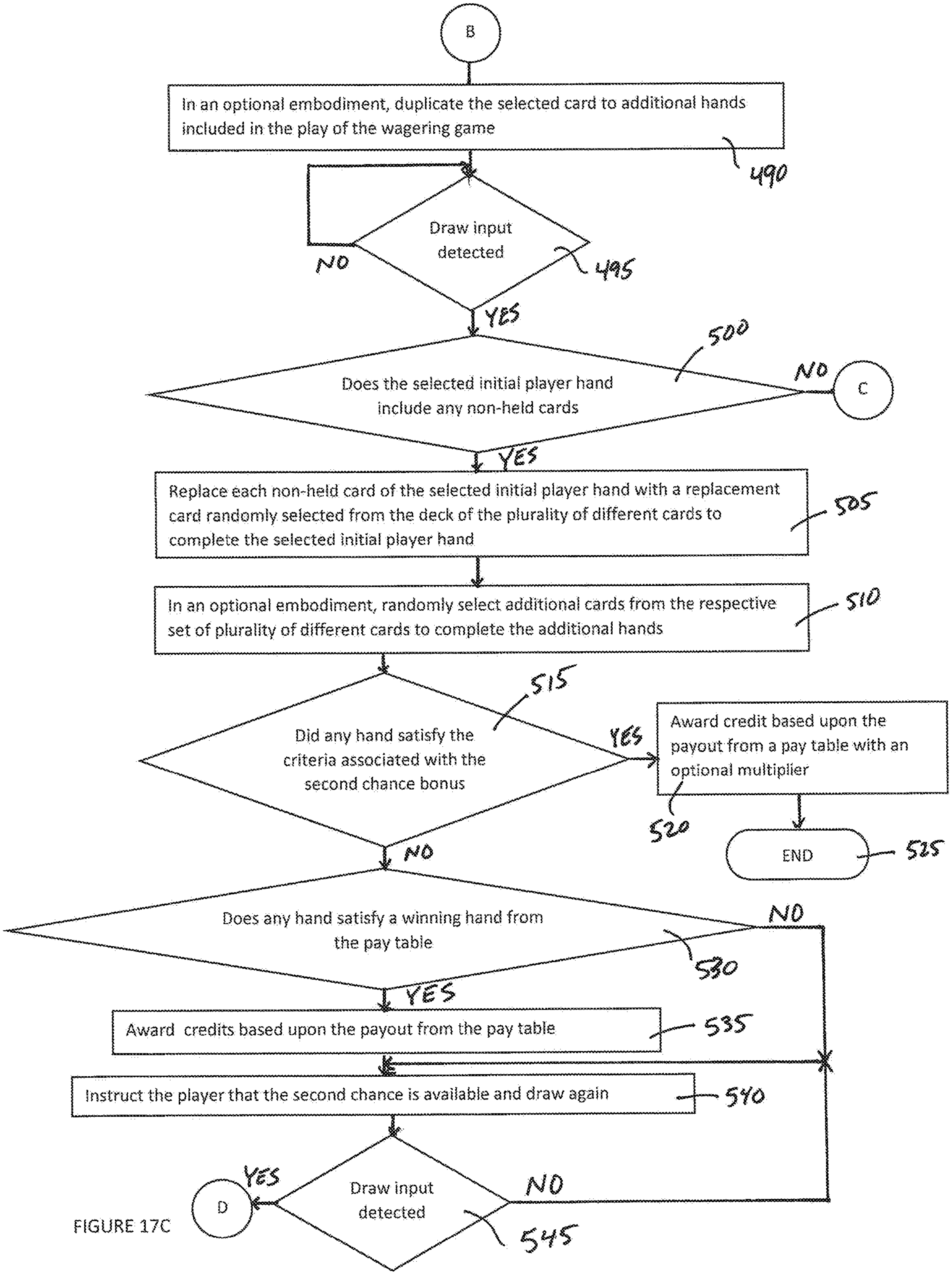
Figure 17D:
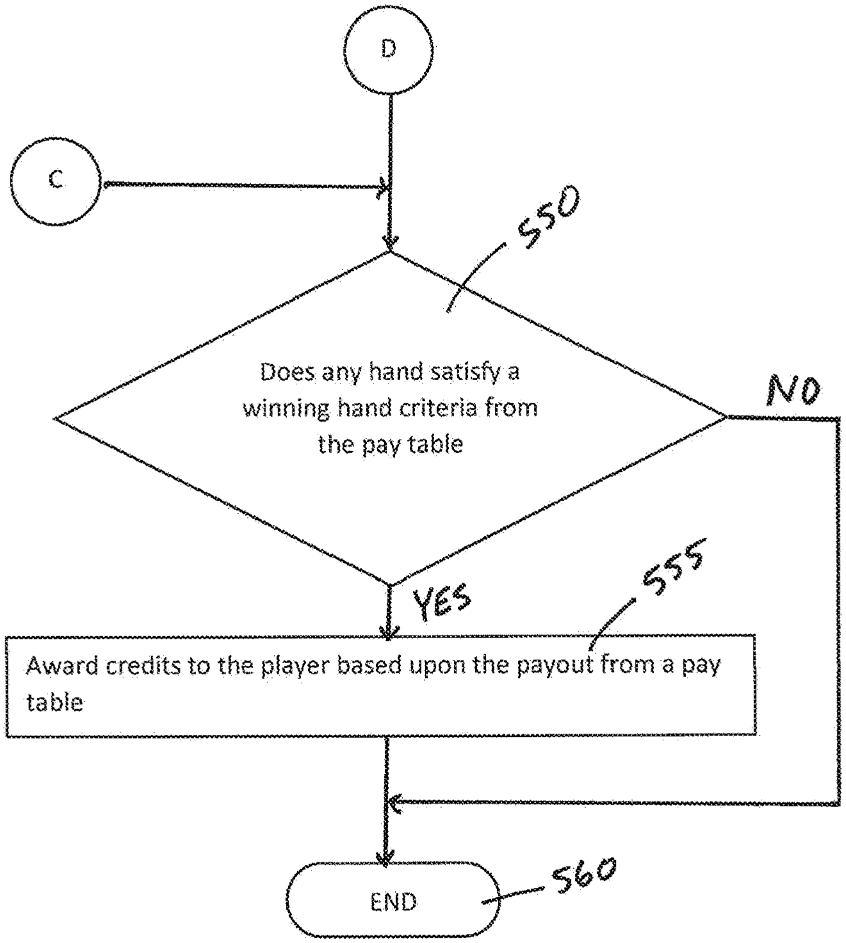
Figure 17E:
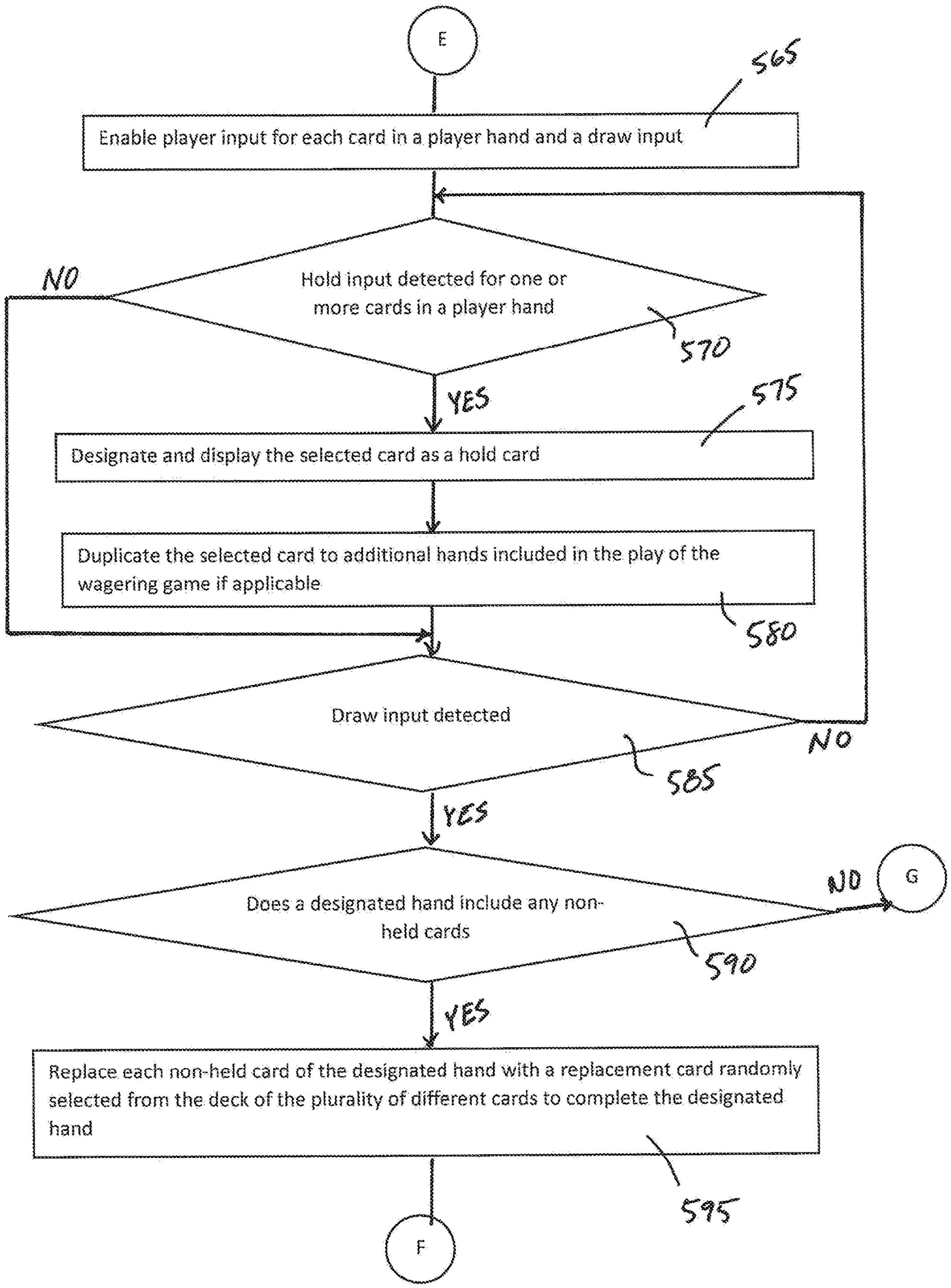
Figure 17F:
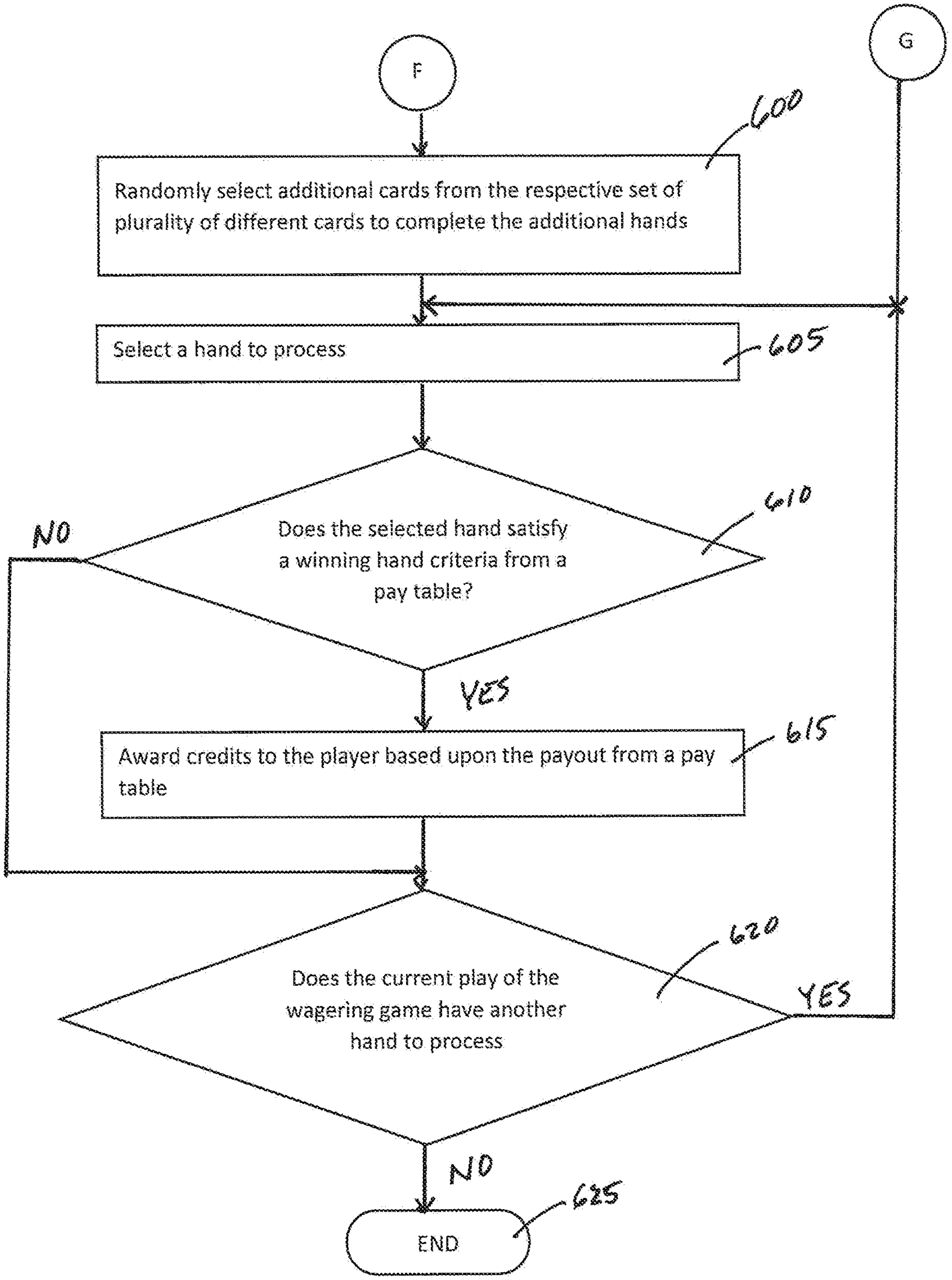
Figure 18:
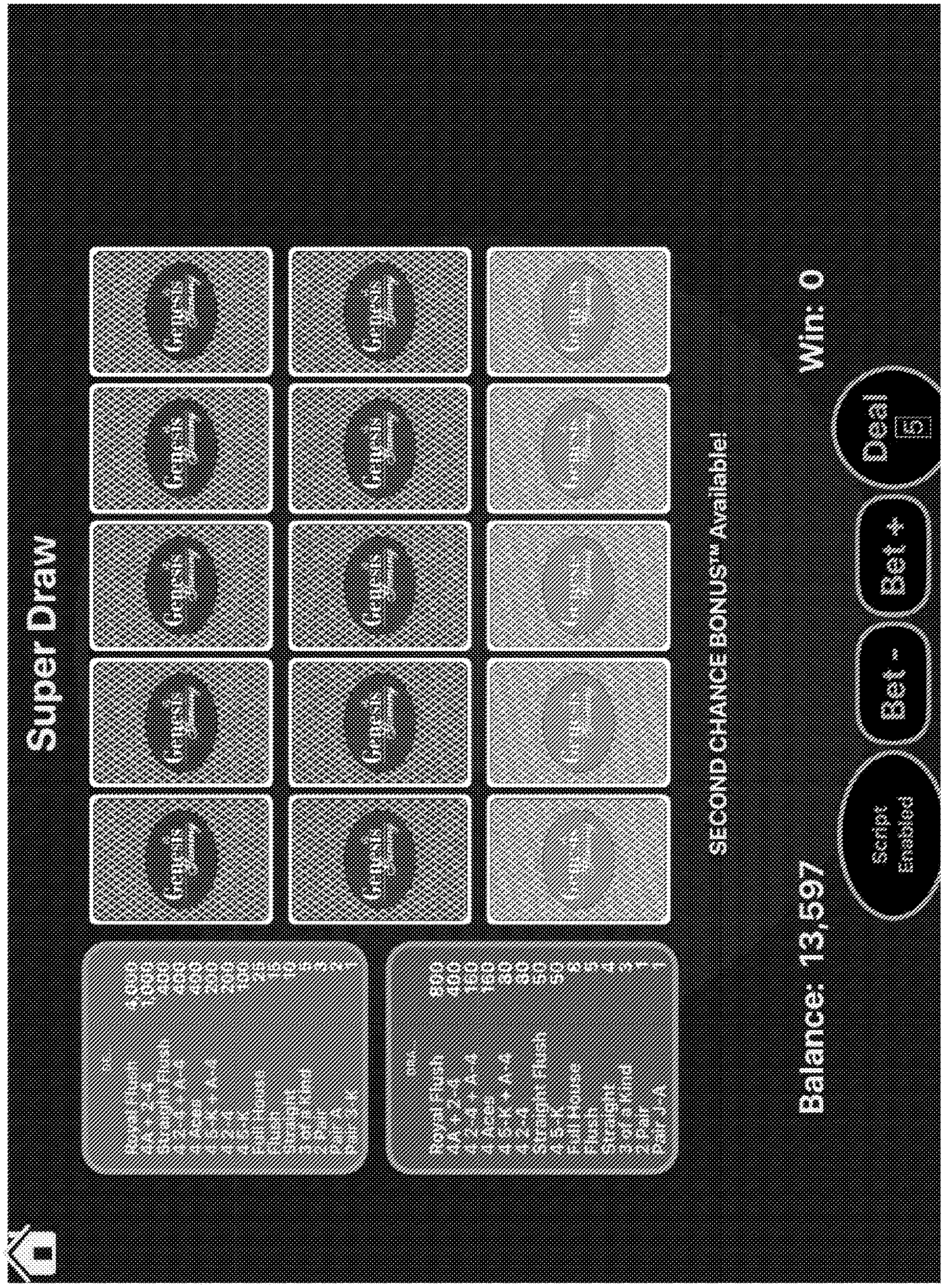
FIGS. 18 to 31 illustrate screen shots of one example embodiment of a gaming system of the present disclosure providing a play of a gaming session of one example embodiment of the wagering game with the second chance bonus feature of the present disclosure.
Figure 19:
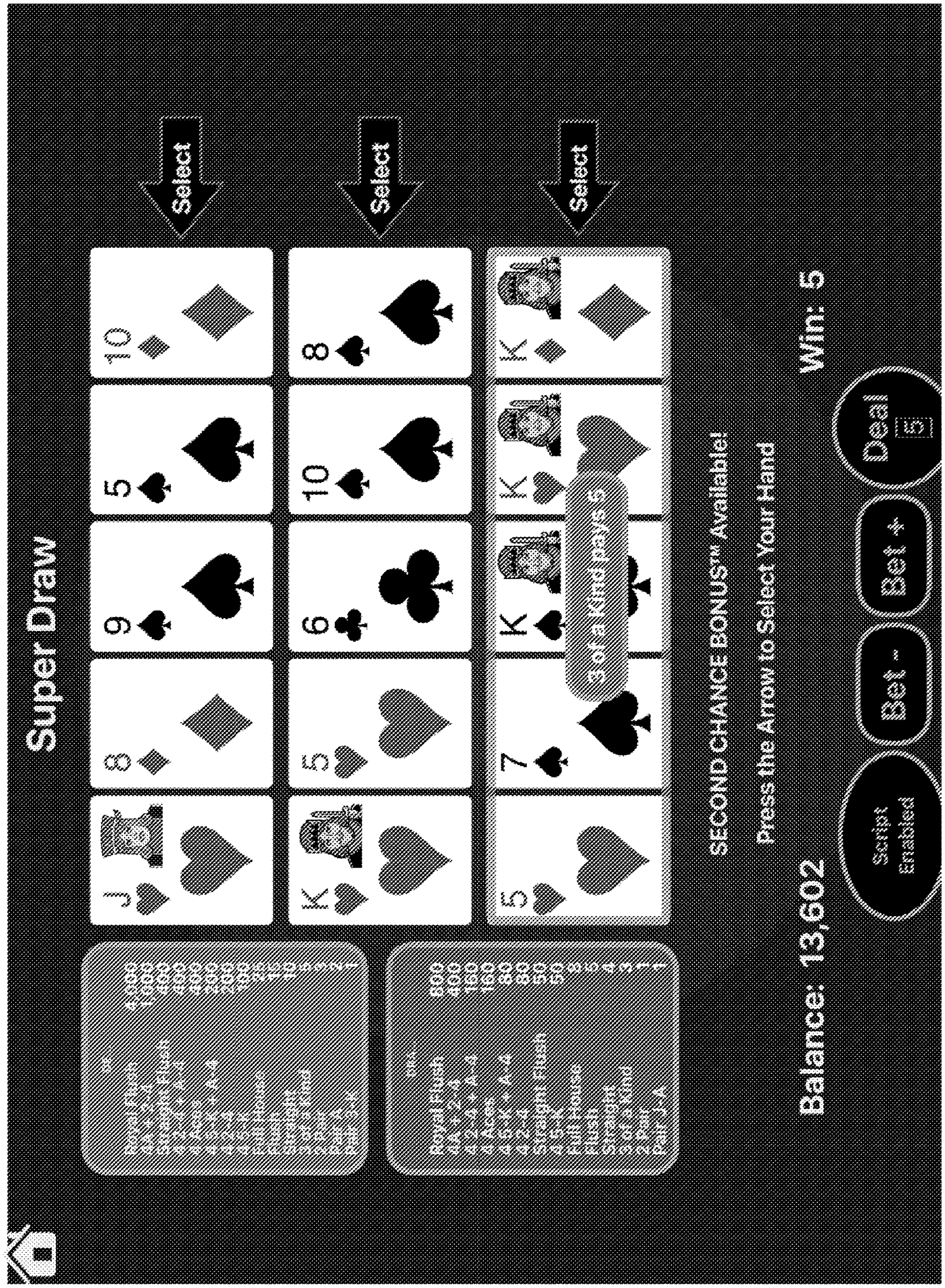
Figure 20:
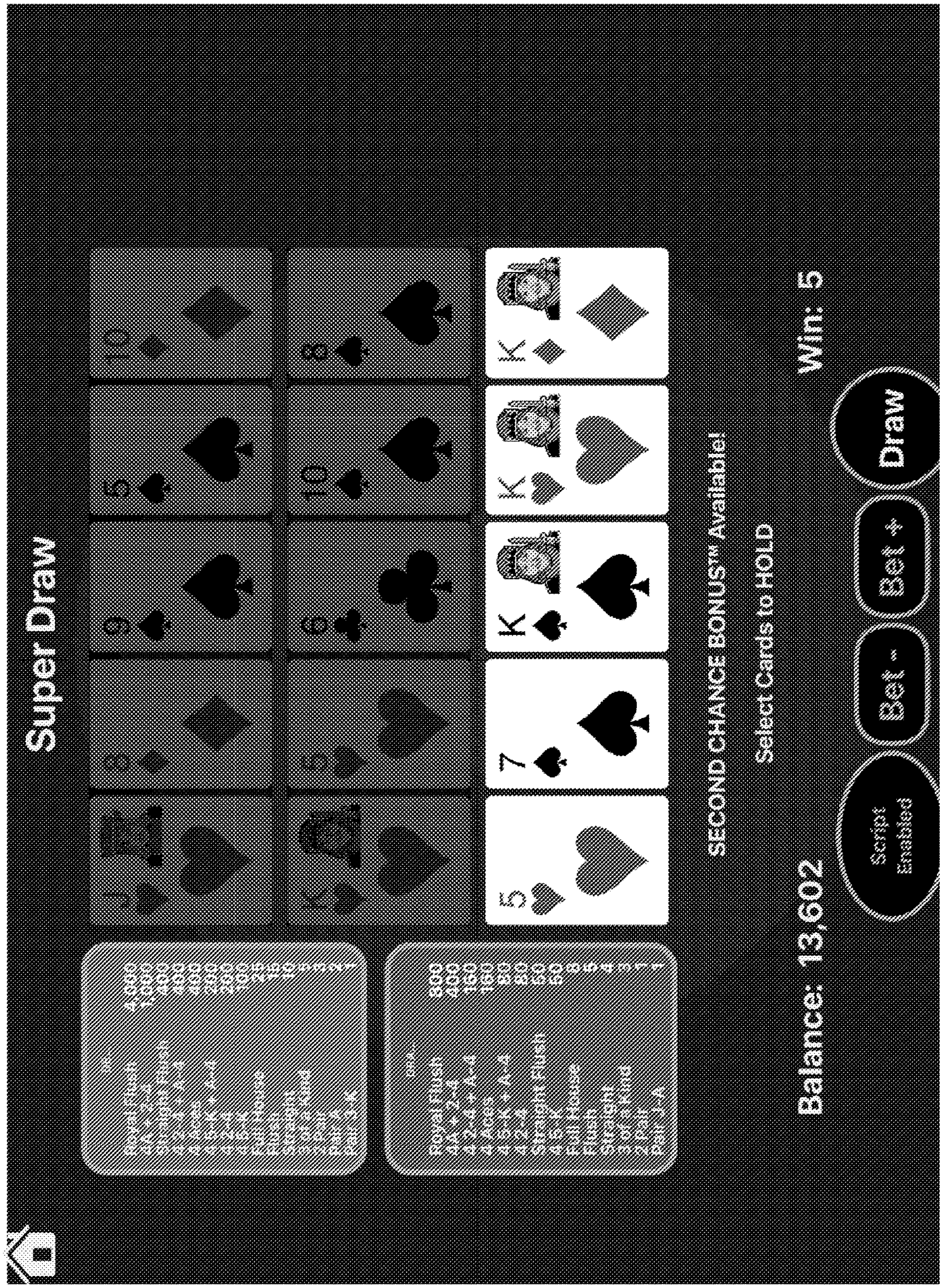
Figure 21:
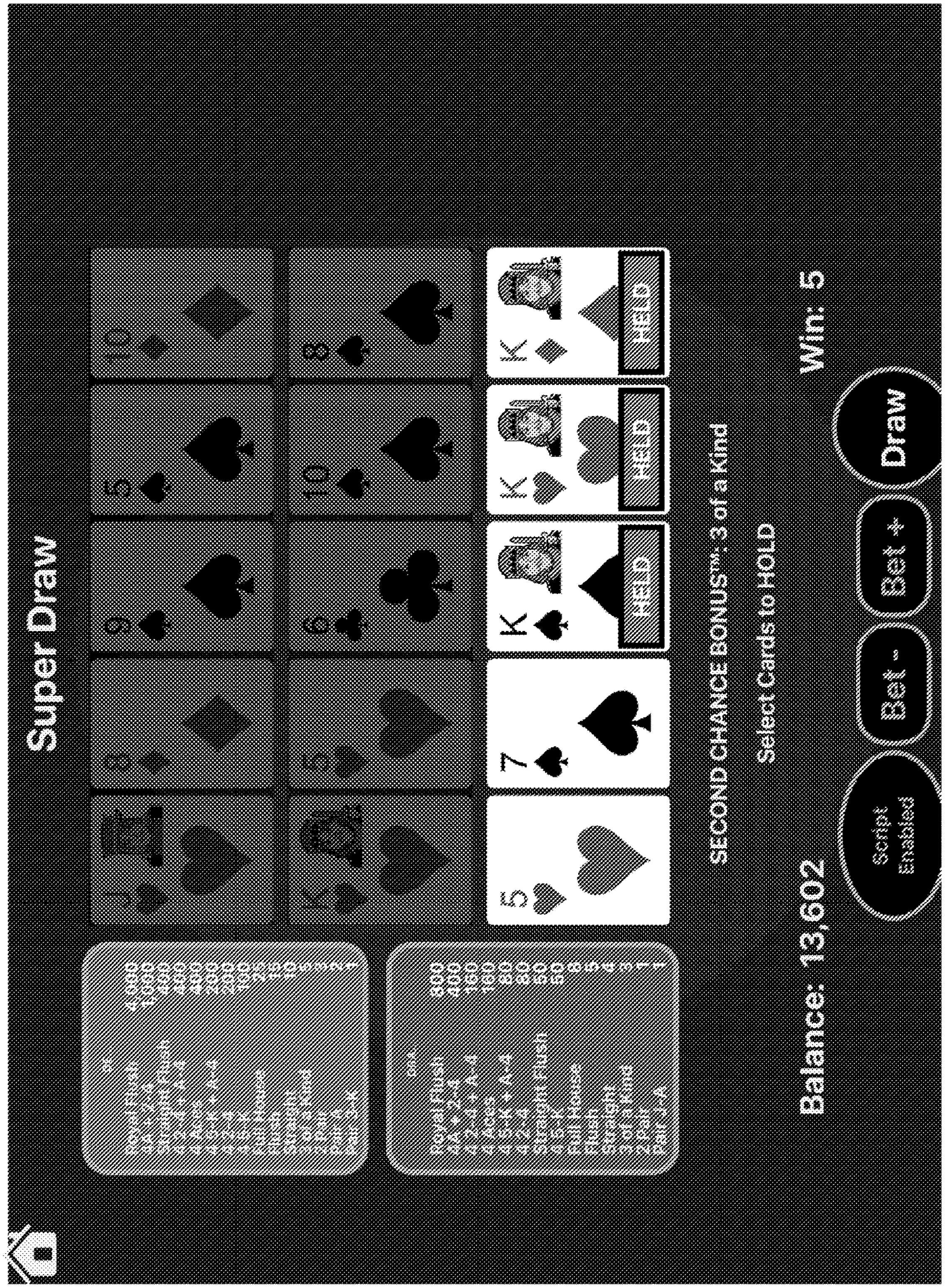
Figure 22:
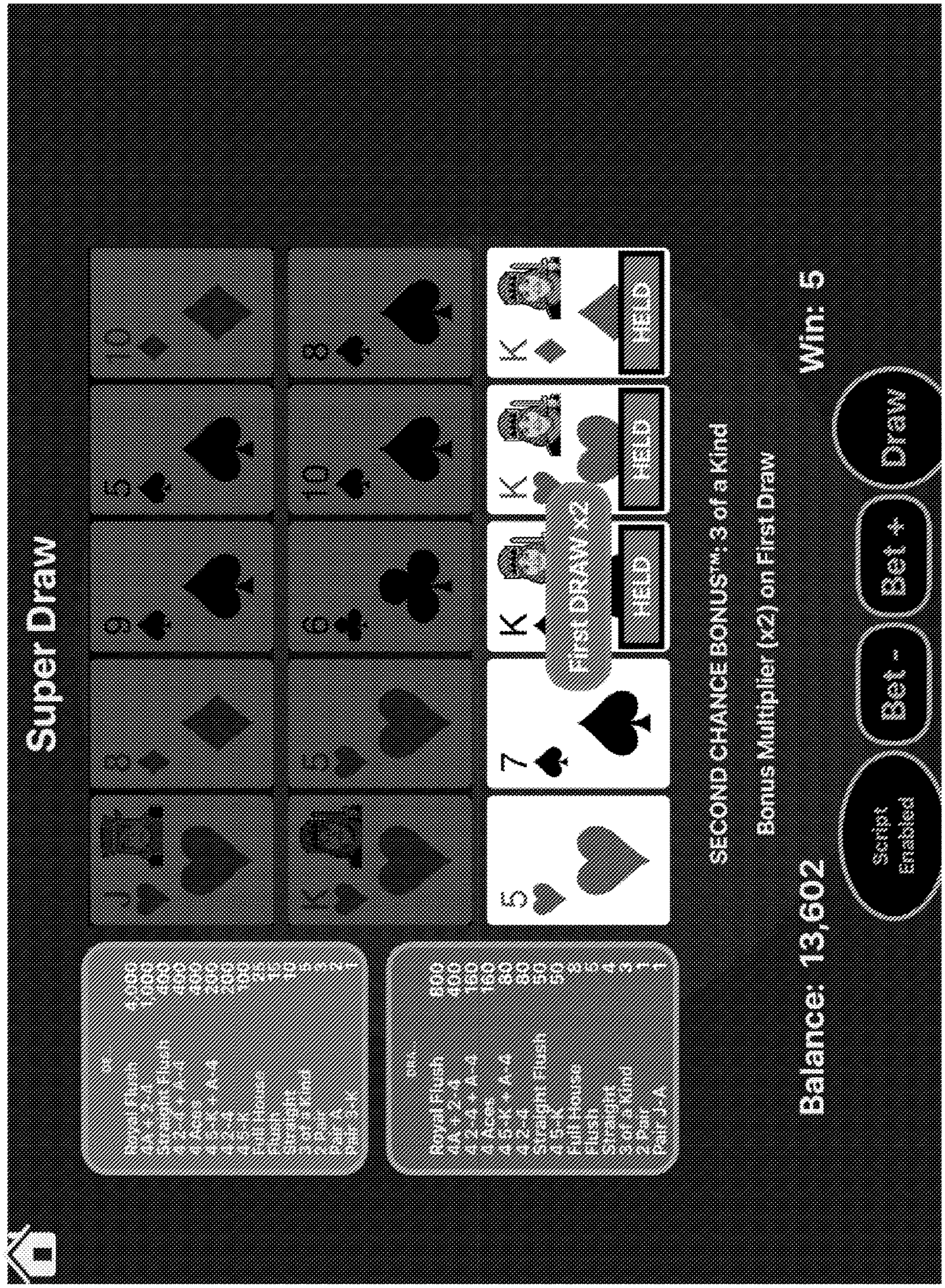
Figure 23:
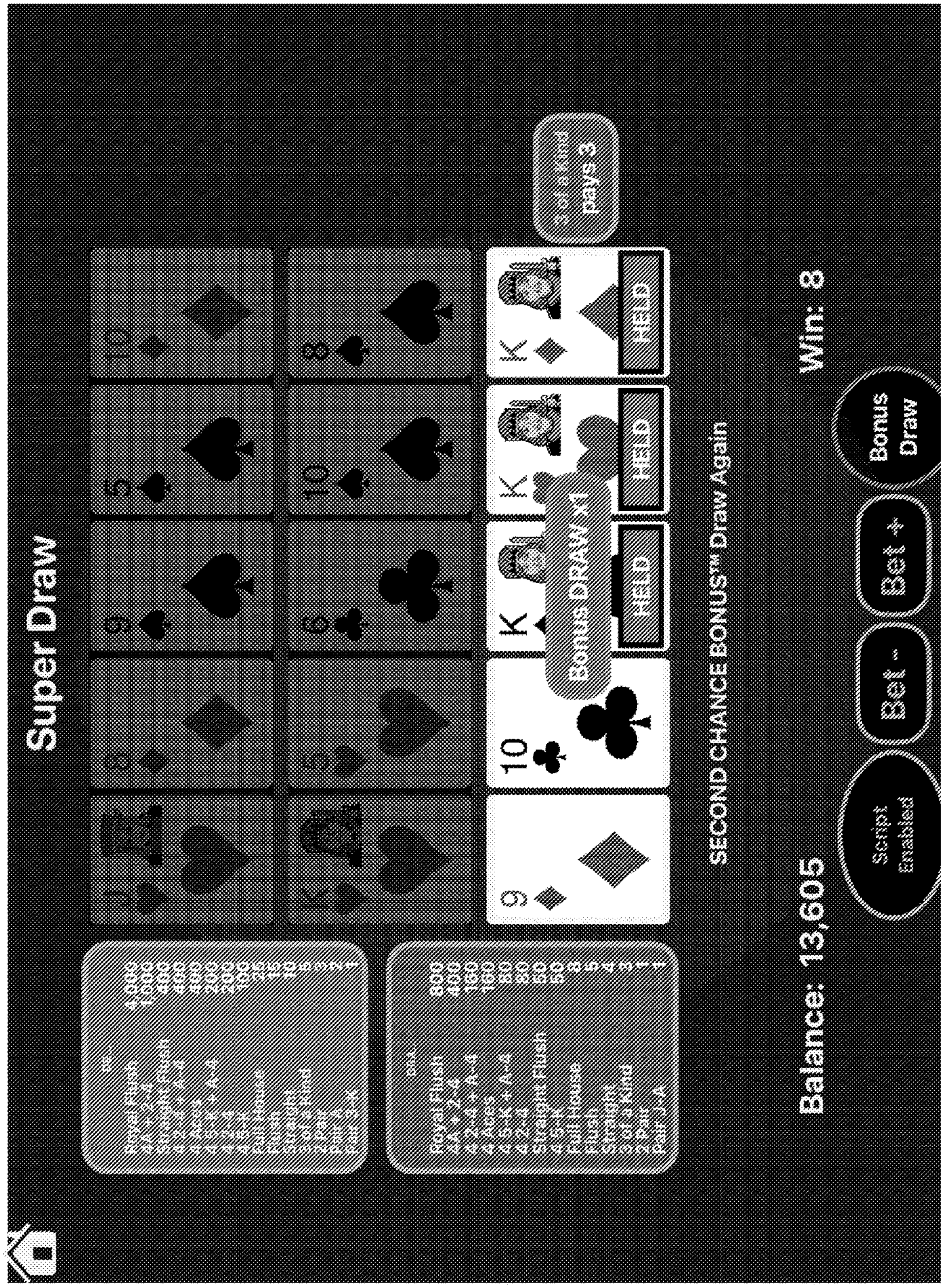
Figure 24:
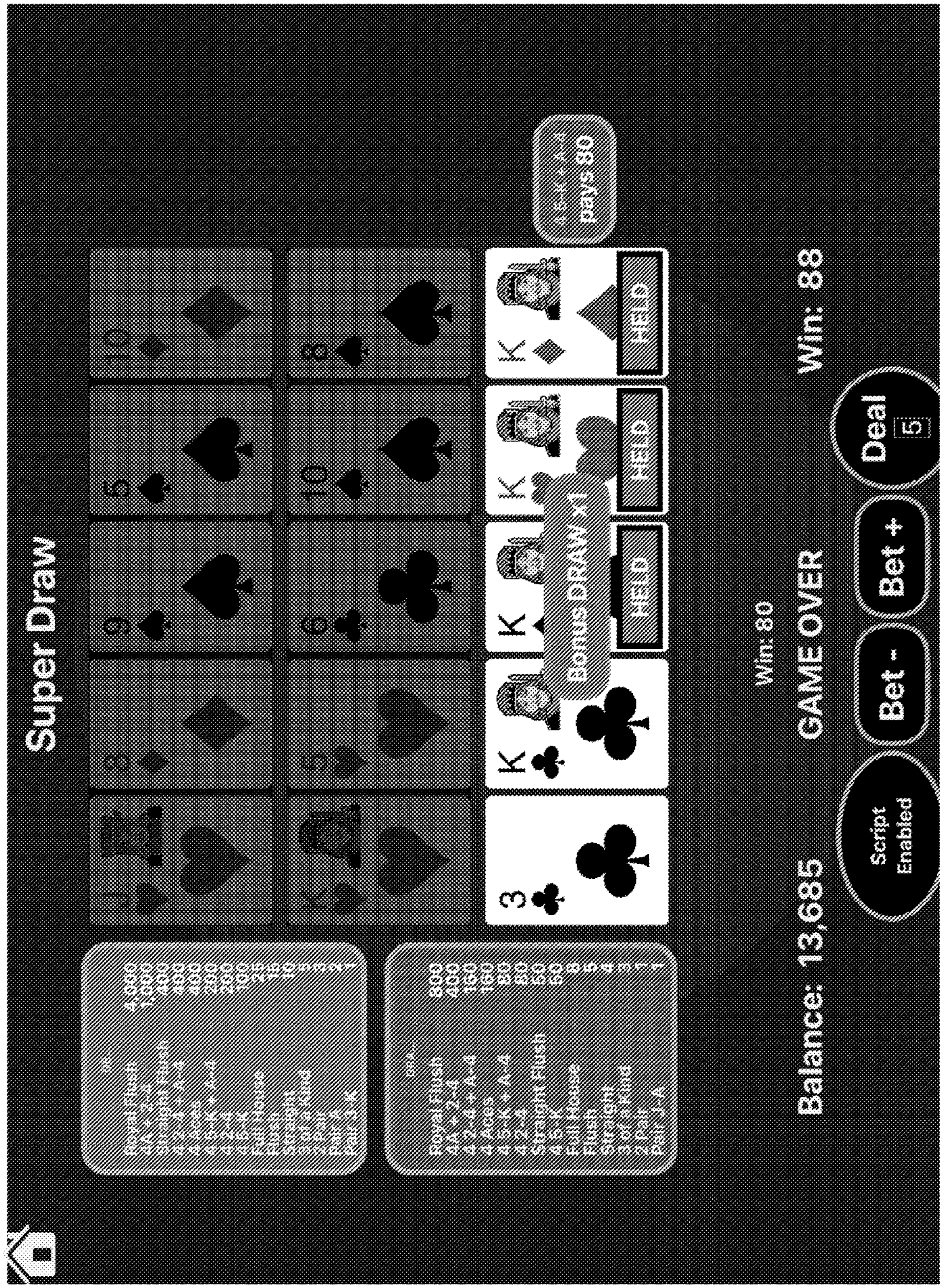
Figure 25:
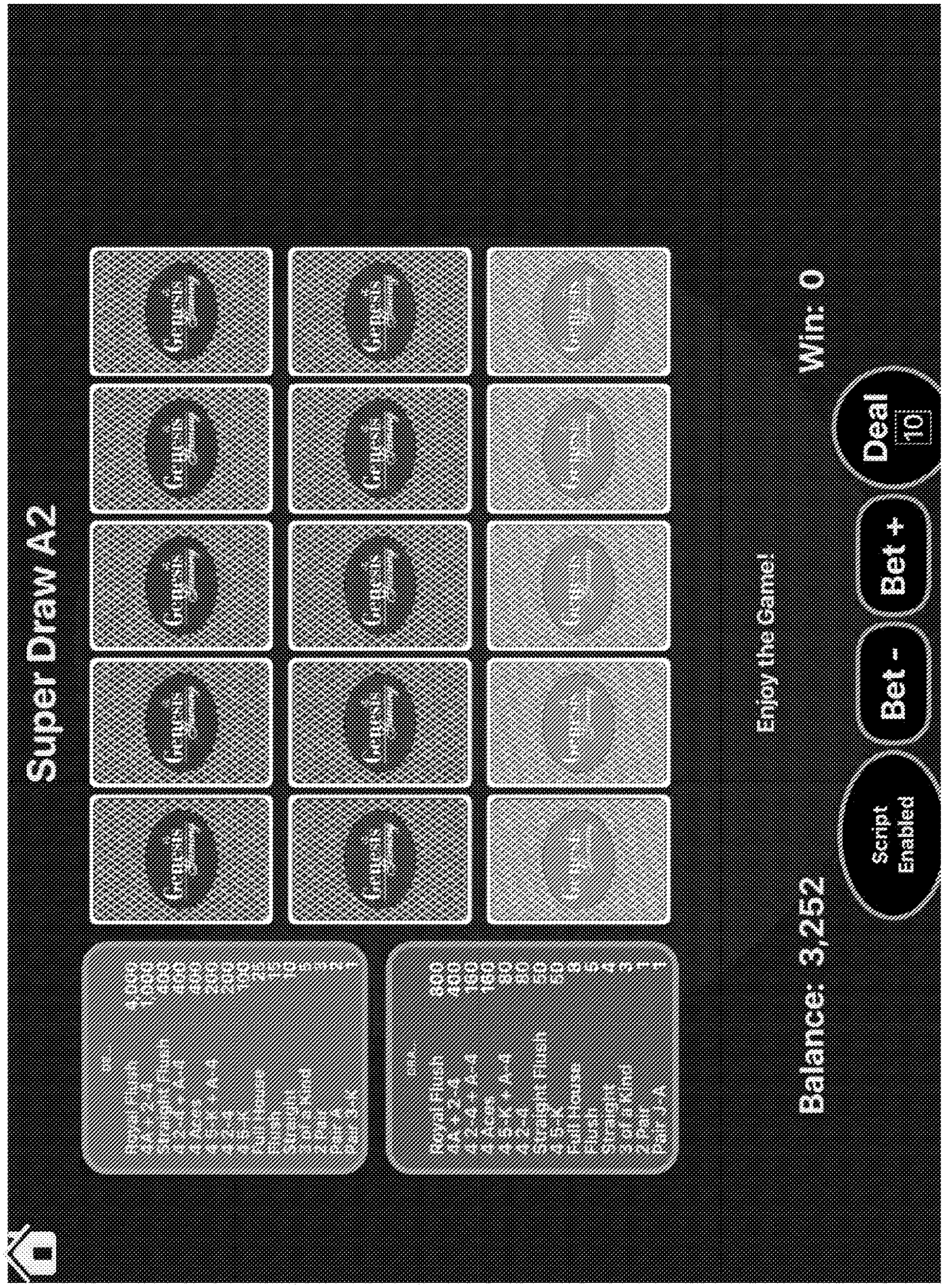
Figure 26:
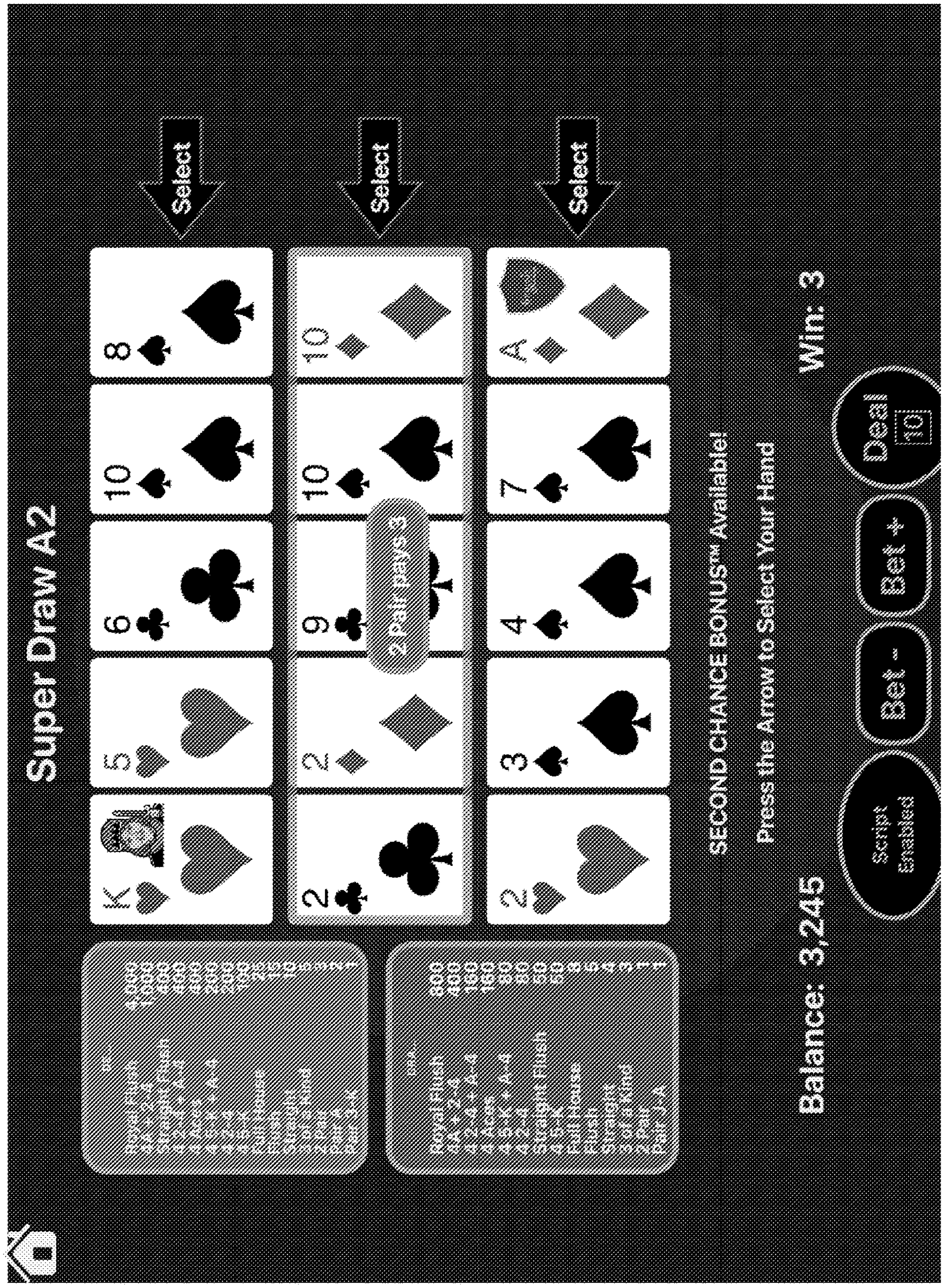
Figure 27:
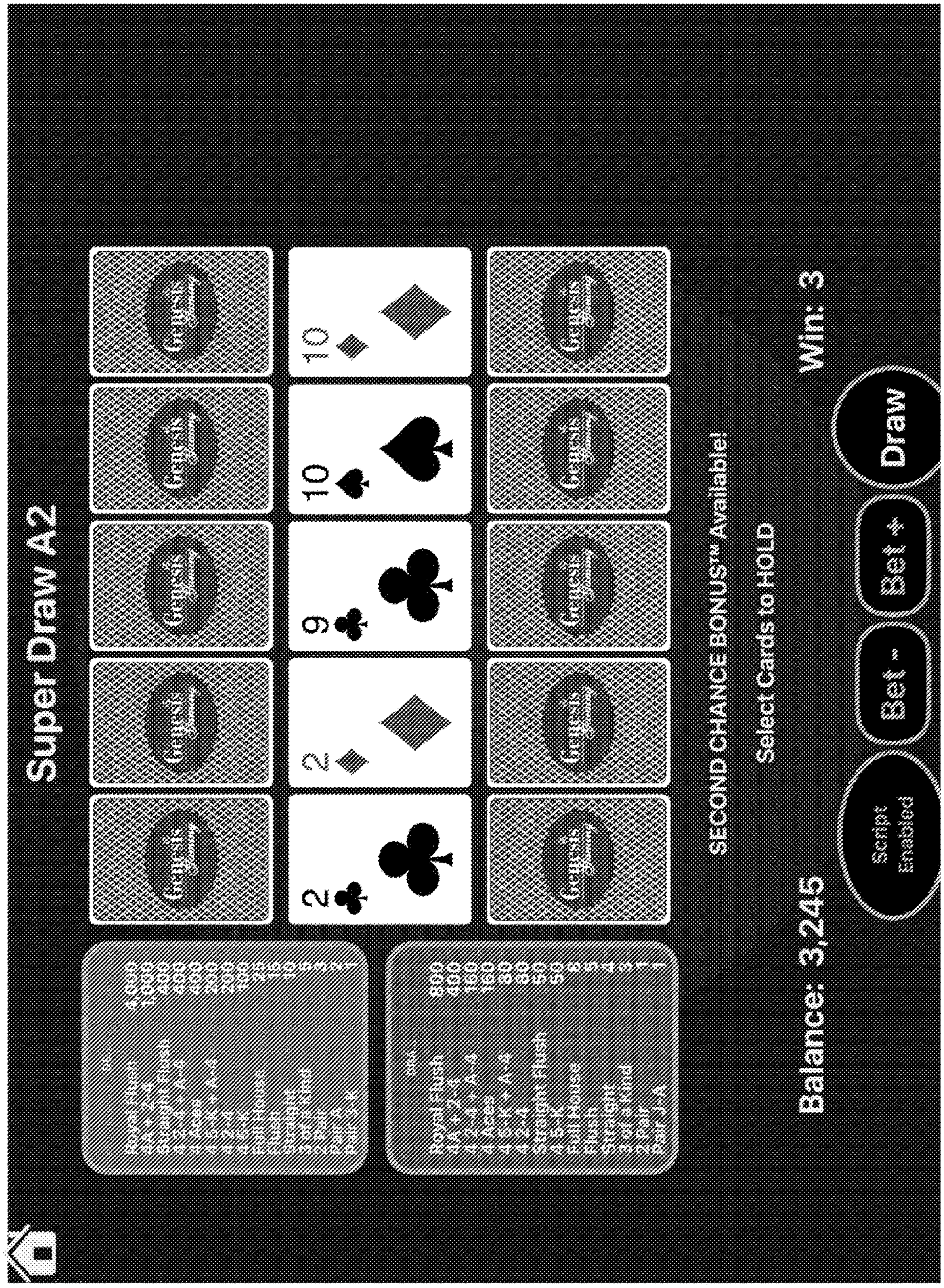
Figure 28:
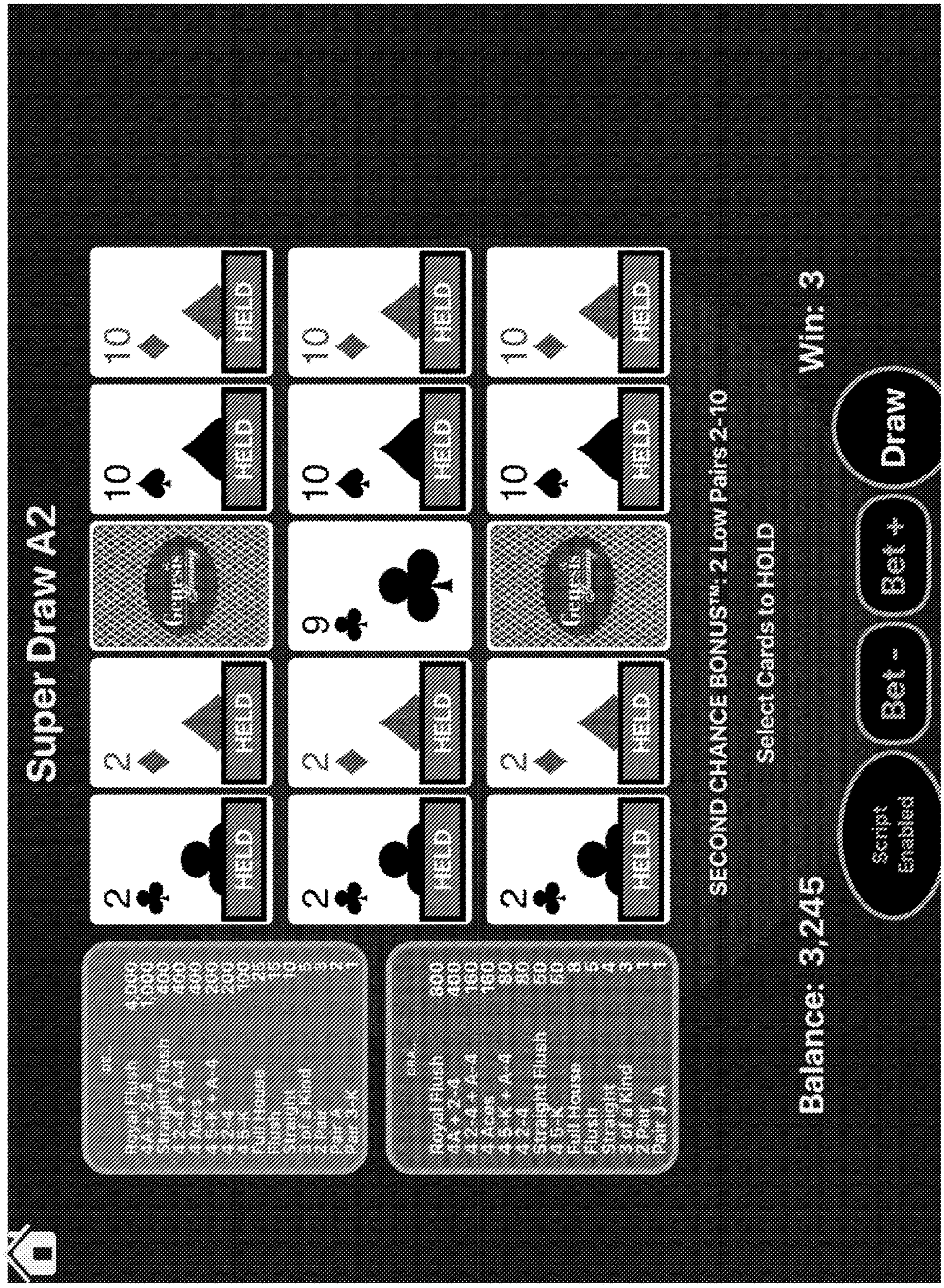
Figure 29:
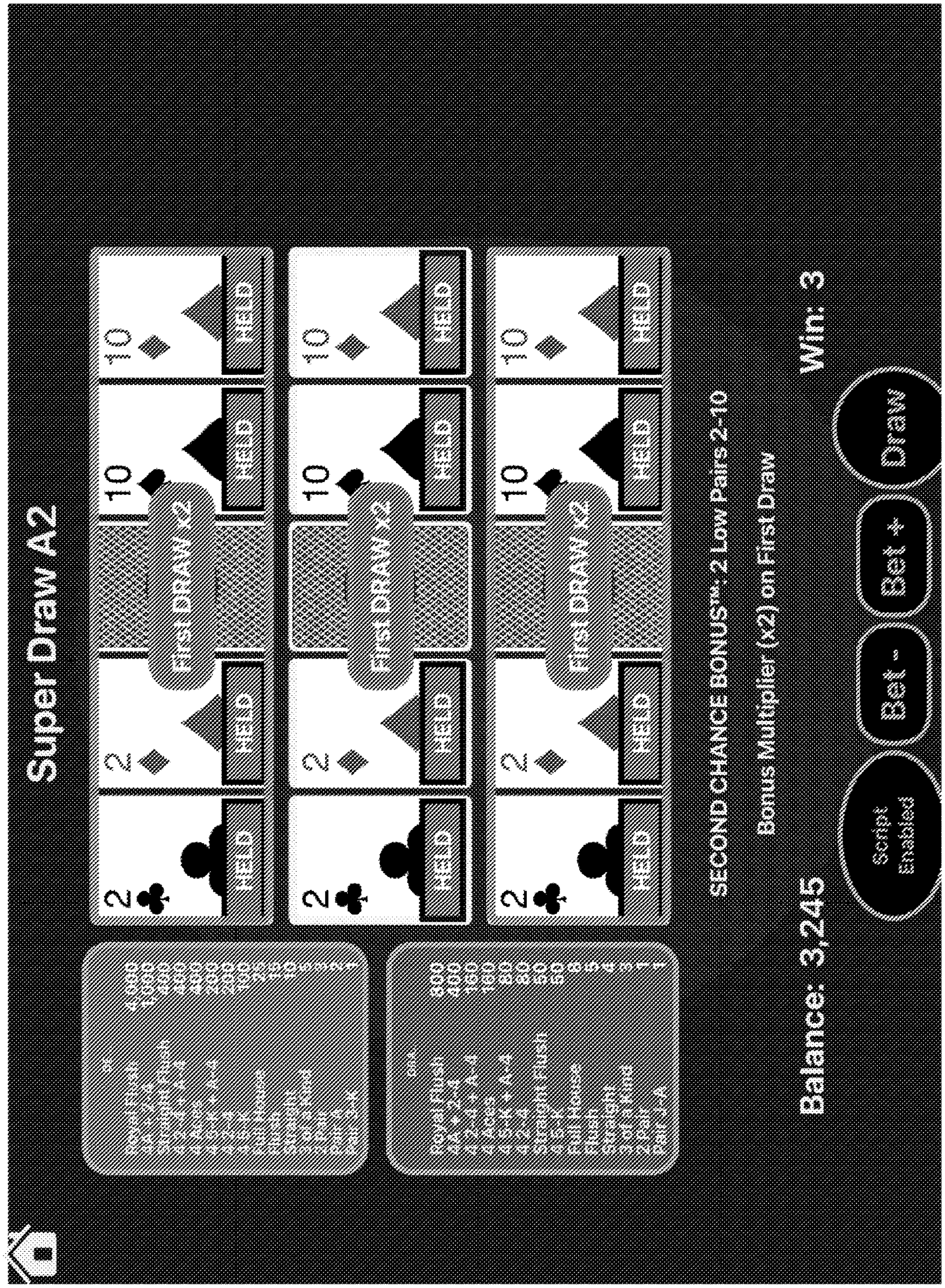
Figure 30:
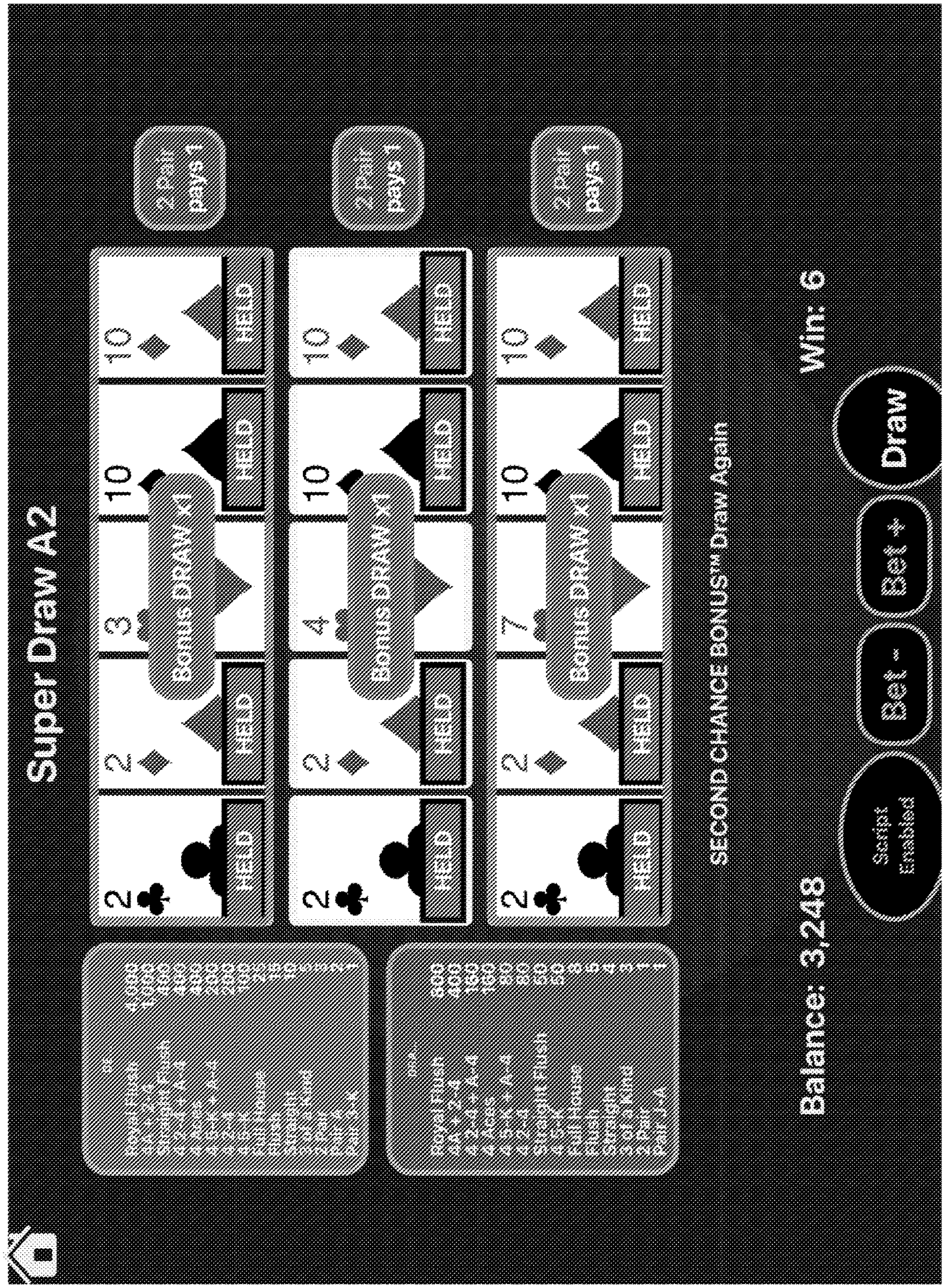
Figure 31:
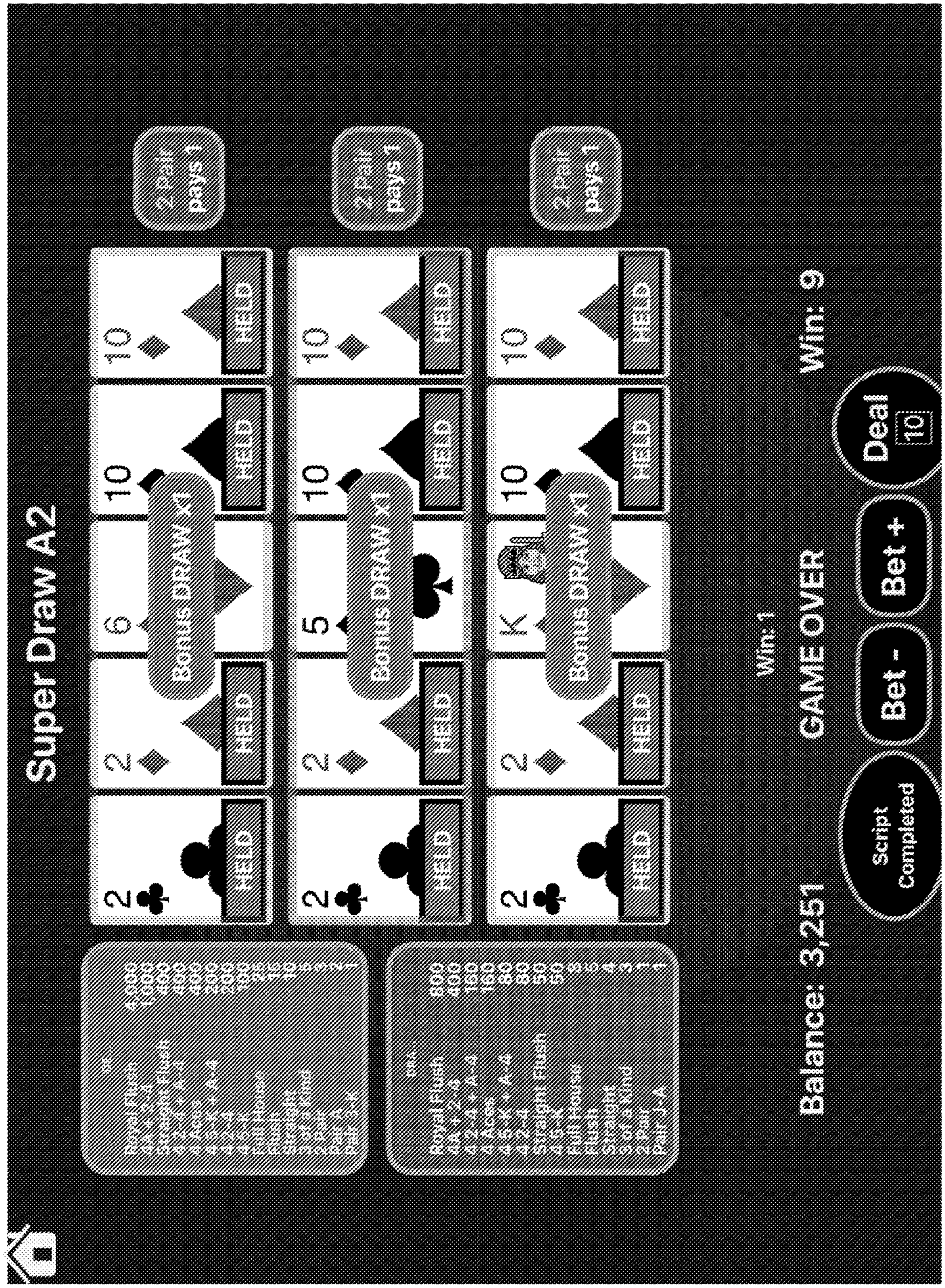

The present disclosure may also be implemented in various configurations for online social media play, such as the platforms for Facebook, Google and Yahoo! games. In one embodiment, FIG. 3 illustrates a schematic view of a typical hosting/access environment for implementing the present invention. In one embodiment, aspects of the present invention may be hosted on a server 150 coupled to a storage device 155. Typically, storage device 155 is a database configured to store multiple records of users of the website described herein. In one embodiment, the database is a secure database capable of storing information in accordance with privacy laws of the United States and countries that allow access to the website of the present invention.

In most cases, server 150 is coupled to Internet 160 so as to provide access to users of the site of the present invention. Users may access the website of the present invention in several different ways. In one embodiment, a user may use his or her personal computer or desktop computer 165 to access the information located on server 150. In another embodiment, a user may choose to use his or her PDA device or cell phone 170 to access the information on server 150. In any event, any suitable device may be used to access server 150, including a direct connection not connected to Internet 160, so long as the connection is secure and able to receive information from the hosted website. In addition to a user of the website described herein, a site administrator may access the server 150 through a remote access over the Internet 160 using a personal computer 175 or other secure device to remotely update game content or game play.

Example Method—Bonus Draw Video Poker

FIGS. 4A through 4D show a flowchart of a process or method 200 of operating one example embodiment of the gaming system of the present disclosure to provide a play of one example embodiment of the wagering game with the bonus hand feature of the present disclosure. In this illustrated example, the bonus hand feature is illustrated and described with respect to a video poker game having three and five hands. However, such an example is not meant to limit the present disclosure. In various embodiments, a set of instructions stored in one or more memories and executed by one or more processors represents the process 200. Although the process 200 is described with reference to the flowchart shown in FIGS. 4A through 4D, many other processes of performing the acts associated with this process 200 may be employed. For example, the order of certain of the flowchart may be changed, certain of the descriptions in the flowchart may be optional, or certain of the descriptions in the flowchart may not be employed. Each of the steps 205 to 350 illustrated in the screen shots of FIGS. 5-16 and described within method 200 of FIGS. 4A through 4D are incorporated into the written portion of this detailed description.

Example Gaming System Operation—Bonus Draw Video Poker

FIGS. 5 to 16 illustrate screen shots of an example embodiment of a gaming system of the present disclosure providing a gaming session, including a plurality of plays of one example embodiment of the wagering game with the bonus hand feature of the present disclosure. Specifically, FIGS. 5 to 10 illustrate a first play of a gaming session of the wagering game. Here, the wagering game is a Five-Hand Jacks or Better Five Card Draw Poker Pay on the Deal offering a Bonus Hand game (referred to below as the Five-Handed "Bonus Hand Poker Game" for brevity). FIGS. 11 to 16 illustrate a second play of the gaming session of the wagering game. Here, the wagering game is a Three Hand Jacks or Better Five Card Draw Poker Pay on the Deal offering a Bonus Hand game (referred to below as the Three-Handed "Bonus Hand Poker Game" for brevity). It should be appreciated that the number of additional hands as provided below can be any suitable number such as two or more hands. It should also be appreciated that the embodiment illustrates a pay table for the deal, however, one of ordinary skill in the art will appreciate that the deal pay table may be eliminated without departing from the scope and spirit of the present invention.

Example Method—Second Chance Bonus Video Poker

FIGS. 17A through 17F show a flowchart of a process or method 400 of operating one example embodiment of the gaming system of the present disclosure to provide a play of one example embodiment of the wagering game with the bonus hand feature of the present disclosure. In this illustrated example, the bonus hand feature is illustrated and described with respect to a video poker game having three and five hands. However, such an example is not meant to limit the present disclosure. In various embodiments, a set of instructions stored in one or more memories and executed by one or more processors represents the process 400. Although the process 400 is described with reference to the flowchart shown in FIGS. 17A through 17F, many other processes of performing the acts associated with this process 400 may be employed. For example, the order of certain descriptions of the flowchart may be changed, certain of the descriptions in the flowchart may be optional, or certain of the descriptions in the flowchart may not be employed. Each of the steps 405 to 625 illustrated in the screen shots of FIGS. 18 through 31 and described within method 400 of FIGS. 17A through 17F are incorporated into the written portion of this detailed description.

Example Gaming System Operation—Second Chance Bonus Video Poker

FIGS. 18 to 31 illustrate screen shots of an example embodiment of a gaming system of the present disclosure providing a gaming session, including a plurality of plays of one example embodiment of the wagering game with the bonus hand feature of the present disclosure. Specifically, FIGS. 18 to 24 illustrate a first play of a gaming session of the wagering game. Here, the wagering game is a Jacks or Better Five Card Draw Poker Pay on the Deal offering a Second Chance Bonus game (referred to below as the "Second Chance Bonus Poker Game" for brevity). FIGS. 25 to 31 illustrate a second play of the gaming session of the wagering game. Here, the wagering game is a Three Hand Jacks or Better Five Card Draw Poker Pay on the Deal offering a Bonus Hand game (referred to below as the "Three Handed Second Chance Bonus Poker Game" for brevity). It should be appreciated that the number of additional hands as provided below can be any suitable number such as two or more hands. It should also be appreciated that the embodiment illustrates a pay table for the deal, however, one of ordinary skill in the art will appreciate that the deal pay table may be eliminated without departing from the scope and spirit of the present invention.

Mathematical Description of Super Fun/Second Chance/Bonus Video Poker

Described herein a mathematical description of a bonus hand video poker game and second chance bonus video poker game comprising three illustrated versions with associated wagers.

In the first illustrated embodiment (V1) of a bonus hand video poker game, upon an initial dealt hand outcome (of five cards optionally compared to a first or deal paytable) the player then typically holds/draws in the traditional manner to a final drawn hand compared to a second or draw paytable. However, if the player holds zero cards, a new dealt hand (from a second deck) is afforded the player, who then holds/draws anew to a final drawn hand which is compared to a second or draw paytable. The version also affords three, five hands Dealt, with a prescribed or designated hand (e.g., bottom hand as presented to the player), played out in a 3-hand or 5-hand multiplay format. One of ordinary skill in the art will appreciate that any suitable number of hands may be utilized without departing from the scope and spirit of the invention, such as for example 10-hand. 50-hand or 100-hand to name a few In the second illustrated embodiment (V2) of a bonus hand video poker game, upon two initial dealt hand outcomes (of five cards each, dealt from 2 separate decks, each optionally compared to a first or deal paytable), the player chooses one of these dealt hands to play out, and then typically holds/draws the chosen hand in the traditional manner to a final drawn hand compared to a second or draw paytable. However, if the player Holds zero cards, a new dealt hand (from a third deck) is afforded the player, who then holds/draws anew to a final drawn hand which is compared to the draw paytable.

In the third illustrated embodiment (V3) of a second chance bonus video poker game, upon three initial Dealt hand outcomes (of 5 cards each, dealt from three separate decks, each optionally compared to a first or deal paytable), the player chooses one of these dealt hands to play out, and then typically holds/draws the chosen hand in the traditional manner to a final drawn hand compared to a second or draw paytable. However, if the chosen dealt hand and cards held comprises one of a set of bonus starting hands, then the first draw (if completing the hand) optionally pays a bonus multiplier (e.g., 1× or 2×) times the standard draw pay, and if not completing the hand a second draw is awarded. The version also affords three hands dealt, with the player's chosen hand played out in a 3-hand multi-play format.

The methods discussed herein may be applied to other contemplated variations which are also briefly described.

V1: Approach, Analysis & Results

For V1 of the bonus hand video poker game, the bet increment is equal to 2, and the player is initially dealt a 5-card hand. The dealt hand is compared to the first or deal paytable and resolved. Thereafter, the player holds/draws the hand in the traditional video poker manner to a final drawn hand which is compared to a second or draw paytable. However, if the player Holds zero cards, a new dealt hand (from a second deck) is afforded the player. In one embodiment, the new dealt hand is not compared to the first or deal paytable, but the player then holds/draws this new dealt hand in the traditional manner to a final drawn hand, which is compared to the second or draw paytable.

Below we present a sample mathematical summary of the dealt results for a particular paytable.

V1: Example Deal Paytable

| Hand # | Hand Name | Comb | P | Pay | ER |
|---|---|---|---|---|---|
| 1 | RF | 4 | 0.000002 | 4000 | 0.006156 |
| 2 | SF | 36 | 0.000014 | 500 | 0.006926 |
| 3 | 4 A + 2-4 | 12 | 0.000005 | 1000 | 0.004617 |
| 4 | 4 2-4 + A-4 | 36 | 0.000014 | 400 | 0.005541 |
| 5 | 4 A | 36 | 0.000014 | 400 | 0.005541 |
| 6 | 4 2-4 | 108 | 0.000042 | 200 | 0.008311 |
| 7 | 4 5-K | 432 | 0.000166 | 100 | 0.016622 |
| 8 | FH | 3744 | 0.001441 | 20 | 0.028812 |
| 9 | Flush | 5108 | 0.001965 | 12 | 0.023585 |
| 10 | Straight | 10200 | 0.003925 | 8 | 0.031397 |
| 11 | 3 of a kind | 54912 | 0.021128 | 4 | 0.084514 |
| 12 | 2 Pair | 123552 | 0.047539 | 3 | 0.142617 |
| 13 | High Pair: A | 84480 | 0.032505 | 2 | 0.065011 |
| 14 | Low Pair: 3-K | 929280 | 0.357558 | 1 | 0.357558 |
| 15 | Pair 2s or less | 1387020 | 0.533683 | 0 | 0.000000 |
| | | 2598960 | 1 | | 0.787207 |

The following table represents nominal results (i.e., standard draw poker rules apply) for each starting hand and a given Draw paytable, the optimal strategy and ensuing expected return for a sample paytable.

V1: Example Draw Paytable (Optimal w/Standard VP Rules)

| Hand # | Hand Name | Comb | P | Pay | ER |
|---|---|---|---|---|---|
| 1 | RF | 65.511541 | 0.000025 | 800 | 0.020165 |
| 2 | SF | 289.403571 | 0.000111 | 50 | 0.005568 |
| 3 | 4 A + 2-4 | 159.278842 | 0.000061 | 400 | 0.024514 |
| 4 | 4 2-4 + A-4 | 371.912423 | 0.000143 | 160 | 0.022896 |
| 5 | 4 A | 447.393095 | 0.000172 | 160 | 0.027543 |
| 6 | 4 2-4 | 998.154888 | 0.000384 | 80 | 0.030725 |
| 7 | 4 5-K | 4182.130485 | 0.001609 | 50 | 0.080458 |
| 8 | FH | 27941.923554 | 0.010751 | 8 | 0.086010 |
| 9 | Flush | 33150.739241 | 0.012755 | 6 | 0.076532 |
| 10 | Straight | 35310.988130 | 0.013587 | 4 | 0.054346 |
| 11 | 3 of a kind | 192765.020454 | 0.074170 | 2 | 0.148340 |
| 12 | 2 Pair | 315278.737216 | 0.121310 | 1 | 0.121310 |
| 13 | High Pair: J-A | 535104.756992 | 0.205892 | 1 | 0.205892 |
| 14 | Pair 10s or less | 1452894.049567 | 0.559029 | 0 | 0.000000 |
| | | 2598960 | 1 | | 0.904299 |

As an illustration of V1 game play, assume the game is offered with a standard wager of 2 credits to cover all functionality, and that a player wagers 10 credits (i.e., Bet Multiplier of 5). The player is dealt a hand as follows.

Hand: 8d 5h 6d 8c Qc

First, the player is paid 5×1=5 credits for the Low Pair on the Deal.

Continuing with the illustrated example, assume the player chooses to hold the Pair of 8s. The player draws and gets 7c 4c As. The player is paid nothing on the Draw, and the game is over. The total payout to the player is 5+0=5 credits.

If instead, the player decided to hold nothing, then the player is dealt a new hand of 5 cards from a second deck. Let's assume this fresh hand is Jc Jd 10d 6d Qc. In the illustrated example, this new hand of five cards is not compared to the Deal paytable (i.e., there is no Deal payoff for the Pair of Js), but the player is afforded the opportunity to hold/draw as in standard video poker. The player holds Jc Jd and draws 10c 4c Jh. The player is paid 5×2=10 credits for the 3 of a kind, and the game is over. The total payout to the player in this case is 5+10=15 credits.

Because, in V1 of the bonus hand video poker game, the player may hold zero cards and get a fresh deal of five cards from a second deck, the optimal strategy must determine when it is appropriate to hold zero cards. Note that the ER from holding zero cards is thus that of playing against the standard draw paytable. Therefore, whenever the best ER from playing out the hand with standard optimal strategy is less than that of a standard draw paytable (in this case, 90.4299%), it is optimal to instead hold zero cards and take the fresh deal from the second deck.

There are 2,598,960 hands possible in a 5-card Deal. The optimal strategy is as follows:

V1: Summary of Optimal Strategy and Partial Expected Returns

| | |
|---|---|
| # Overall | 2,596,980 |
| Play Original Hand | 655,308 |
| New Deal second Deck | 1,943,652 |
| % Play Original Hand | 25.2142% |
| % New Deal second Deck | 74.7858% |
| Partial ER Play Orig Hand | 201.0720% |
| Partial ER New Deal second Deck | 90.4299% |

The output may be understood as follows. Depending on the hand composition, 25.2% of the time the original hand should be played out (with at least 1 held card); this is because the ER from playing out the hand is greater than the ER from taking a new deal of 5 cards from the second deck. Conversely, 74.8% of the time it is optimal to take a new deal from the second deck (no original cards should be held). When optimally playing out the original hand, the resultant ER is 201.07%. On the other hand, if taking a new deal from the second deck, then the resultant ER is the same as the nominal standard ER, namely 90.43%.

With these calculations, we can now derive the ER for the Draw portion of the game (including, optimally, dealt hands in which the player plays out the original hand and dealt hands in which the player holds 0 cards in the original hand and obtains a new 5 cards from the second deck) assuming optimal strategy.

$$\begin{aligned} ER\ \text{Draw} &= 25.2142\% \times 201.0720\% + 74.7858\% \times 90.4299\% \\ &= 118.3247\% \end{aligned}$$

From the example Deal paytable above, we know ER Deal=78.7207%. Therefore, with optimization, we find the following.

$$\begin{aligned} ER\ \text{Overall} &= \{(ER\ \text{Deal}) + (ER\ \text{Draw})\}/2 \\ &= 98.5241\% \end{aligned}$$

Below please find representative combinatorial results for various deal and draw paytables utilizing the optimal strategy specific to each paytable. In each case, the following template deal and draw paytables are utilized assuming a Bet Mult of 1 unit.

V1a: Deal Template Paytable

| Hand # | Hand Name | Pay |
|---|---|---|
| 1 | RF | 4000 |
| 2 | SF | 400 |
| 3 | 4 A + 2-4 | 1000 |
| 4 | 4 2-4 + A-4 | 400 |
| 5 | 4 A | 400 |
| 6 | 4 2-4 | 200 |
| 7 | 4 5-K | 100 |
| 8 | FH | FH |
| 9 | Flush | F |
| 10 | Straight | S |
| 11 | 3 of a kind | 4 |
| 12 | 2 Pair | 3 |
| 13 | High Pair: A | 2 |
| 14 | Low Pair: 3-K | 1 |
| 15 | Pair 2s or less | 0 |

V1b: Deal Template Paytable

| Hand # | Hand Name | Pay |
|---|---|---|
| 1 | RF | 4000 |
| 2 | SF | 400 |
| 3 | 4 A + 2-4 | 1000 |
| 4 | 4 2-4 + A-4 | 400 |
| 5 | 4 A | 400 |
| 6 | 4 2-4 | 200 |
| 7 | 4 5-K | 100 |
| 8 | FH | FH |
| 9 | Flush | F |
| 10 | Straight | S |
| 11 | 3 of a kind | 4 |
| 12 | 2 Pair | 3 |
| 13 | High Pair: A | 2 |
| 14 | Low Pair: 4-K | 1 |
| 15 | Pair 3s or less | 0 |

Note that with respect to the V1 Deal Paytable, for V1a a Low Pair is 3-K, while for V1b a Low Pair is 4-K.

V2: Draw Template Paytable

| Hand # | Hand Name | Pay |
|---|---|---|
| 1 | RF | 800 |
| 2 | SF | 50 |
| 3 | 4 A + 2-4 | 400 |
| 4 | 4 2-4 + A-4 | 160 |
| 5 | 4 A | 160 |
| 6 | 4 2-4 | 80 |
| 7 | 4 5-K | 50 |
| 8 | FH | *FH* |
| 9 | Flush | *F* |
| 10 | Straight | *S* |
| 11 | 3 of a kind | 2 |
| 12 | 2 Pair | 1 |
| 13 | High Pair: J-A | 1 |
| 14 | Pair 10s or less | 0 |

Within the template paytable nomenclature for this report, deal templated pays (here, FH, F, S) are presented in normal font, while Draw templated pays (here, FH, F, S) are presented in italics.

In the table below, the Bet increment is assumed to be two in order to achieve full functionality. In jurisdictions which allow individual wagers to be bet upon, then a 1-unit wager may be offered upon the dealt hand alone, prior to the next wager increment of 1 unit upon the draw. E.g., a player may be allowed to wager 1 or 2 units, and subsequently 3 or 4 units, etc.

V1: Summary of Overall Expected Return for Various Paytables

| Paytable | FH, F, S, FH, F, S | ER Deal | ER Draw | ER Overall |
|---|---|---|---|---|
| V1a | 20, 12, 8, 8, 6, 4 | 78.72% | 118.33% | 98.52% |
| V1a | 20, 12, 8, 9, 6, 4 | 78.72% | 119.87% | 99.30% |
| V1a | 25, 15, 10, 8, 5, 4 | 80.82% | 116.56% | 98.69% |
| V1a | 35, 20, 10, 8, 5, 4 | 83.24% | 116.56% | 99.90% |
| V1b | 25, 15, 9, 8, 6, 4 | 77.17% | 118.33% | 97.75% |
| V1b | 25, 15, 9, 9, 6, 4 | 77.17% | 119.87% | 98.52% |
| V1b | 25, 15, 9, 9, 7, 4 | 77.17% | 121.95% | 99.56% |
| V1b | 35, 20, 10, 9, 6, 4 | 79.99% | 119.87% | 99.93% |
| V1b | 50, 25, 10, 8, 5, 4 | 83.13% | 116.56% | 99.85% |

In principle, to obtain a desired overall ER, the deal and/or draw paytables may be modified independently, since the ER associated with the Deal and Draw are determined independently and thereafter combined to obtain ER Overall, as follows:

$$Bet\ Inc = 2\text{: Overall } ER = \{(ER\ \text{Deal}) + (ER\ \text{Draw})\}/2$$

Multi-hand versions are also available. For example, 3 hands or 5 hands, each of which is compared to the deal paytable. A prescribed hand (e.g., a format where 3 hands are dealt in horizontal rows and the player plays out the bottom hand) must be played. In these cases, the Bet Inc is correspondingly increased by the number of hands (both dealt and played out in a multi-hand format with a prescribed hand). So, for example, with 3 hands dealt and a prescribed hand (e.g., the bottom hand visually, as presented the player) played out in a 3-hand multi-play format, the corresponding Bet Inc is 6. With 5 hands Dealt and a prescribed hand played out, the corresponding Bet Inc is 10. The overall ER in these cases is identical to the one hand version as presented in Table V1.

In a variation, based upon specific incomplete held hands (for example, 4 to Royal Flush, 4 to Straight Flush, etc.), the player is given the option to make an additional wager for a modified paytable prior to the draw. In another variation, based upon specific outcomes when the game is nominally over (for example, 4 to Royal Flush, 4 of a kind without the kicker, etc.), the player is given the option to make an additional wager for an additional draw (e.g., holding the 4 to Royal Flush, holding the 4 of a kind without the kicker, etc.) with a modified paytable.

By way of example for the option of an additional wager, assume a wager of 10 credits, a Dealt hand of Ah Jh 10h Kh Kc, and the player held the 4 to Royal Flush, drawing 3c. Although the game is nominally over (the player having missed the Royal Flush), the game may offer the player an additional Draw for an additional wager of, e.g., 5 or 10 credits. At this point, 6 cards have been seen, so if the remaining pack is not reset, the probability of drawing the Qh (on another draw holding the 4 to Royal Flush) is 1 in 46. Odds of, e.g., 44 to 1 may be offered ensuring a house advantage (assuming the only pay possible is the Royal Flush). Or, if the deck is reset by reinserting the 3c, then the probability of drawing the Qh is 1 in 47 and the offered odds may be 45 to 1, e.g. On the other hand, with a Dealt hand of Ah 10s 8c 6c 4d, and the player holding the Ah, drawing Jh 10h 3d Kh, the player again has 4 to Royal Flush as the nominal outcome. Here, however, 9 cards have been seen, so the probability of drawing the Qh (on another draw holding the 4 to Royal Flush) is 1 in 43. Therefore, odds of, e.g., 40 to 1 may be offered ensuring a house advantage (assuming only the Royal Flush pays). Or, if the deck is reset by reinserting the Jh 10h 3d Kh, then the probability of drawing the Qh is 1 in 47.

Alternatively, in the example of 4 to RF, the player may also be paid with the optional additional wager for drawing a High Pair and not just the Royal Flush. In this case the odds offered would be adjusted according to the additional pays possible.

V2: Approach, Analysis & Results

For illustrated embodiment V2 of a bonus hand video poker game, the Bet Increment is equal to 3, and the player is initially dealt two 5-card hands from 2 separate decks. Each of these 2 dealt hands is compared to the deal paytable and resolved. Thereafter, the player chooses one of these dealt hands to play out (in a variation, the slot machine automatically indicates and/or selects the hand with the higher expected value for the player). The player then holds/draws the chosen hand in the traditional video poker manner to a final drawn hand compared to a draw paytable. However, if the player holds 0 cards, a new dealt hand (from a 3$^{rd}$ deck) is afforded the player, who then holds/draws this new dealt hand in the traditional manner to a final drawn hand, which is compared to the draw paytable.

Below we present a sample summary of the dealt results for a particular paytable.

V2: Example Deal Paytable

| Hand # | Hand Name | Comb | P | Pay | ER |
|---|---|---|---|---|---|
| 1 | RF | 4 | 0.000002 | 4000 | 0.006156 |
| 2 | SF | 36 | 0.000014 | 400 | 0.005541 |
| 3 | 4 A + 2-4 | 12 | 0.000005 | 1000 | 0.004617 |
| 4 | 4 2-4 + A-4 | 36 | 0.000014 | 400 | 0.005541 |
| 5 | 4 A | 36 | 0.000014 | 400 | 0.005541 |
| 6 | 4 2-4 | 108 | 0.000042 | 200 | 0.008311 |
| 7 | 4 5-K | 432 | 0.000166 | 100 | 0.016622 |
| 8 | FH | 3744 | 0.001441 | 20 | 0.028812 |
| 9 | Flush | 5108 | 0.001965 | 10 | 0.019654 |
| 10 | Straight | 10200 | 0.003925 | 8 | 0.031397 |
| 11 | 3 of a kind | 54912 | 0.021128 | 4 | 0.084514 |
| 12 | 2 Pair | 123552 | 0.047539 | 3 | 0.142617 |
| 13 | High Pair: A | 84480 | 0.032505 | 2 | 0.065011 |
| 14 | Low Pair: 3-K | 929280 | 0.357558 | 1 | 0.357558 |
| 15 | Pair 2s or less | 1387020 | 0.533683 | 0 | 0.000000 |
| | | 2598960 | 1 | | 0.781891 |

The following table represents nominal results (i.e., standard draw poker rules apply) for each starting hand and a given Draw paytable, the optimal strategy for a sample paytable.

V2: Example Draw Paytable (Optimal W/Standard VP Rules)

| Hand # | Hand Name | Comb | P | Pay | ER |
|---|---|---|---|---|---|
| 1 | RF | 65.511541 | 0.000025 | 800 | 0.020165 |
| 2 | SF | 289.403571 | 0.000111 | 50 | 0.005568 |
| 3 | 4 A + 2-4 | 159.278842 | 0.000061 | 400 | 0.024514 |
| 4 | 4 2-4 + A-4 | 371.912423 | 0.000143 | 160 | 0.022896 |
| 5 | 4 A | 447.393095 | 0.000172 | 160 | 0.027543 |
| 6 | 4 2-4 | 998.154888 | 0.000384 | 80 | 0.030725 |
| 7 | 4 5-K | 4182.130485 | 0.001609 | 50 | 0.080458 |
| 8 | FH | 27941.923554 | 0.010751 | 8 | 0.086010 |
| 9 | Flush | 33150.739241 | 0.012755 | 6 | 0.076532 |
| 10 | Straight | 35310.988130 | 0.013587 | 4 | 0.054346 |
| 11 | 3 of a kind | 192765.020454 | 0.074170 | 2 | 0.148340 |
| 12 | 2 Pair | 315278.737216 | 0.121310 | 1 | 0.121310 |
| 13 | High Pair: J-A | 535104.756992 | 0.205892 | 1 | 0.205892 |
| 14 | Pair 10s or less | 1452894.049567 | 0.559029 | 0 | 0.000000 |
| | | 2598960 | 1 | | 0.904299 |

By way of example, assume the game is offered with a standard wager of 3 credits to cover all functionality, and that a player wagers 15 credits (i.e., Bet Multiplier of 5). The player is dealt 2 hands, each from a separate deck, as follows.

Hand 1: 5h 5s 7d 8h 10c

Hand 2: Jh 8h 7h 4c 5s

For Hand 1 the player is paid 5×1=5 credits for the Low Pair on the Deal. For Hand 2, the player is paid nothing for the Deal. Thereafter, the player must choose which hand to play out.

Assume the player chooses Hand 1 and holds the 5h 5s. The player draws and gets 5c 4c 3s. The player is paid 5×2=10 credits for the 3 of a kind, and the game is over. The total payout to the player is 5+10=15 credits.

If instead, the player chose Hand 1 and decided to hold nothing, then the player is dealt a new hand of five cards from a 3$^{rd}$ deck. Let's assume the fresh hand is 10c 10s 10d 8h 4d. In one embodiment, this new hand of 5 cards is not compared to the deal paytable (i.e., there is no Deal payoff for the 3 Tens), but the player is afforded the opportunity to hold/draw as in standard video poker. The player holds 10c 10s 10d and draws 10h 2d. The player is paid 5×50=250 credits for the 4 of a kind, and the game is over. The total payout to the player in this case is 5+250=255 credits.

Because, in V2, the player chooses which of the two dealt hands to play out (and how to play including the effect of holding zero cards and getting a fresh deal from a 3$^{rd}$ deck), the theoretical optimal Expected Return (ER) from playing out each possible starting dealt hand must be determined, such that when presented with 2 "competing" hands, the optimal strategy chooses the hand with the higher ER Draw (utilizing the example draw paytable above). Toward this end, combinatorial code was written to determine the optimal strategy for drawing to each potential initial Dealt 5-card hand, including the effects of potentially getting a fresh set of 5 cards with subsequent Draw if holding nothing, and its resultant Expected Return Draw.

Once the aforementioned ER Draw for each Dealt 5-card hand has been determined, combinatorial code was written to cycle through each possible initial 5-card deal upon two independent hands. Because there are 2,598,960 unique hands possible in a 5-card deal, there are a total of 2,598,960×2,598,960=6,754,593,081,600 possible ways to deal 2 independent 5-card hands from two separate decks.

Enumerating the two dealt hands as #1 and #2, the combinatorial code output associated with the optimal strategy is as follows:

V2: Summary of Optimal Strategy and Partial Expected Returns

| | Choose #1 | Choose #2 | Choose either (equal ER) | Total |
|---|---|---|---|---|
| # Overall | 3,202,018,120,336 | 3,202,018,120,336 | 350,556,840,928 | 6,754,593,081,600 |
| Play Original Hand | 1,448,461,332,400 | 1,448,461,332,400 | 79,887,319,696 | 2,976,809,984,496 |
| New Deal 3rd Deck | 1,753,556,787,936 | 1,753,556,787,936 | 270,669,521,232 | 3,777,783,097,104 |
| % Overall | 47.4050% | 47.4050% | 5.1899% | 100% |
| % Play Original Hand | 45.2359% | 45.2359% | 22.7887% | 44.0709% |
| % New Deal 3rd Deck | 54.7641% | 54.7641% | 77.2113% | 55.9291% |
| Partial ER Play Orig Hand | 211.6232% | 211.6232% | 144.0918% | 209.8109% |
| Partial ER New Deal 3rd Deck | 90.4299% | 90.4299% | 90.4299% | 90.4299% |

The output may be understood as follows. Of the two random Dealt hands, hand #1 should optimally be chosen 47.4% of the time, and hand #2 should optimally be chosen 47.4% of the time. This is a sanity check, as given the symmetry of hands #1 and #2 they must be equal. Therefore, one of the two hands should clearly be chosen as having a higher ER 47.4%+47.4%=94.8% of the time. Conversely, 5.2% of the time, hands #1 and #2 have an equal expected return, hence either may be chosen.

When one hand has a higher ER (and is chosen):

Depending on the hand composition, 45.2% of the time the original hand should be played out (with at least 1 held card); this is because the ER from playing out the hand is greater than the ER from taking a new deal of 5 cards from the 3rd deck. Conversely, 54.8% of the time it is optimal to take a new deal from the 3rd deck (no original cards should be held from the chosen hand). When optimally playing out the chosen, original hand, the resultant ER is 211.62%. When optimally taking a new deal from the 3rd deck on the chosen hand, then the resultant ER is the same as the nominal standard ER, namely 90.43%.

When both hands have an equal ER:

Depending on the hand composition, 22.8% of the time the original hand should be played out (with at least 1 held card). Conversely, 77.2% of the time it's optimal to take a new deal from the 3rd deck (no cards should be held in the original hand). When optimally playing out the chosen, original hand, the resultant ER is 144.09%. If taking a new deal from the 3rd deck, the resultant ER is 90.43%.

With these calculations, we can now derive the ER for the Draw portion of the game, assuming optimal strategy.

$$\begin{aligned} ER\text{ Draw} &= 2\times 47.4050\%\times (45.2359\%\times 211.6232\% + 54.7641\%\times 90.4299\%) + 5.1899\%\times (22.7887\%\times 144.0918\% + 77.2113\%\times 90.4299\%) \\ &= 143.0422\% \end{aligned}$$

From the example Deal paytable above, we know ER Deal=78.1891%. Therefore, optimizing hand selection and subsequent play, we find the following.

$$\begin{aligned} ER\text{ Overall} &= \{2\times(ER\text{ Deal}) + (ER\text{ Draw})\}/3 \\ &= 99.8068\% \end{aligned}$$

Below please find representative combinatorial results for various deal and draw paytables utilizing the optimal strategy. In each case, the following template deal and draw paytables are utilized assuming a Bet Mult of 1 unit.

V2: Deal Template Paytable

| Hand # | Hand Name | Pay |
|---|---|---|
| 1 | RF | 4000 |
| 2 | SF | 400 |
| 3 | 4 A + 2-4 | 1000 |
| 4 | 4 2-4 + A-4 | 400 |
| 5 | 4 A | 400 |
| 6 | 4 2-4 | 200 |
| 7 | 4 5-K | 100 |
| 8 | FH | FH |
| 9 | Flush | F |
| 10 | Straight | S |
| 11 | 3 of a kind | 4 |
| 12 | 2 Pair | 3 |
| 13 | High Pair: A | 2 |
| 14 | Low Pair: 3-K | 1 |
| 15 | Pair 2s or less | 0 |

V2: Draw Template Paytable

| Hand # | Hand Name | Pay |
|---|---|---|
| 1 | RF | 800 |
| 2 | SF | 50 |
| 3 | 4 A + 2-4 | 400 |
| 4 | 4 2-4 + A-4 | 160 |
| 5 | 4 A | 160 |
| 6 | 4 2-4 | 80 |
| 7 | 4 5-K | 50 |
| 8 | FH | FH |
| 9 | Flush | F |
| 10 | Straight | S |
| 11 | 3 of a kind | 2 |
| 12 | 2 Pair | 1 |
| 13 | High Pair: J-A | 1 |
| 14 | Pair 10s or less | 0 |

In the table below, the Bet Inc is assumed to be 3 in order to achieve full functionality. In jurisdictions which allow individual wagers to be bet upon, then e.g. 1-unit, 2-unit wagers may be offered upon the respective 1, 2 dealt hands alone, prior to the next wager increment of 1 unit upon the draw. E.g., a player may be allowed to wager 1, 2 or 3 units, and subsequently 4, 5 or 6 units, etc.

V2: Summary of Overall Expected Return for Various Paytables

| FH, F, S, FH, F, S | ER Deal | ER Draw | ER Overall |
|---|---|---|---|
| 20, 10, 8, 8, 6, 4 | 78.19% | 143.04% | 99.81% |
| 25, 12, 8, 8, 5, 4 | 79.30% | 140.90% | 99.83% |
| 25, 15, 9, 7, 5, 4 | 80.28% | 138.91% | 99.83% |
| 25, 15, 10, 7, 5, 4 | 80.68% | 138.91% | 100.09% |
| 30, 20, 10, 6, 5, 4 | 82.38% | 136.96% | 100.57% |
| 35, 20, 10, 6, 5, 3 | 83.10% | 135.44% | 100.55% |
| 35, 20, 10, 7, 5, 3 | 83.10% | 137.39% | 101.20% |

In principle, to obtain a desired overall ER, the Deal and/or Draw paytables may be modified independently, since the ER associated with the Deal and Draw are determined independently and thereafter combined to obtain ER Overall, as follows:

Bet Inc=3: Overall ER={2×(ER Deal)+(ER Draw)}/3

V3: Approach, Analysis & Results

For V3 second chance bonus video poker game, the bet increment is 4 or 5 units (depending on variation), and the player is initially dealt three 5-card hands from 3 separate decks. In one embodiment. each of these three dealt hands is compared to a deal paytable and resolved. Thereafter, the player chooses one of these dealt hands to play out (in a variation, the slot machine automatically indicates and/or selects the hand with the highest expected value for the player). The player then holds/draws the chosen hand in the traditional video poker manner to a final drawn hand compared to a draw paytable. However, if the chosen dealt hand and cards held comprise one of a set of bonus starting hands, then the first draw (if completing the hand) may pay a multiplier (e.g., 1× or 2×) times the standard draw pay, and if not completing the hand a second draw is awarded known herein as the second chance bonus.

Below we present a sample summary of the Dealt results for a particular paytable.

V3: Example Deal Paytable

| Hand # | Hand Name | Comb | P | Pay | ER |
|---|---|---|---|---|---|
| 1 | RF | 4 | 0.000002 | 4000 | 0.006156 |
| 2 | SF | 36 | 0.000014 | 400 | 0.005541 |
| 3 | 4 A + 2-4 | 12 | 0.000005 | 1000 | 0.004617 |
| 4 | 4 2-4 + A-4 | 36 | 0.000014 | 400 | 0.005541 |
| 5 | 4 5-K + A-4 | 144 | 0.000055 | 200 | 0.011081 |
| 6 | 4 A | 36 | 0.000014 | 400 | 0.005541 |
| 7 | 4 2-4 | 108 | 0.000042 | 200 | 0.008311 |
| 8 | 4 5-K | 288 | 0.000111 | 100 | 0.011081 |
| 9 | FH | 3744 | 0.001441 | 50 | 0.072029 |
| 10 | Flush | 5108 | 0.001965 | 25 | 0.049135 |
| 11 | Straight | 10200 | 0.003925 | 15 | 0.058870 |
| 12 | 3 of a kind | 54912 | 0.021128 | 6 | 0.126771 |
| 13 | 2 Pair | 123552 | 0.047539 | 3 | 0.142617 |
| 14 | High Pair: A | 84480 | 0.032505 | 2 | 0.065011 |
| 15 | Low Pair: 3-K | 929280 | 0.357558 | 1 | 0.357558 |
| 16 | Pair 2s or less | 1387020 | 0.533683 | 0 | 0.000000 |
| | | 2598960 | 1 | | 0.929860 |

The following table represents nominal results (i.e., standard draw poker rules apply) for each starting hand and a given Draw paytable, the optimal strategy for a sample paytable.

V3: Example Draw Paytable (Optimal w/Standard VP Rules)

| Hand # | Hand Name | Comb | P | Pay | ER |
|---|---|---|---|---|---|
| 1 | RF | 64.863082 | 0.000025 | 800 | 0.019966 |
| 2 | SF | 277.260918 | 0.000107 | 50 | 0.005334 |
| 3 | 4 A + 2-4 | 160.156225 | 0.000062 | 400 | 0.024649 |
| 4 | 4 2-4 + A-4 | 372.177069 | 0.000143 | 160 | 0.022912 |
| 5 | 4 5-K + A-4 | 1509.038836 | 0.000581 | 80 | 0.046451 |
| 6 | 4 A | 451.114416 | 0.000174 | 160 | 0.027772 |
| 7 | 4 2-4 | 999.109114 | 0.000384 | 80 | 0.030754 |
| 8 | 4 5-K | 2736.210176 | 0.001053 | 50 | 0.052640 |
| 9 | FH | 28257.361813 | 0.010873 | 8 | 0.086981 |
| 10 | Flush | 28535.399051 | 0.010980 | 5 | 0.054898 |
| 11 | Straight | 33449.631741 | 0.012870 | 4 | 0.051482 |
| 12 | 3 of a kind | 195932.758782 | 0.075389 | 3 | 0.226167 |
| 13 | 2 Pair | 320232.169408 | 0.123216 | 1 | 0.123216 |
| 14 | High Pair: J-A | 551109.450366 | 0.212050 | 1 | 0.212050 |
| 15 | Pair 10s or less | 1434873.299001 | 0.552095 | 0 | 0.000000 |
| | | 2598960 | 1 | | 0.985271 |

The available suite of Bonus Starting Hands includes the following (cards needing to be held are depicted in bold).

V3: Potential Bonus Starting Hands

| | Bonus Starting Hand | # | Examples | Completed Hand |
|---|---|---|---|---|
| A | 4 to Royal Flush | 940 | Ah **10s Qs Ks As**, 3h **10c Jc Qc Kc** | Royal Flush (and Straight Flush if applicable) |
| B | 4 to Straight Flush | 6768 | **2h 3h 4h 5h** 7d, **7d 8d** 9h **10d Jd** | Straight Flush |
| C | 3 of a kind | 54912 | **4s 4h 4d** 10d Qd, **Js Jc Jd** Ah Ks | C1: 4 of a kind<br>C2: 4 of a kind, Full House |
| D | 2 Low Pairs (2-10) | 57024 | **2s 2h** Ac **9h 9c**, **10c 10s 4s 4h** 2c | Full House |

Specifically for 4 to Straight Flush (and only for this case), there may be more than one way to hold the hand and qualify as a Bonus Starting Hand. For example, with the Dealt hand 7d 8d 10d Jd Qd, the player may hold 7d 8d 10d Jd or 8d 10d Jd Qd, as both qualify as a Bonus Starting Hand.

Note that in some cases of 4 to Royal Flush (e.g., 10h Jh Qh Kh but not Jh Qh Kh Ah), this analysis assumes a completed hand may be a Royal Flush or a Straight Flush. In another possible variation, when holding 4 to Royal Flush, only a Royal Flush counts as a completed hand.

Note also that two variations exist for a Bonus Starting Hand of 3 of a kind. In variation C1, the 3 of a kind is completed only with a 4 of a kind, whereas in variation C2, the 3 of a kind is completed either with a 4 of a kind or Full House.

Note furthermore that 2 Low Pairs comprises hands with 2 pairs, but only if each pair has rank of 2 through 10. So, a hand of 3s 3d 10s 10h is a Bonus Starting Hand, whereas a hand of 3s 3d Js Jh is not.

Logically, the rules of play are as follows for the player's chosen hand.

With a Bonus Starting Hand that is correspondingly Held:

After the first Draw, the hand is evaluated—if a completed hand, then the Draw paytable pay multiplied by the Bonus Multiplier is awarded, and the game is over; if a non-completed hand, then the Draw paytable pay (if any) is given and a second Draw is automatically awarded with the deck reset to that of the first Draw (in a variation, the second Draw is awarded with the remaining deck accounting for all shown cards), and subsequent to the second Draw any associated Draw paytable pay is given.

Otherwise: Standard video poker rules apply, such that after the first Draw the hand is evaluated and any associated Draw paytable pay is given, and the game is over.

By way of example, assume the game is offered with a standard wager of 5 credits to cover all functionality, and that a player wagers 25 credits (i.e., Bet Multiplier of 5) and the Bonus Multiplier is 2×. The player is dealt 3 hands, each from a separate deck, as follows.

Hand 1: 5h 6s 7d 8h 9c

Hand 2: Jh 10h 8h 4c 9h

Hand 3: Ah Kc Kd 10s 4c

For Hand 1 the player is paid 5×15=75 credits for the Straight on the Deal. For Hand 2, the player is paid nothing for the Deal. For Hand 3, the player is paid 5×1=5 credits for the Pair of Kings on the Deal. Thereafter, the player must choose which hand to play out. Assume the player chooses Hand 2 and holds the Jh 10h 8h 9h, i.e. the player holds 4 to Straight Flush which is a Bonus Starting Hand. The player draws a card (the first Draw) and gets the Qh. The player completes the Straight Flush and is paid 5×50×2=500 credits, and the game is over. The total payout to the player is 75+5+500=580 credits.

If instead, on the first Draw, the player draws Jd, then the player is paid 5×1=5 credits for the Pair of Jacks on the first Draw. Since the player had a Bonus Starting Hand but has not completed the Straight Flush, the player is awarded a second Draw (removing the Jd and replacing it in the deck, such that the player again is holding Jh 10h 8h 9h with 4c out of play). If, on the second Draw, the player gets 7h, the player is paid 5×50=250 credits for the Straight Flush, and the game is over. The total payout to the player in this case is 75+5+5+250=335 credits.

Because, in V3, the player chooses which of the 3 Dealt hands to play out (and how to play), the theoretical optimal ER of each possible starting Dealt hand must be determined, such that when presented with 3 hands, the optimal strategy chooses the hand with the highest ER.

For the example paytable given above, the nominal optimal Expected Return (if playing standard Video Poker) is 98.53%. Including the effects of the Bonus Starting Hands A, B, C1, D and a Bonus Multiplier of 2×, the resultant single-hand optimal Expected Return is 126.34%. As an indicator of the relative magnitude of effects for each type of Bonus Starting Hand, consider the following table.

V3: Effects of Bonus Starting Hands on Single-Hand Expected Return (Example Draw Paytable)

| Bonus Starting Hands | Bonus Multiplier | ER |
|---|---|---|
| N/A | N/A | 98.53% |
| A | 1x | 99.18% |
| A, B | 1x | 99.81% |
| A, B, C1 | 1x | 113.26% |
| A, B, C2 | 1x | 112.40% |
| A, B, C1, D | 1x | 116.46% |
| A, B, C2, D | 1x | 115.60% |
| A, B, C1, D | 2x | 126.34% |
| A, B, C2, D | 2x | 126.52% |

In terms of contribution to the player's ER, Bonus Starting Hands comprising 3 of a kind have the most value, followed by Bonus Starting Hands comprising 2 Low Pairs.

Note that in comparing C1 and C2, if the multiplier is 1× then variation C1 slightly favors the player compared to C2. This is because a player holding 3 of a kind who, on the first Draw, makes a Full House is paid 1× for the Full House in both C1 and C2, but in variation C1 the player gets a second Draw whereas in variation C2 this is not true. On the other hand, if the multiplier is 2×, then variation C2 slightly favors the player compared to C1, as the extra 1× pay (that is, 2× vs. 1×) for making a Full House on the first Draw in C2 outweighs the second Draw afforded in C1.

Once the Expected Returns for each potential starting hand are determined, a high-speed simulator was encoded to simulate the overall game with optimal strategy. The simulator "deals" 3 hands from 3 separate decks, evaluating their resultant Deal pays. It then references a look-up table for the resultant ER for drawing to each hand (utilizing the optimal Hold/Draw strategy including the effects of Bonus Starting Hands) and chooses the hand with highest theoretical optimal ER as the optimal strategy. This resultant Draw ER is then added to the Deal pays to determine the overall outcome per game.

Below please find representative sim results, of 1 billion games each, for various deal and draw paytables. In each case, the following template deal and draw paytables are utilized assuming a Bet Mult of 1 unit.

V3: Deal Template Paytable (Bet Inc=5)

| Hand # | Hand Name | Pay |
|---|---|---|
| 1 | RF | 4000 |
| 2 | SF | 400 |
| 3 | 4 A + 2-4 | 1000 |
| 4 | 4 2-4 + A-4 | 400 |
| 5 | 4 5-K + A-4 | 200 |
| 6 | 4 A | 400 |
| 7 | 4 2-4 | 200 |
| 8 | 4 5-K | 100 |
| 9 | FH | FH |
| 10 | Flush | F |
| 11 | Straight | S |
| 12 | 3 of a kind | 3oak |
| 13 | 2 Pair | 2P |
| 14 | High Pair: A | HP |
| 15 | Low Pair: 3-K | 1 |
| 16 | Pair 2s or less | 0 |

V3: Deal Template Paytable (Bet Inc=4)

| Hand # | Hand Name | Pay |
|---|---|---|
| 1 | RF | 4000 |
| 2 | SF | 400 |
| 3 | 4 A + 2-4 | 1000 |
| 4 | 4 2-4 + A-4 | 400 |
| 5 | 4 5-K + A-4 | 200 |
| 6 | 4 A | 400 |
| 7 | 4 2-4 | 200 |
| 8 | 4 5-K | 100 |
| 9 | FH | FH |
| 10 | Flush | F |
| 11 | Straight | S |
| 12 | 3 of a kind | 3oak |
| 13 | 2 Pair | 2P |
| 14 | High Pair: A | HP |
| 15 | Low Pair: 5-K | 1 |
| 16 | Pair 4s or less | 0 |

Note that for the deal paytable, for Bet Inc=5 a Low Pair is 3-K, while for Bet Inc=4 a Low Pair is 5-K.

V3: Draw Template Paytable

| Hand # | Hand Name | Pay |
|---|---|---|
| 1 | RF | 800 |
| 2 | SF | SF |
| 3 | 4 A + 2-4 | 400 |
| 4 | 4 2-4 + A-4 | 160 |
| 5 | 4 5-K + A-4 | 80 |
| 6 | 4 A | 160 |
| 7 | 4 2-4 | 80 |
| 8 | 4 5-K | 50 |
| 9 | FH | 8 |
| 10 | Flush | 5 |
| 11 | Straight | 4 |
| 12 | 3 of a kind | 3 |
| 13 | 2 Pair | 1 |
| 14 | High Pair: J-A | 1 |
| 15 | Pair 10s or less | 0 |

In the tables below, the Bet Inc column represents the Bet Increment in order to achieve full functionality. Both Bet Inc of 5 units and 4 units are contemplated. In jurisdictions which allow individual wagers to be bet upon, then e.g. 1-unit, 2-unit and 3-unit wagers may be offered upon the respective 1, 2 or 3 Dealt hands alone, prior to the next wager increment upon the Draw. E.g., in the case of Bet Inc=5 units, a player may be allowed to wager 1, 2, 3 or 5 units, and subsequently 6, 7, 8 or 10 units, etc.; in the case of Bet Inc=4 units, a player may be allowed to wager 1, 2, 3 or 4 units, and subsequently 5, 6, 7 or 8 units, etc.

V3: Summary of Overall Expected Return for Various Rules, Paytables

| Bet Inc | Bonus Starting Hands | FH, F, S, 3oak, 2P, HP, SF | Bonus Mult | ER Deal | ER Draw | ER Overall |
|---|---|---|---|---|---|---|
| 5 | A, B, C1 | 25, 15, 9, 4, 3, 2, 50 | 1× | 80.84% | 211.91% | 90.89% |
| 5 | A, B, C1 | 35, 20, 10, 5, 3, 2, 50 | 1× | 85.77% | 211.91% | 93.84% |
| 5 | A, B, C1 | 35, 20, 10, 5, 3, 2, 100 | 1× | 85.77% | 214.12% | 94.29% |
| 5 | A, B, C1 | 35, 25, 15, 6, 3, 2, 100 | 1× | 90.83% | 214.12% | 97.32% |
| 5 | A, B, C1 | 50, 25, 15, 6, 3, 2, 100 | 1× | 92.99% | 214.12% | 98.62% |
| 5 | A, B, C1 | 25, 15, 9, 4, 3, 2, 50 | 2× | 80.84% | 236.64% | 95.83% |
| 5 | A, B, C1 | 35, 20, 10, 5, 3, 2, 50 | 2× | 85.77% | 236.64% | 98.79% |
| 5 | A, B, C1 | 35, 20, 10, 5, 3, 2, 100 | 2× | 85.77% | 239.91% | 99.44% |
| 5 | A, B, C1 | 35, 25, 10, 5, 3, 2, 100 | 2× | 86.75% | 239.91% | 100.03% |
| 5 | A, B, C1 | 35, 20, 10, 6, 3, 2, 100 | 2× | 87.88% | 239.91% | 100.71% |
| 5 | A, B, C1, D | 25, 15, 9, 4, 3, 2, 50 | 1× | 80.84% | 220.58% | 92.62% |
| 5 | A, B, C1, D | 50, 25, 15, 6, 3, 2, 50 | 1× | 92.99% | 220.58% | 99.91% |
| 5 | A, B, C1, D | 25, 15, 9, 4, 3, 2, 50 | 2× | 80.84% | 249.43% | 98.39% |
| 5 | A, B, C1, D | 25, 15, 10, 5, 3, 2, 50 | 2× | 83.34% | 249.43% | 99.89% |
| 5 | A, B, C1, D | 30, 15, 9, 5, 3, 2, 50 | 2× | 83.67% | 249.43% | 100.09% |
| 5 | A, B, C1, D | 30, 15, 10, 5, 3, 2, 50 | 2× | 84.06% | 249.43% | 100.32% |
| 5 | A, B, C1, D | 25, 15, 9, 4, 3, 2, 100 | 2× | 80.84% | 252.68% | 99.04% |
| 5 | A, B, C2 | 25, 15, 9, 4, 3, 2, 50 | 1× | 80.84% | 209.39% | 90.38% |
| 5 | A, B, C2 | 35, 20, 10, 5, 3, 2, 50 | 1× | 85.77% | 209.39% | 93.34% |
| 5 | A, B, C2 | 50, 25, 15, 6, 3, 2, 100 | 1× | 92.99% | 211.59% | 98.11% |
| 5 | A, B, C2 | 25, 15, 9, 4, 3, 2, 50 | 2× | 80.84% | 237.15% | 95.93% |
| 5 | A, B, C2 | 35, 20, 10, 5, 3, 2, 50 | 2× | 85.77% | 237.15% | 98.89% |
| 5 | A, B, C2 | 35, 20, 10, 5, 3, 2, 100 | 2× | 85.77% | 240.40% | 99.54% |
| 5 | A, B, C2, D | 25, 15, 9, 4, 3, 2, 50 | 1× | 80.84% | 218.06% | 92.12% |
| 5 | A, B, C2, D | 25, 15, 9, 4, 3, 2, 50 | 2× | 80.84% | 249.93% | 98.49% |
| 5 | A, B, C2, D | 30, 15, 9, 5, 3, 2, 50 | 2× | 83.67% | 249.93% | 100.19% |
| 5 | A, B, C2, D | 30, 15, 10, 5, 3, 2, 50 | 2× | 84.06% | 249.93% | 100.42% |
| 5 | A, B, C2, D | 25, 15, 10, 5, 3, 2, 50 | 2× | 83.34% | 249.93% | 99.99% |
| 4 | A, B, C1 | 12, 9, 6, 4, 2, 1, 50 | 1× | 62.10% | 211.91% | 99.55% |
| 4 | A, B, C1 | 15, 10, 6, 4, 2, 1, 50 | 1× | 62.73% | 211.91% | 100.03% |
| 4 | A, B, C1 | 15, 10, 7, 4, 2, 1, 50 | 1× | 63.12% | 211.91% | 100.32% |
| 4 | A, B, C1 | 20, 10, 7, 4, 2, 1, 50 | 1× | 63.85% | 211.91% | 100.87% |
| 4 | A, B, C2 | 12, 9, 6, 4, 2, 1, 50 | 1× | 62.10% | 209.39% | 98.92% |
| 4 | A, B, C2 | 15, 10, 6, 4, 2, 1, 50 | 1× | 62.73% | 209.39% | 99.40% |
| 4 | A, B, C2 | 15, 10, 7, 4, 2, 1, 50 | 1× | 63.12% | 209.39% | 99.69% |
| 4 | A, B, C2 | 20, 10, 7, 4, 2, 1, 50 | 1× | 63.85% | 209.39% | 100.24% |
| 4 | A, B, C2 | 12, 9, 6, 4, 2, 1, 50 | 1.5× | 62.10% | 223.26% | 102.39% |
| 4 | A, B, C2 | 8, 6, 5, 4, 2, 1, 50 | 1.5× | 60.55% | 223.26% | 101.23% |

In principle, to obtain a desired overall ER, the Deal and/or Draw paytables may be modified independently, since the ER associated with the Deal and Draw are determined independently and thereafter combined to obtain ER Overall, as follows:

Bet Inc=4: Overall ER={3×(ER Deal)+(ER Draw)}/4

Bet Inc=5: Overall ER={3×(ER Deal)+(ER Draw)}/5

Multi-hand versions are also available upon the Draw. For example, 3 hands may be Dealt, each of which is compared to the Deal paytable. The player selects one hand to play. Then, the selected hand is played in a 3-hand multi-play format. In this case, the Bet Inc is 10 units (corresponding to a Bet Mult equal to 1), and the paytable template follows that of Bet Inc equal to 5 as described above. The overall ER for sample paytables is presented below.

V3: Overall Expected Return for 3-Hand Multi-Play

| Bet Inc | Bonus Starting Hands | FH, F, S, 3oak, 2P, HP, SF | Bonus Mult | ER Deal | ER Draw | ER Overall |
|---|---|---|---|---|---|---|
| 10 | A, B, C1, D | 25, 15, 10, 5, 3, 2, 50 | 2× | 83.34% | 249.43% | 99.83% |
| 10 | A, B, C1, D | 25, 15, 9, 4, 3, 2, 50 | 2× | 80.84% | 249.43% | 99.08% |
| 10 | A, B, C1, D | 20, 15, 9, 4, 3, 2, 50 | 2× | 80.12% | 249.43% | 98.87% |
| 10 | A, B, C1, D | 20, 12, 9, 4, 3, 2, 50 | 2× | 79.53% | 249.43% | 98.69% |
| 10 | A, B, C1, D | 20, 12, 8, 4, 3, 2, 50 | 2× | 79.14% | 249.43% | 98.57% |
| 10 | A, B, C1, D | 20, 10, 8, 4, 3, 2, 50 | 2× | 78.74% | 249.43% | 98.45% |

In principle, to obtain a desired overall ER, the Deal and/or Draw paytables may be modified independently, since the ER associated with the Deal and Draw are determined independently and thereafter combined to obtain ER Overall, as follows:

Bet Inc=10: Overall ER={3×(ER Deal)+3×(ER Draw)}/10

Analysis

While the analysis carried forth herein was for 3 specific versions with a Double Bonus-type of paytable, variations of the foregoing are possible.

Poker Variations: Other video poker variations either as to play (e.g., Deuces Wild, Joker's Wild, etc.) and/or paytables (e.g., Triple Double Bonus, Bonus, Jacks or better, Bonus Deuces Wild, Double Bonus Deuces Wild, etc.) may be utilized.

Number of Dealt hands: The number of dealt hands may be varied. For example, V2 may be played with 3 Dealt hands. Or, V3 may be played with 2 Dealt hands, etc.

Opportunity for additional wagering: In a variation, based upon specific incomplete held hands (for example, 4 to Royal Flush, 4 to Straight Flush, etc.), the player is given the option to make an additional wager for a modified paytable prior to the draw. In another variation, based upon specific outcomes (for example, 4 to Royal Flush, 4 of a kind without the kicker, etc.), the player is given the option to make an additional wager, after the draw, for an additional draw with an enhanced paytable. The modified paytable odds may be a fixed amount or a multiple and/or fraction of the standard paytable, and may be dynamically calculated based on remaining deck composition, hence taking into account cards currently unavailable as potential drawing cards.

Combining unique play elements: The concepts of (a) dealing a fresh hand of 5 cards (from a new or existing deck) if zero cards are held, (b) utilizing Bonus Starting Hands to award a multiplier to a completed hand, (c) utilizing Bonus Starting Hands to award a second chance bonus at a non-completed hand may be combined in various ways beyond those described herein. For example, all of (a), (b) and (c) may be combined into a single game.

Choosing the hand to play: In one variation, the player chooses the hand to play (when there is more than one initially dealt hand). Additionally, or alternatively, the gaming system may indicate (e.g., via pulsing and/or highlighting the hand, to suggest the best hand to play). In lieu of the player choosing the hand to play, the gaming system may automatically select the hand with the highest expected value for the player.

Bonus Starting Hands: Whereas four specific examples are discussed herein (4 to Royal Flush, 4 to Straight Flush, 3 of a kind, 2 Low Pairs), other possibilities exist. For example, 3 to Royal Flush, 3 to Straight Flush, etc.

Bonus Starting Hands Second Draw: As discussed herein, in one variation, the card(s) on the first Draw that didn't complete the hand are replaced in the pack prior to the second Draw. However, in another variation, all cards "seen" are considered removed from the pack for the second draw.

Bonus Starting Hands Completion: The definition of "completed" hands may be varied. One such example is that of a 3 of a kind (i.e., whether drawing a Full House completes the hand) as presented and described herein. Another example is the subset of 4 to Royal Flush hands that may be completed with a Straight Flush. Additional variations are possible.

Insofar as variations and/or extensions of the versions are desired, the methods described herein may be adapted to analyze these additional versions.

Algorithm for Hand EV of Second Chance Video Poker Embodiment V4

In another embodiment V4 of second chance bonus video poker, upon three initial dealt hand outcomes (of 5 cards each, dealt from 3 separate decks, each compared to a deal paytable), the software indicates the optimal hand to play, and the player chooses one of these dealt hands to play out. The player then typically holds/draws the chosen hand in the traditional manner to a final drawn hand compared to a draw paytable. However, if the chosen dealt hand and cards Held comprises one of a set of bonus starting hands, then the first Draw (if completing the hand) pays a Bonus Multiplier (e.g., 2×) times the standard draw pay, and if not completing the hand a second chance bonus draw is awarded at the standard draw pay.

Embodiments Used to Generate Screen Shots Shown in FIGS. 5-16 and 18-31

In the second chance bonus poker embodiment (A) illustrated and described with respect to the screen shots shown in FIGS. 17-31, upon three initial dealt hand outcomes (of 5 cards each, dealt from 3 separate decks, each compared to a first or deal paytable), the software indicates the optimal hand to play, and the player chooses one of these dealt hands to play out. The player then typically holds/draws the chosen hand in the traditional manner to a final drawn hand compared to a second or draw paytable. However, if the chosen dealt hand and cards held comprises one of a set of bonus starting hands, then the first draw (if completing the hand) pays a bonus multiplier (e.g., 2×) times the standard draw pay, and if not completing the hand a second draw is awarded at the standard draw pay.

In the bonus hand video poker embodiment (B) illustrated and described with respect to the screen shots shown in FIGS. 5-16, upon an initial dealt hand outcome (of 5 cards compared to a first or deal paytable) the player then typically holds/draws in the traditional manner to a final drawn hand compared to a draw paytable. However, if the player holds zero cards, a new dealt hand (from a second deck) is afforded the player, who then Holds/Draws anew to a final drawn hand which is compared to a second or draw paytable.

Second Chance Bonus Poker Embodiment Version A

For second chance bonus poker embodiment (A) illustrated and described with respect to the screen shots shown in FIGS. 17-31, the Bet Increment is 5 units, and, in the illustrated embodiment, the player is initially dealt three 5-card hands from three separate decks. In one embodiment, each of the three dealt hands is compared to a first or deal paytable and resolved. Thereafter, the ga,omg system automatically indicates the hand with the highest expected value for the player. The player then chooses one of these dealt hands to play out. The player then holds/draws the chosen hand in the traditional video poker manner to a final drawn hand compared to a second or draw paytable. However, if the chosen dealt hand and cards held comprise one of a set of bonus starting hands, then the first draw (if completing the hand) pays a multiplier (e.g., 2×) times the standard draw pay, and if not completing the hand a second draw is awarded.

Note that there is no strategy with respect to dealt outcomes.

As an example, the available suite of bonus starting hands includes the following (cards needing to be held for the bonus starting hands are depicted in bold).

A: Potential Bonus Starting Hands

| | Bonus Starting Hand | # | Examples | Completed Hand |
|---|---|---|---|---|
| A | 4 to Royal Flush | 940 | Ah **10s Qs Ks As**, 3h **10c Jc Qc Kc** | Royal Flush (and Straight Flush if applicable) |
| B | 4 to Straight Flush | 6768 | **2h 3h 4h 5h** 7d, **7d 8d** 9h **10d Jd** | Straight Flush |
| C | 3 of a kind | 54912 | **4s 4h 4d** 10d Qd, **Js Jc Jd** Ah Ks | 4 of a kind |
| D | 2 Low Pairs (2-10) | 57024 | **2s 2h** Ac **9h 9c**, **10c 10s 4s 4h** 2c | Full House |

Specifically for 4 to Straight Flush (and only for this case), there may be more than one way to hold the hand and qualify as a Bonus Starting Hand. For example, with the Dealt hand 7d 8d 10d Jd Qd, the player may hold 7d 8d 10d Jd or 8d 10d Jd Qd, as both qualify as a Bonus Starting Hand.

Note that in some cases of 4 to Royal Flush (e.g., 10h Jh Qh Kh but not Jh Qh Kh Ah), this analysis assumes a completed hand may be a Royal Flush or a Straight Flush.

Note also that for a Bonus Starting Hand of 3 of a kind, the hand is completed only with a 4 of a kind (a Full House pays for the Full House and awards the second draw)

Note furthermore that for the illustrated embodiment, two low pairs comprises hands with two pairs, but only if each pair has rank of 2 through 10. So, a hand of 3s 3d 10s 10h is a bonus starting hand, whereas a hand of 3s 3d Js Jh is not.

Logically, the rules of play are as follows for the player's chosen hand.

With a bonus starting hand that is correspondingly held: after the first draw, the hand is evaluated—if a completed hand, then the draw paytable pay multiplied by the bonus multiplier is awarded, and the game is over; if a non-completed hand, then the draw paytable pay (if any) is given and a second draw is automatically awarded with the deck reset to that of the first draw, and subsequent to the second draw any associated draw paytable pay is given.

Otherwise: Standard video poker rules apply, such that after the first draw the hand is evaluated and any associated draw paytable pay is given, and the game is over.

A: Deal Paytable

| Hand # | Hand Name | Pay |
|---|---|---|
| 1 | RF | 4000 |
| 2 | SF | 400 |
| 3 | 4 A + 2-4 | 1000 |
| 4 | 4 2-4 + A-4 | 400 |
| 5 | 4 5-K + A-4 | 200 |
| 6 | 4 A | 400 |
| 7 | 4 2-4 | 200 |
| 8 | 4 5-K | 100 |
| 9 | FH | 25 |
| 10 | Flush | 15 |
| 11 | Straight | 10 |
| 12 | 3 of a kind | 5 |
| 13 | 2 Pair | 3 |
| 14 | High Pair: A | 2 |
| 15 | Low Pair: 3-K | 1 |
| 16 | Pair 2s or less | 0 |

Note that for the illustrated deal paytable, a high pair is a only, a low pair is 3-k, and both high pair and low pair award a payoff.

A: Draw Paytable

| Hand # | Hand Name | Pay |
|---|---|---|
| 1 | RF | 800 |
| 2 | SF | 50 |
| 3 | 4 A + 2-4 | 400 |
| 4 | 4 2-4 + A-4 | 160 |
| 5 | 4 5-K + A-4 | 80 |
| 6 | 4 A | 160 |
| 7 | 4 2-4 | 80 |
| 8 | 4 5-K | 50 |
| 9 | FH | 8 |
| 10 | Flush | 5 |
| 11 | Straight | 4 |
| 12 | 3 of a kind | 3 |
| 13 | 2 Pair | 1 |
| 14 | High Pair: J-A | 1 |
| 15 | Pair 10s or less | 0 |

Note that for the illustrated draw paytable, a high pair is J-A.

By way of example, assume the game is offered with a standard wager of 5 credits to cover all functionality, and that a player wagers 25 credits (i.e., bet multiplier of 5) and the bonus multiplier is 2×. The player is dealt 3 hands, each from a separate deck, as follows.

Hand 1: 5h 6s 7d 8h 9c

Hand 2: Jh 10h 8h 4c 9h

Hand 3: Ah Kc Kd 10s 4c

For Hand 1 the player is paid 5×10=50 credits for the straight on the deal. For Hand 2, the player is paid nothing for the deal. For Hand 3, the player is paid 5×1=5 credits for the pair of Kings on the deal. Thereafter, the player must choose which hand to play out. Assume the player chooses Hand 2 and holds the Jh 10h 8h 9h, i.e. the player holds 4 to Straight Flush which is a bonus starting hand. The player draws a card (the first draw) and gets the Qh. The player completes the Straight Flush and is paid 5×50×2=500 credits, and the game is over. The total payout to the player is 50+5+500=555 credits.

If instead, on the first draw, the player draws Jd, then the player is paid 5×1=5 credits for the pair of Jacks on the first draw. Since the player had a bonus starting hand but has not completed the Straight Flush, the player is awarded a second draw (removing the Jd and replacing it in the deck, such that the player again is holding Jh 10h 8h 9h with 4c out of play). If, on the second draw, the player gets 7h, the player is paid 5×50=250 credits for the Straight Flush, and the game is over. The total payout to the player in this case is 50+5+5+250=310 credits.

Because, in Version A, the player chooses which of the three dealt hands to play out (and how to play), the theoretical optimal ER of each possible starting dealt hand must be determined, such that when presented with three hands, the game depicts the theoretical best hand to play.

In jurisdictions where allowable, 1-unit, 2-unit and 3-unit wagers may be offered upon the respective 1, 2 or 3 Dealt hands alone, prior to the next wager increment upon the Draw. I.e., a player may be allowed to wager 1, 2, 3 or 5 units, and subsequently 6, 7, 8 or 10 units, etc. For purposes of the illustrated embodiment, the player can only wager in increments of 5 units. Thus, a 5-unit wager is a bet multiplier of 1, a 10-unit wager is a bet multiplier of 2, etc.

In terms of presentation, upon a new game (player touches deal), each of the 3 hands should briefly show the backs of the 3 decks (e.g., red, blue, yellow) as the side paytables are instantly updated to show the deal paytable with appropriate bet multiplier, prior to showing the 5 cards in each hand. Thereafter, deal hand outcomes (e.g., 3 of a kind) should be depicted superimposed upon the respective hand, and roll-up occurs. Upon roll-up finishing, the side paytables are updated (through rapid fade-out and fade-in) to show the draw paytable, and the hand with best expected return (i.e., the optimal hand to play) should be highlighted, either through circumscribed lighting effect and/or dynamic arrows pointing toward. Player is prompted to "Choose Hand to Play". Upon player touching the hand to play out, the other two hands quickly fade out, and the chosen hand is simultaneously quickly centered on-screen. If a bonus starting hand, then player should be alerted. Player then plays out video poker game.

Bonus Hand Video Poker Version B

In the bonus hand video poker embodiment (B) illustrated and described with respect to the screen shots shown in FIGS. 5-16, the Bet Increment is equal to 2, and the player is initially dealt a 5-card hand. In the illustrated embodiment, the dealt hand is compared to the deal paytable and resolved. Thereafter, the player holds/draws the hand in the traditional video poker manner to a final drawn hand which is compared to a second or draw paytable. However, if the player Holds zero cards, a new dealt hand (from a second deck) is afforded the player. In one embodiment, the new dealt hand is not compared to the deal paytable, but the player then holds/draws this new dealt hand in the traditional manner to a final drawn hand, which is compared to a second or draw paytable.

B: Deal Paytable

| Hand # | Hand Name | Pay |
|---|---|---|
| 1 | RF | 4000 |
| 2 | SF | 400 |
| 3 | 4 A + 2-4 | 1000 |
| 4 | 4 2-4 + A-4 | 400 |
| 5 | 4 A | 400 |
| 6 | 4 2-4 | 200 |
| 7 | 4 5-K | 100 |
| 8 | FH | 35 |
| 9 | Flush | 20 |
| 10 | Straight | 10 |
| 11 | 3 of a kind | 4 |
| 12 | 2 Pair | 3 |
| 13 | High Pair: A | 2 |
| 14 | Low Pair: 3-K | 1 |
| 15 | Pair 2s or less | 0 |

Note that for the Bonus Hand Video Poker Version B deal paytable, a High Pair is A only, a Low Pair is 3-K, and both High Pair and Low Pair award a payoff.

B: Draw Paytable

| Hand # | Hand Name | Pay |
|---|---|---|
| 1 | RF | 800 |
| 2 | SF | 50 |
| 3 | 4 A + 2-4 | 400 |
| 4 | 4 2-4 + A-4 | 160 |
| 5 | 4 A | 160 |
| 6 | 4 2-4 | 80 |
| 7 | 4 5-K | 50 |
| 8 | FH | 8 |
| 9 | Flush | 5 |
| 10 | Straight | 4 |
| 11 | 3 of a kind | 2 |
| 12 | 2 Pair | 1 |
| 13 | High Pair: J-A | 1 |
| 14 | Pair 10s or less | 0 |

Note that for the Bonus Hand Video Poker Version B Draw Paytable, a High Pair is J-A.

As an illustration of B game play, assume the game is offered with a standard wager of 2 credits to cover all functionality, and that a player wagers 10 credits (i.e., Bet Multiplier of 5). The player is dealt a hand as follows.

Hand: 8d 5h 6d 8c Qc

First, the player is paid 5×1=5 credits for the Low Pair on the Deal.

Assume the player chooses to hold the Pair of 8s. The player draws and gets 7c 4c As. The player is paid nothing on the Draw, and the game is over. The total payout to the player is 5+0=5 credits.

If instead, the player decided to hold nothing, then the player is dealt a new hand of five cards from a second deck. Let's assume this fresh hand is Jc Jd 10d 6d Qc. In the illustrated embodiment, this new hand of five cards is not compared to the deal paytable (i.e., there is no deal payoff for the Pair of Js), but the player is afforded the opportunity to hold/draw as in standard video poker. The player holds Jc Jd and draws 10c 4c Jh. The player is paid 5×2=10 credits for the 3 of a kind, and the game is over. The total payout to the player in this case is 5+=15 credits.

In jurisdictions which allow individual wagers to be bet upon, then a 1-unit wager may be offered upon the dealt hand alone, prior to the next wager increment of 1 unit upon the draw. E.g., a player may be allowed to wager 1 or 2 units, and subsequently 3 or 4 units, etc. For purposes of the demo, the player can only wager in increments of 2 units. Thus, a 2-unit wager is a Bet Multiplier of 1, a 4-unit wager is a Bet Multiplier of 2, etc.

In terms of game play, upon a new game (player touches deal), the hand should briefly show the backs of the first deck (e.g., red) as the side paytables are instantly updated to show the deal paytable with appropriate bet multiplier, prior to showing the 5 cards in the hand. Thereafter, deal hand outcomes (e.g., 3 of a kind) are superimposed upon the respective hand, and roll-up occurs. Upon roll-up finishing, the side paytables are updated (through quick fade-out and fade-in) to show the draw paytable. Player then plays out video poker game, and if holding nothing, the hand should briefly show the backs of the second deck (e.g., green) prior to showing the five new cards in the hand.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention.

I claim:

1. A gaming system comprising:
 a processor;
 a display device;
 a payment device configured to receive monetary value from a player; and
 a memory device storing instructions that, when executed, cause the processor to at least:
  establish a credit balance responsive to receipt, by the payment device, of the monetary value from a player;
  enable the player to place a wager on a wagering game, the wager deducted from the credit balance;
  cause the display device to display a wagering game responsive to receipt of the wager and receipt of a game-initiation input, the wagering game including a plurality of hands;
  cause the credit balance to increase for each hand of the plurality of hands that satisfies a winning hand criterion from a first paytable;
  for a designated hand of the plurality of hands of the wagering game:
   determine if the designated hand satisfies a bad band criterion,
   in response to a determination that the designated hand satisfies a bad hand criterion, award a bonus hand to replace the designated hand, and
   cause the display device to display the bonus hand,
   cause an input device to, for the in the bonus hand, enable input of a hold input for a selected card;
   in response to detecting a hold input for a card in the bonus hand;
   designate the card as a held card of the bonus hand;
   duplicate the card in each other hand of the plurality of hands; and
   cause the display device to display the duplicated card in each other hand of the plurality of hands;
   designate each card for which the hold input is not received in the bonus hand as a non-held card;
   in response to detecting a draw input, for each non-held card in the bonus hand and each other hand of the plurality of hands:
   randomly determine a replacement card for the bonus hand from the fourth set of cards;
   replace the non-held card in the bonus hand with the replacement card;
   cause the display device to display the replacement card in the bonus hand;
   randomly determine an additional card from a new set of cards associated with each other hand of the plurality of hands;
   add the additional card to the each other hand of the plurality of hands; and
   cause the display device to display the additional card in the each other hand of the plurality of hands;
   cause the credit balance to increase for each hand of the bonus hand and each other hand of the plurality of hands that satisfies a winning hand criterion from a second paytable; and
  initiate a cashout of the credit balance responsive to receipt of a cashout input.

2. The gaming system of claim 1, wherein the monetary value receive from the player is chosen from the group consisting of paper money, a ticket, a voucher, credit cards, debit cards, credit slips or mobile wallets.

3. The gaming system of claim 1, wherein the bad hand criterion comprises a poker hand having a pair of two's or worse.

4. A gaming system comprising:
 a processor;
 a display device;
 a payment device configured to receive monetary value from a player; and
 a memory device storing instructions that, when executed, cause the processor to at least:
  establish a credit balance responsive to receipt, by the payment device, of the monetary value from a player;
  enable the player to place a wager on a wagering game, the wager deducted from the credit balance;
  cause the display device to display a wagering game responsive to receipt of the wager and receipt of a game-initiation input, the wagering game including a plurality of hands;
  for a designated hand of the plurality of hands of the wagering game:
   determine if the designated hand satisfies a bad hand criterion,
   in response to a determination that the designated hand satisfies a bad hand criterion, award a bonus hand to replace the designated hand,
   cause the display device to display the bonus hand,
   cause an input device to, for the in the bonus hand, enable input of a hold input for a selected card;
   in response to detecting a hold input for a card in the bonus hand;
   designate the card as a held card of the bonus hand;
   duplicate the card in each other hand of the plurality of bands; and
   cause the display device to display the duplicated card in each other hand of the plurality of hands;
   designate each card for which the hold input is not received in the bonus hand as a non-held card;

in response to detecting a draw input, for each non-held card in the bonus hand and each other hand of the plurality of hands:

randomly determine a replacement card for the bonus hand from the fourth set of cards;

replace the non-held card in the bonus hand with the replacement card;

cause the display device to display the replacement card in the bonus hand;

randomly determine an additional card from a new set of cards associated with each other hand of the plurality of hands;

add the additional card to the each other hand of the plurality of hands; and cause the display device to display the additional card in the each other hand of the plurality of hands;

cause the credit balance to increase for each hand of the bonus hand and each other hand of the plurality of hands that satisfies a winning hand criterion from a second paytable; and initiate a cashout of the credit balance responsive to receipt of a cashout input.

5. A gaming system comprising:

a processor;

a display device;

a payment device configured to receive monetary value from a player; and a memory device storing instructions that, when executed, cause the processor to at least:

establish a credit balance responsive to receipt, by the payment device, of the monetary value from a player;

enable the player to place a wager on a wagering game, the wager deducted from the credit balance;

cause the display device to display a wagering game responsive to receipt of the wager and receipt of a game-initiation input, the wagering game including a plurality of hands;

randomly determine a plurality of cards from a first set of cards to form an initial first hand of cards;

cause the display device to display the first hand of cards;

randomly determine a plurality of cards from a second set of cards to form an initial second hand of cards;

cause the display device to display the second hand of cards;

randomly determine a plurality of cards from a third set of cards to form an initial third hand of cards;

cause the display device to display the third hand of cards;

cause the credit balance to increase based on any determined award for each hand of the initial first, second and third hand of cards that satisfies a winning hand criterion from a first paytable;

for the initial first hand of cards:

determine if the initial first hand of cards satisfies a bad hand criterion, in response to a determination that the designated hand satisfies a bad hand criterion, award a bonus hand, randomly determine a plurality of cards from a from a fourth set of cards to replace the initial first hand of cards, cause the display device to display the bonus hand, cause an input device to, for the in the bonus hand, enable input of a hold input for a selected card;

in response to detecting a hold input for a card in the bonus hand;

designate the card as a held card of the bonus hand;

duplicate the card in the second hand of cards; and cause the display device to display the duplicated card in the second hand of cards;

duplicate the card in the third band of cards; and cause the display device to display the duplicated card in the third hand of cards;

designate each card for which the hold input is not received in the bonus hand as a non-held card;

in response to detecting a draw input, for each non-held card in the bonus hand, second hand of cards and third hand of cards:

randomly determine a replacement card for the bonus hand from the fourth set of cards;

replace the non-held card in the bonus hand with the replacement card;

cause the display device to display the replacement card in the bonus hand;

randomly determine an additional card from a fifth set of cards associated with the second hand of cards;

add the additional card to the second set of cards; and cause the display device to display the additional card in the second hand of cards;

randomly determine an additional card from a sixth set of cards associated with the third hand of cards;

add the additional card to the third set of cards; and cause the display device to display the additional card in the third hand of cards;

determine a first award based on the first hand of cards and a second paytable, determine a second award based on the second hand of cards and the second paytable, determine a third award based on the third hand of cards and the second paytable, cause the credit balance to increase based on any determined first award, any determined second award, and any determined third award; and initiate a cashout of the credit balance responsive to receipt of a cashout input.

6. The gaming system of claim 1, wherein the monetary value receive from the player is chosen from the group consisting of paper money, a ticket, a voucher, credit cards, debit cards, credit slips or mobile wallets.

7. The gaming system of claim 1, wherein the bad hand criterion comprises a poker hand having a pair of two's or worse.

* * * * *